(12) United States Patent
Wu et al.

(10) Patent No.: US 11,639,981 B2
(45) Date of Patent: May 2, 2023

(54) METHOD, APPARATUS, AND SYSTEM FOR MOVEMENT TRACKING

(71) Applicants: Chenshu Wu, Hong Kong (CN); Beibei Wang, Clarksville, MD (US); Xiaolu Zeng, Greenbelt, MD (US); K. J. Ray Liu, Potomac, MD (US); Oscar Chi-Lim Au, San Jose, CA (US)

(72) Inventors: Chenshu Wu, Hong Kong (CN); Beibei Wang, Clarksville, MD (US); Xiaolu Zeng, Greenbelt, MD (US); K. J. Ray Liu, Potomac, MD (US); Oscar Chi-Lim Au, San Jose, CA (US)

(73) Assignee: ORIGIN WIRELESS, INC., Rockville, MD (US)

( * ) Notice: Subject to any disclaimer, the term of this patent is extended or adjusted under 35 U.S.C. 154(b) by 0 days.

(21) Appl. No.: 17/492,642

(22) Filed: Oct. 3, 2021

(65) Prior Publication Data
US 2022/0026519 A1    Jan. 27, 2022

Related U.S. Application Data

(63) Continuation-in-part of application No. 15/326,112, filed as application No. PCT/US2015/041037 on Jul.
(Continued)

(51) Int. Cl.
*G01S 7/00* (2006.01)
*G01S 13/00* (2006.01)
(Continued)

(52) U.S. Cl.
CPC .............. *G01S 7/006* (2013.01); *G01S 7/415* (2013.01); *G01S 13/003* (2013.01); *G01S 13/56* (2013.01); *H04W 84/18* (2013.01)

(58) Field of Classification Search
CPC combination set(s) only.
See application file for complete search history.

(56) References Cited

U.S. PATENT DOCUMENTS 5,450,345 A * 9/1995 Raymer ............... G05D 1/0646
703/2
9,161,175 B1 * 10/2015 Smith .................. G01S 5/0252
(Continued)

*Primary Examiner* — Zhiyu Lu

(57) ABSTRACT

Methods, apparatus and systems for movement tracking are described. In one example, a described system comprises: at least one sensor configured to generate at least one sensing information (SI); a memory; a processor communicatively coupled to the memory and the at least one sensor; and a set of instructions stored in the memory. The set of instructions, when executed by the processor, cause the processor to: obtain at least one time series of SI (TSSI) from the at least one sensor, analyze the at least one TSSI, track a movement of an object in a venue based on the at least one TSSI, compute an incremental distance associated with the movement of the object in a first incremental time period based on the at least one TSSI, compute a direction associated with the movement of the object in a second incremental time period based on the at least one TSSI, and compute a next location of the object at a next time based on at least one of: a current location of the object at a current time, a current orientation of the object at the current time, the incremental distance, the direction, or a map of the venue.

29 Claims, 13 Drawing Sheets

Related U.S. Application Data 17, 2015, application No. 17/492,642 is a continuation-in-part of application No. 16/127,151, filed on Sep. 10, 2018, now Pat. No. 11,012,285, which is a continuation-in-part of application No. PCT/US2017/021963, filed on Mar. 10, 2017, application No. 17/492,642 is a continuation-in-part of application No. 16/667,757, filed on Oct. 29, 2019, now abandoned, and a continuation-in-part of application No. 16/790,610, filed on Feb. 13, 2020, and a continuation-in-part of application No. 16/790,627, filed on Feb. 13, 2020, and a continuation-in-part of application No. 16/798,343, filed on Feb. 22, 2020, and a continuation-in-part of application No. 16/871,000, filed on May 10, 2020, and a continuation-in-part of application No. 16/871,004, filed on May 10, 2020, and a continuation-in-part of application No. 16/871,006, filed on May 10, 2020, and a continuation-in-part of application No. 16/909,913, filed on Jun. 23, 2020, and a continuation-in-part of application No. 16/909,940, filed on Jun. 23, 2020, and a continuation-in-part of application No. 16/945,827, filed on Aug. 1, 2020, and a continuation-in-part of application No. 16/945,837, filed on Aug. 1, 2020, and a continuation-in-part of application No. 17/019,273, filed on Sep. 13, 2020, now abandoned, and a continuation of application No. 17/019,271, filed on Sep. 13, 2020, now abandoned, and a continuation-in-part of application No. 17/019,270, filed on Sep. 13, 2020, and a continuation-in-part of application No. 17/113,024, filed on Dec. 5, 2020, now Pat. No. 11,202,215, and a continuation-in-part of application No. 17/113,023, filed on Dec. 5, 2020, and a continuation-in-part of application No. 17/149,625, filed on Jan. 14, 2021, and a continuation-in-part of application No. 17/149,667, filed on Jan. 14, 2021, and a continuation-in-part of application No. 17/180,763, filed on Feb. 20, 2021, which is a continuation-in-part of application No. 16/798,343, filed on Feb. 22, 2020, which is a continuation-in-part of application No. 16/798,337, filed on Feb. 22, 2020, now Pat. No. 10,845,463, said application No. 17/492,642 is a continuation-in-part of application No. 17/180,762, filed on Feb. 20, 2021, and a continuation-in-part of application No. 17/180,760, filed on Feb. 20, 2021, now Pat. No. 11,181,486, and a continuation-in-part of application No. 17/180,766, filed on Feb. 20, 2021, and a continuation-in-part of application No. 17/214,838, filed on Mar. 27, 2021, and a continuation-in-part of application No. 17/214,841, filed on Mar. 27, 2021, and a continuation-in-part of application No. 17/214,836, filed on Mar. 27, 2021, and a continuation-in-part of application No. 17/352,185, filed on Jun. 18, 2021, and a continuation-in-part of application No. 17/352,306, filed on Jun. 20, 2021, and a continuation-in-part of application No. 17/492,598, filed on Oct. 2, 2021, and a continuation-in-part of application No. 17/492,599, filed on Oct. 2, 2021.

(60) Provisional application No. 63/087,122, filed on Oct. 2, 2020, provisional application No. 63/090,670, filed on Oct. 12, 2020, provisional application No. 63/104,422, filed on Oct. 22, 2020, provisional application No. 63/112,563, filed on Nov. 11, 2020, provisional application No. 63/209,907, filed on Jun. 11, 2021.

(51) Int. Cl.
*G01S 13/56* (2006.01)
*G01S 7/41* (2006.01)
*H04W 84/18* (2009.01)

(56) References Cited

U.S. PATENT DOCUMENTS

| | | | | |
|---|---|---|---|---|
| 2006/0267833 | A1* | 11/2006 | Langford | G01S 5/0252 342/174 |
| 2012/0089330 | A1* | 4/2012 | Hesch | G01C 21/16 703/13 |
| 2013/0325404 | A1* | 12/2013 | Yuen | A61B 5/1112 702/182 |
| 2014/0164320 | A1* | 6/2014 | Yuen | G01P 13/00 707/722 |
| 2015/0282766 | A1* | 10/2015 | Cole | A61B 5/7267 702/139 |
| 2015/0346317 | A1* | 12/2015 | Patel | H04W 4/02 455/456.1 |
| 2015/0350849 | A1* | 12/2015 | Huang | H04W 4/029 455/456.1 |
| 2015/0351067 | A1* | 12/2015 | Taylor, Jr. | H04W 8/08 455/456.1 |
| 2016/0349375 | A1* | 12/2016 | Littlefield | G01S 19/21 |
| 2017/0074980 | A1* | 3/2017 | Adib | G01S 7/354 |
| 2017/0365163 | A1* | 12/2017 | MacKenzie | G01S 13/88 |
| 2018/0096595 | A1* | 4/2018 | Janzen | G08G 1/04 |
| 2019/0158982 | A1* | 5/2019 | Farnham | G01S 5/0252 |
| 2020/0170544 | A1* | 6/2020 | Aliverti | A61B 5/6833 |
| 2021/0064043 | A1* | 3/2021 | Kulkarni | G05D 1/028 |

* cited by examiner

TABLE 1: Accuracy of the arrival time estimation

| # | Parameter/Conditions | | | | Arrival time estimation error: $\hat{T}_{AM}^k - T_{AM}$ | | | | | |
|---|---|---|---|---|---|---|---|---|---|---|
| | Max. initial distance (m) | Same initial distance (Y/N) | Speed | Direction | -3s | -2s | -1s | 0s | 1s | $\|\bullet\| \leq 1s$ |
| 1 | 30 | N | Normal walking | 0 – 360° | 6.2% | 0 | 10.4% | 83.4% | 0 | 93.8% |
| 2 | 20 | N | Normal running | 0 – 360° | 0 | 0 | 10% | 90% | 0 | 100% |
| 3 | 20 | N | Walking slowly | 0 – 360° | 3.4% | 4.1% | 10.8% | 73.3% | 8.4% | 92.5% |

FIG. 13

METHOD, APPARATUS, AND SYSTEM FOR MOVEMENT TRACKING

CROSS-REFERENCE TO RELATED APPLICATIONS

The present application hereby incorporates by reference the entirety of the disclosures of, and claims priority to, each of the following cases:
(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/667,757, entitled "METHOD, APPARATUS, AND SYSTEM FOR HUMAN IDENTIFICATION BASED ON HUMAN RADIO BIOMETRIC INFORMATION", filed on Oct. 29, 2019,
(d) U.S. patent application Ser. No. 16/790,610, entitled "METHOD, APPARATUS, AND SYSTEM FOR WIRELESS GAIT RECOGNITION", filed Feb. 13, 2020,
(e) U.S. patent application Ser. No. 16/790,627, entitled "METHOD, APPARATUS, AND SYSTEM FOR OUTDOOR TARGET TRACKING", filed Feb. 13, 2020.
(f) U.S. patent application Ser. No. 16/798,343, entitled "METHOD, APPARATUS, AND SYSTEM FOR WIRELESS OBJECT TRACKING", filed Feb. 22, 2020,
(g) U.S. patent application Ser. No. 16/871,000, entitled "METHOD, APPARATUS, AND SYSTEM FOR WIRELESS TRACKING WITH GRAPH-BASED PARTICLE FILTERING", filed on May 10, 2020,
(h) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
(i) U.S. patent application Ser. No. 16/871,006, entitled "METHOD, APPARATUS, AND SYSTEM FOR VITAL SIGNS MONITORING USING HIGH FREQUENCY WIRELESS SIGNALS", filed on May 10, 2020,
(j) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020,
(k) U.S. patent application Ser. No. 16/909,940, entitled "METHOD, APPARATUS, AND SYSTEM FOR QUALIFIED WIRELESS SENSING", filed on Jun. 23, 2020,
(l) U.S. patent application Ser. No. 16/945,827, entitled "METHOD, APPARATUS, AND SYSTEM FOR PROCESSING AND PRESENTING LIFE LOG BASED ON A WIRELESS SIGNAL", filed on Aug. 1, 2020,
(m) U.S. patent application Ser. No. 16/945,837, entitled "METHOD, APPARATUS, AND SYSTEM FOR WIRELESS SLEEP MONITORING", filed on Aug. 1, 2020,
(n) U.S. patent application Ser. No. 17/019,273, entitled "METHOD, APPARATUS, AND SYSTEM FOR AUTOMATIC AND ADAPTIVE WIRELESS MONITORING AND TRACKING", filed on Sep. 13, 2020,
(o) U.S. patent application Ser. No. 17/019,271, entitled "METHOD, APPARATUS, AND SYSTEM FOR POSITIONING AND POWERING A WIRELESS MONITORING SYSTEM", filed on Sep. 13, 2020,
(p) U.S. patent application Ser. No. 17/019,270, entitled "METHOD, APPARATUS, AND SYSTEM FOR VEHICLE WIRELESS MONITORING", filed on Sep. 13, 2020,
(q) U.S. Provisional Patent application 63/087,122, entitled "METHOD, APPARATUS, AND SYSTEM FOR WIRELESS TRACKING", filed on Oct. 2, 2020,
(r) U.S. Provisional Patent application 63/090,670, entitled "METHOD, APPARATUS, AND SYSTEM FOR WIRELESS MONITORING TO ENSURE SECURITY", filed on Oct. 12, 2020,
(s) U.S. Provisional Patent application 63/104,422, entitled "METHOD, APPARATUS, AND SYSTEM FOR WIRELESS MONITORING", filed on Oct. 22, 2020,
(t) U.S. Provisional Patent application 63/112,563, entitled "METHOD, APPARATUS, AND SYSTEM FOR WIRELESS MONITORING BASED ON ANTENNA ARRANGEMENT", filed on Nov. 11, 2020,
(u) U.S. patent application Ser. No. 17/113,024, entitled "METHOD, APPARATUS, AND SYSTEM FOR PROVIDING AUTOMATIC ASSISTANCE BASED ON WIRELESS MONITORING", filed on Dec. 5, 2020,
(v) U.S. patent application Ser. No. 17/113,023, entitled "METHOD, APPARATUS, AND SYSTEM FOR ACCURATE WIRELESS MONITORING", filed on Dec. 5, 2020,
(w) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
(x) U.S. patent application Ser. No. 17/149,667, entitled "METHOD, APPARATUS, AND SYSTEM FOR WIRELESS MONITORING WITH FLEXIBLE POWER SUPPLY", filed on Jan. 14, 2021,
(y) U.S. patent application Ser. No. 17/180,763, entitled "METHOD, APPARATUS, AND SYSTEM FOR WIRELESS WRITING TRACKING", filed on Feb. 20, 2021,
  (1) which is a Continuation-in-Part of U.S. patent application Ser. No. 16/798,343, entitled "METHOD, APPARATUS, AND SYSTEM FOR WIRELESS OBJECT TRACKING", filed on Feb. 22, 2020,
    a. which is a Continuation-in-Part of U.S. patent application Ser. No. 16/798,337, entitled "METHOD, APPARATUS, AND SYSTEM FOR WIRELESS OBJECT SCANNING", filed Feb. 22, 2020, issued as U.S. Pat. No. 10,845,463 on Nov. 24, 2020, (z) U.S. patent application Ser. No. 17/180,762, entitled "METHOD, APPARATUS, AND SYSTEM FOR FALL-DOWN DETECTION BASED ON A WIRELESS SIGNAL", filed on Feb. 20, 2021, (aa) U.S. patent application Ser. No. 17/180,760, entitled "METHOD, APPARATUS, AND SYSTEM FOR WIRELESS MATERIAL SENSING", filed on Feb. 20, 2021, (bb) U.S. patent application Ser. No. 17/180,766, entitled "METHOD, APPARATUS, AND SYSTEM FOR WIRELESS MOTION RECOGNITION", filed on Feb. 20, 2021, (cc) U.S. patent application Ser. No. 17/214,838, entitled "METHOD, APPARATUS, AND SYSTEM FOR WIRELESS VITAL MONITORING USING HIGH FREQUENCY SIGNALS", filed on Mar. 27, 2021, (dd) U.S. patent application Ser. No. 17/214,841, entitled "METHOD, APPARATUS, AND SYSTEM FOR WIRELESS PROXIMITY SENSING", filed on Mar. 27, 2021, (ee) U.S. patent application Ser. No. 17/214,836, entitled "METHOD, APPARATUS, AND SYSTEM FOR WIRELESSLY TRACKING KEYSTROKES", filed on Mar. 27, 2021, (ff) U.S. Provisional Patent application 63/209,907, entitled "METHOD, APPARATUS, AND SYSTEM FOR WIRELESS MOTION AND SOUND SENSING", filed on Jun. 11, 2021, (gg) U.S. patent application Ser. No. 17/352,185, entitled "METHOD, APPARATUS, AND SYSTEM FOR WIRELESS MICRO MOTION MONITORING", filed on Jun. 18, 2021, (hh) U.S. patent application Ser. No. 17/352,306, entitled "METHOD, APPARATUS, AND SYSTEM FOR WIRELESS MONITORING TO ENSURE SECURITY", filed on Jun. 20, 2021, (ii) U.S. patent application Ser. No. 17/492,598, entitled "METHOD, APPARATUS, AND SYSTEM FOR SOUND SENSING BASED ON WIRELESS SIGNALS", filed on Oct. 2, 2021, (jj) U.S. patent application Ser. No. 17/492,599, entitled "METHOD, APPARATUS, AND SYSTEM FOR HUMAN RECOGNITION BASED ON GAIT FEATURES", filed on Oct. 2, 2021.

TECHNICAL FIELD

The present teaching generally relates to movement tracking. More specifically, the present teaching relates to methods and systems for tracking a location and trajectory of a moving object in a venue.

BACKGROUND

Motion measurements are essential inputs for a range of applications such as robot navigation, indoor tracking, and mobile gaming, etc., and have been widely used in robots, drones, automotive, unmanned vehicles, various consumer electronics, and pretty much anything that moves. The mainstream technology has been using Inertial Measurement Units (IUs) for motion tracking. The rise in demand of accurate and robust motion tracking, coupled with an increase in smart device production, has been driving the IMU market. An improvement to motion measurements will profoundly impact a number of systems and applications.

Precise and robust motion measurement is non-trivial. Existing IMUs realized by sensors, e.g. accelerometers that measure linear acceleration, are well known to suffer from significant errors and drifts. For example, an accelerometer is hardly capable of measuring moving distance due to the noisy readings. Therefore, an existing method, to compute a moving distance by integrating acceleration to get speed and then integrating speed to get distance, is not reliable due to noise, which prevents many applications that require accurate motion processing, such as indoor tracking, virtual reality, and motion sensing games.

SUMMARY

The present teaching generally relates to movement tracking. More specifically, the present teaching relates to methods and systems for tracking a location and trajectory of a moving object in a venue.

In one embodiment, a system for movement tracking is described. The system comprises: at least one sensor configured to generate at least one sensing information (SI); a memory; a processor communicatively coupled to the memory and the at least one sensor; and a set of instructions stored in the memory. The set of instructions, when executed by the processor, cause the processor to: obtain at least one time series of SI (TSSI) from the at least one sensor, analyze the at least one TSSI, track a movement of an object in a venue based on the at least one TSSI, compute an incremental distance associated with the movement of the object in a first incremental time period based on the at least one TSSI, compute a direction associated with the movement of the object in a second incremental time period based on the at least one TSSI, and compute a next location of the object at a next time based on at least one of: a current location of the object at a current time, a current orientation of the object at the current time, the incremental distance, the direction, or a map of the venue.

In another embodiment, a device of a movement tracking system is described. The device comprises: a processor; a memory communicatively coupled to the processor; and a sensor communicatively coupled to the processor. The sensor is configured to generate at least one sensing information (SI). The processor is configured to: obtain at least one time series of SI (TSSI) from the sensor, analyze the at least one TSSI, track a movement of an object in a venue based on the at least one TSSI, compute an incremental distance associated with the movement of the object in a first incremental time period based on the at least one TSSI, compute a direction associated with the movement of the object in a second incremental time period based on the at least one TSSI, and compute a next location of the object at a next time based on at least one of: a current location of the object at a current time, a current orientation of the object at the current time, the incremental distance, the direction, or a map of the venue.

In yet another embodiment, a method of a movement tracking system is described. The method comprises: generating at least one sensing information (SI); obtaining at least one time series of SI (TSSI); analyzing the at least one TSSI, tracking a movement of an object in a venue based on the at least one TSSI; computing an incremental distance associated with the movement of the object in a first incremental time period based on the at least one TSSI; computing a direction associated with the movement of the object in a second incremental time period based on the at least one TSSI; and computing a next location of the object at a next time based on at least one of: a current location of the object at a current time, a current orientation of the object at the current time, the incremental distance, the direction, or a map of the venue.

Other concepts relate to software for implementing the present teaching on movement tracking. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIG. 13 shows a table about accuracy of the arrival time estimation, according to some embodiments of the present disclosure.

DETAILED DESCRIPTION

Figure 1:
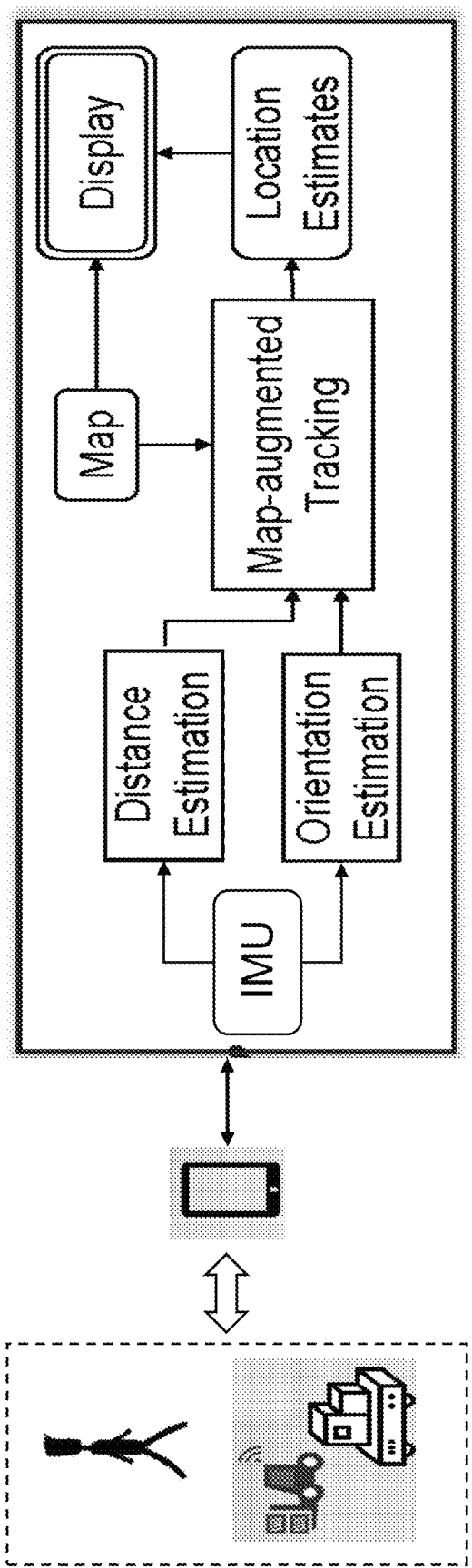
FIG. 1 illustrates an overall architecture of a movement tracking system, according to some embodiments of the present disclosure.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID. The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI.

The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a re-training, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated.

There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object.

The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan.

The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds).

In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/ may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.).

For each of the multiple known events happening in the venue in a respective training (e.g. surveying, wireless survey, initial wireless survey) time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities.

Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i)

percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1−D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: X, Y, (X−Y), (Y−X), abs(X−Y), $X^a$, $Y^b$, abs($X^a−Y^b$), $(X−Y)^a$, (X/Y), (X+a)/(Y+b), ($X^a/Y^b$), and (($X/Y)^a−b$), wherein a and b are may be some predetermined quantities. For example, the function may simply be abs(X−Y), or $(X−Y)^2$, $(X−Y)^4$. The function may be a robust function. For example, the function may be $(X−Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that $X=(x\_1, x\_2, \ldots, x\_n)$ and $Y=(y\_1, y\_2, \ldots, y\_n)$. The function may be a function of at least one of: x_i, y_i, (x_i−y_i), (y_i−x_i), abs(x_i−y_i), $x\_i^a$, $y\_i^b$, abs($x\_i^a−y\_i^b$), $(x\_i−y\_i)^a$, (x_i/y_i), (x_i+a)/(y_i+b), ($x\_i^a/y\_i^b$), and (($x\_i/y\_i)^a−b$), wherein i is a component index of the n-tuple X and Y, and 1⇐i⇐n, e.g. component index of x_1 is i=1, component index of x_2 is i=2. The function may comprise a component-by-component summation of another function of at least one of the following: x_i, y_i, (x_i−y_i), (y_i−x_i), abs(x_i−y_i), $x\_i^a$, $y\_i^b$, abs($x\_i^a−y\_i^b$), $(x\_i−y\_i)^a$, (x_i/y_i), (x_i+a)/(y_i+b), ($x\_i^a/y\_i^b$), and (($x\_i/y\_i)^a−b$), wherein i is the component index of the n-tuple X and Y. For example, the function may be in a form of $\text{sum}\_{\{i=1\}}^n$ (abs(x_i/y_i)−1)/n, or $\text{sum}\_{\{i=1\}}^n$ w_i* (abs(x_i/y_i)−1), where w_i is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the $i^{\{th\}}$ domain item is mapped to the $j^{\{th\}}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method.

The projection may be applied to at least one of: the training TSCI associated with the at least one event, and/or the current TSCI, for the classifier.

The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values.

Each training TSCI may be weighted in the training of the projection. The projection may comprise more than one projected components. The projection may comprise at least one most significant projected component. The projection may comprise at least one projected component that may be beneficial for the classifier.

Channel/Channel Information/Venue/Spatial-Temporal Info/Motion/Object

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beamforming information (including feedback or steering matrices generated by wireless communication devices, according to a standardized process, e.g., IEEE 802.11, or another standard), transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components).

Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics.

The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/ location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, L_1 norm, L_2 norm, L_k norm for k>2, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/ presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/ shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car).

The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/ control coffee machine/hot water pot, turn on/off/control/ preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, subsurface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multiprocessor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation.

An operation may comprise preprocessing, processing, post-processing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak-peaks that may have happened in the past, especially those peaks that have been identified for a long time.

For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state.

The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/mediumthat is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.).

The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Wash. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface(UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

Type 1 device (transmitter, or Tx) and Type 2 device (receiver, or Rx) may be on same device (e.g. RF chip/IC) or simply the same device. The devices may operate at high frequency band, such as 28 GHz, 60 GHz, 77 GHz, etc. The RF chip may have dedicated Tx antennas (e.g. 32 antennas) and dedicated Rx antennas (e.g. another 32 antennas).

One Tx antenna may transmit a wireless signal (e.g. a series of probe signal, perhaps at 100 Hz). Alternatively, all Tx antennas may be used to transmit the wireless signal with beamforming (in Tx), such that the wireless signal is focused in certain direction (e.g. for energy efficiency or boosting the signal to noise ratio in that direction, or low power operation when "scanning" that direction, or low power operation if object is known to be in that direction).

The wireless signal hits an object (e.g. a living human lying on a bed 4 feet away from the Tx/Rx antennas, with breathing and heart beat) in a venue (e.g. a room). The object motion (e.g. lung movement according to breathing rate, or blood-vessel movement according to heart beat) may impact/modulate the wireless signal. All Rx antennas may be used to receive the wireless signal.

Beamforming (in Rx and/or Tx) may be applied (digitally) to "scan" different directions. Many directions can be scanned or monitored simultaneously. With beamforming, "sectors" (e.g. directions, orientations, bearings, zones, regions, segments) may be defined related to the Type 2 device (e.g. relative to center location of antenna array). For each probe signal (e.g. a pulse, an ACK, a control packet, etc.), a channel information or CI (e.g. channel impulse response/CIR, CSI, CFR) is obtained/computed for each sector (e.g. from the RF chip). In breathing detection, one may collect CIR in a sliding window (e.g. 30 sec, and with 100 Hz sounding/probing rate, one may have 3000 CIR over 30 sec).

The CIR may have many taps (e.g. N1 components/taps). Each tap may be associated with a time lag, or a time-of-flight (tof, e.g. time to hit the human 4 feet away and back). When a person is breathing in a certain direction at a certain distance (e.g. 4 ft), one may search for the CIR in the "certain direction". Then one may search for the tap corresponding to the "certain distance". Then one may compute the breathing rate and heart rate from that tap of that CIR.

One may consider each tap in the sliding window (e.g. 30 second window of "component time series") as a time function (e.g. a "tap function", the "component time series"). One may examine each tap function in search of a strong periodic behavior (e.g. corresponds to breathing, perhaps in the range of 10 bpm to 40 bpm).

The Type 1 device and/or the Type 2 device may have external connections/links and/or internal connections/links. The external connections (e.g. connection 1110) may be associated with 2G/2.5G/3G/3.5G/4G/LTE/5G/6G/7G/NBIoT, UWB, WiMax, Zigbee, 802.16 etc. The internal connections (e.g., 1114A and 1114B, 1116, 1118, 1120) may be associated with WiFi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/ standard.

The Type 1 device and/or Type 2 device may be powered by battery (e.g. AA battery, AAA battery, coin cell battery, button cell battery, miniature battery, bank of batteries, power bank, car battery, hybrid battery, vehicle battery, container battery, non-rechargeable battery, rechargeable battery, NiCd battery, NiNM battery, Lithium ion battery, Zinc carbon battery, Zinc chloride battery, lead acid battery, alkaline battery, battery with wireless charger, smart battery, solar battery, boat battery, plane battery, other battery, temporary energy storage device, capacitor, fly wheel).

Any device may be powered by DC or direct current (e.g. from battery as described above, power generator, power convertor, solar panel, rectifier, DC-DC converter, with various voltages such as 1.2V, 1.5V, 3V, 5V, 6V, 9V, 12V, 24V, 40V, 42V, 48V, 110V, 220V, 380V, etc.) and may thus have a DC connector or a connector with at least one pin for DC power.

Any device may be powered by AC or alternating current (e.g. wall socket in a home, transformer, invertor, shore-power, with various voltages such as 100V, 110V, 120V, 100-127V, 200V, 220V, 230V, 240V, 220-240V, 100-240V, 250V, 380V, 50 Hz, 60 Hz, etc.) and thus may have an AC connector or a connector with at least one pin for AC power. The Type 1 device and/or the Type 2 device may be positioned (e.g. installed, placed, moved to) in the venue or outside the venue.

For example, in a vehicle (e.g. a car, truck, lorry, bus, special vehicle, tractor, digger, excavator, teleporter, bull-dozer, crane, forklift, electric trolley, AGV, emergency vehicle, freight, wagon, trailer, container, boat, ferry, ship, submersible, airplane, air-ship, lift, mono-rail, train, tram, rail-vehicle, railcar, etc.), the Type 1 device and/or Type 2 device may be an embedded device embedded in the vehicle, or an add-on device (e.g. aftermarket device) plugged into a port in the vehicle (e.g. OBD port/socket, USB port/socket, accessory port/socket, 12V auxiliary power outlet, and/or 12V cigarette lighter port/socket).

For example, one device (e.g. Type 2 device) may be plugged into 12V cigarette lighter/accessory port or OBD port or the USB port (e.g. of a car/truck/vehicle) while the other device (e.g. Type 1 device) may be plugged into 12V cigarette lighter/accessory port or the OBD port or the USB port. The OBD port and/or USB port can provide power, signaling and/or network (of the car/truck/vehicle). The two devices may jointly monitor the passengers including children/babies in the car. They may be used to count the passengers, recognize the driver, detect presence of passenger in a particular seat/position in the vehicle.

In another example, one device may be plugged into 12V cigarette lighter/accessory port or OBD port or the USB port of a car/truck/vehicle while the other device may be plugged into 12V cigarette lighter/accessory port or OBD port or the USB port of another car/truck/vehicle.

In another example, there may be many devices of the same type A (e.g. Type 1 or Type 2) in many heterogeneous vehicles/portable devices/smart gadgets (e.g. automated guided vehicle/AGV, shopping/luggage/moving cart, parking ticket, golf cart, bicycle, smart phone, tablet, camera, recording device, smart watch, roller skate, shoes, jackets, goggle, hat, eye-wear, wearable, Segway, scooter, luggage tag, cleaning machine, vacuum cleaner, pet tag/collar/wearable/implant), each device either plugged into 12V accessory port/OBD port/USB port of a vehicle or embedded in a vehicle. There may be one or more device of the other type B (e.g. B is Type 1 if A is Type 2, or B is Type 2 if A is Type 1) installed at locations such as gas stations, street lamp post, street corners, tunnels, multi-storey parking facility, scattered locations to cover a big area such as factory/stadium/train station/shopping mall/construction site. The Type A device may be located, tracked or monitored based on the TSCI.

The area/venue may have no local connectivity, e.g., broadband services, WiFi, etc. The Type 1 and/or Type 2 device may be portable. The Type 1 and/or Type 2 device may support plug and play.

Pairwise wireless links may be established between many pairs of devices, forming the tree structure. In each pair (and the associated link), a device (second device) may be a non-leaf (Type B). The other device (first device) may be a leaf (Type A or Type B) or non-leaf (Type B). In the link, the first device functions as a bot (Type 1 device or a Tx device) to send a wireless signal (e.g. probe signal) through the wireless multipath channel to the second device. The second device may function as an Origin (Type 2 device or Rx device) to receive the wireless signal, obtain the TSCI and compute a "linkwise analytics" based on the TSCI.

The present teaching discloses a movement tracking system to find location or position or trajectory of a moving object without using a satellite. In some embodiments, the disclosed system uses a sensor, which may be an inertial measurement unit (IMU), accelerometer, gyroscope, magnetometer, barometer, etc., combined with a map engine (e.g. a particle filter) to track motions. This can be implemented easily on existing smart phones (which all have IMU) or many tablets or notebook computers using a simple software upgrade, without any need of additional hardware infrastructure.

In some embodiments, the system uses data obtained from the sensor to compute distance and orientation of the movement, and then uses a map engine to improve tracking accuracy or correct tracking errors based on a particle filter.

In a training phase, a user may be asked to walk for a known distance (e.g. 10 m), for the system to capture acceleration information. During a walking action, one stride has two steps: left step due to left foot, and right step due to right foot. As such, there should be two "oscillations" or "cycles" of acceleration. In some embodiments, the system can analyze acceleration of the user to recognize or identify the steps or the strides. Then the system can compute the stride length or step length as a known distance, step and/or number of stride.

In an operating phase, the system can analyze real-time acceleration to recognize/identify each stride or step in a measuring time window. The system may compute distance by multiplying the known stride length (or step length) by number of strides in the measuring time window. Then the system can apply dead reckoning and compute new location based on old location, direction from gyro sensor and the distance.

FIG. 1 shows an overall architecture where a tracking system 100 tracks object movements based on inertial sensors (e.g. IMU) built in a mobile device. In some embodiments, the system first calculates the moving distance and orientation from IMU. Then it fuses the two types of estimates to continuously track, in combination with an indoor map.

FIG. 1 depicts an overview of the tracking system's architecture, according to some embodiments of the present disclosure. As shown in FIG. 1, in an example usage scenario, a client, which could be a mobile, wearable, robot, automated guided vehicle (AGV), or any other device equipped with inertial sensors (IMU), may be moving in a venue, e.g. due to a moving user or vehicle carrying the client. The client reads its built-in inertial sensors to obtain measurements or other sensing information. The system's core engine, running on the client, can infer the moving distance and orientation from the measurements and incorporate them together to track the client's continuous locations.

The right part of FIG. 1 shows the system's work flow on a mobile client. After the system performs distance estimation and orientation estimation, the system fuses the estimated moving distance and the estimated moving direction into a map-augmented tracking module. In some embodiments, the system takes the indoor map as input and transforms it into a weighted graph. The output graph is then fed into a novel Graph-based Particle Filter (GPF), which leverages the geometric constraints imposed by the map and jointly learns the accurate 2D location and orientation of a target when it moves. The location estimates are then displayed to users together with the map. Since the disclosed GPF only uses an ordinary indoor map (e.g., an image of the floorplan), it can easily scale to massive buildings with few costs.

Figure 2:
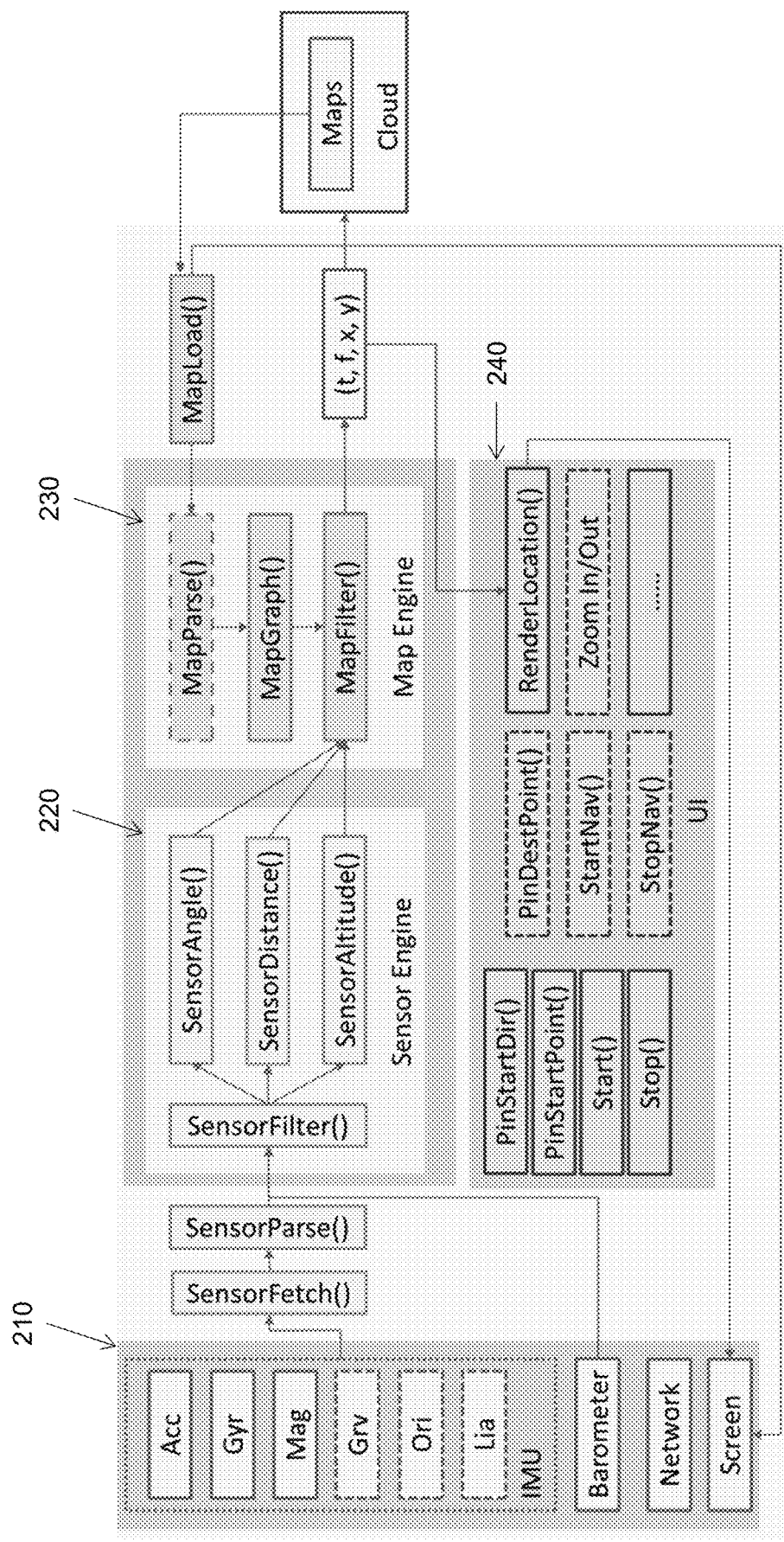
FIG. 2 illustrates a diagram showing operations performed by a movement tracking system using IMU, according to some embodiments of the present disclosure.

FIG. 2 illustrates a diagram showing operations performed by a movement tracking system using IMU, according to some embodiments of the present disclosure. As shown in FIG. 2, the system includes a sensor block 210, a sensor engine 220, a map engine 230, and a UI 240.

The sensor block 210 may include IU sub-block and barometer (for altitude estimation). The IMU can measure any one of the following: Acc—acceleration, Gyr—gyroscope reading, Mag—magnetometer reading, Grv—gravity reading, Ori—orientation reading.

In some embodiments, there may be several functions between the IN/U and the sensor engine 220. For example, a SensorFetch( ) may be performed by the system to fetch sensor readings to the sensor engine 220; a SensorParse( ) may be performed by the system to parse sensor readings.

In some embodiments, the sensor engine 220 may perform several functions to estimate parameters related to movement. For example, the sensor engine 220 may perform a function of SensorFilter( ) to filter noisy reading; and perform functions of SensorAngle( ), SensorDistance( ), SensorAltitude( ) based on sensor readings to estimate the moving distance, moving angle, and altitude, respectively.

In some embodiments, the map engine 230 may correct any location error based on particle filtering. For example, the map engine 230 may perform a function of MapParse( ) to parse map data uploaded in cloud; perform a function of MapGraph( ) to turn map to graph; and perform a function of MapFilter( ) to construct map-based graph particle filtering.

The UI block 240 may be used for displaying real-time location of the monitored moving object.

Figure 3:
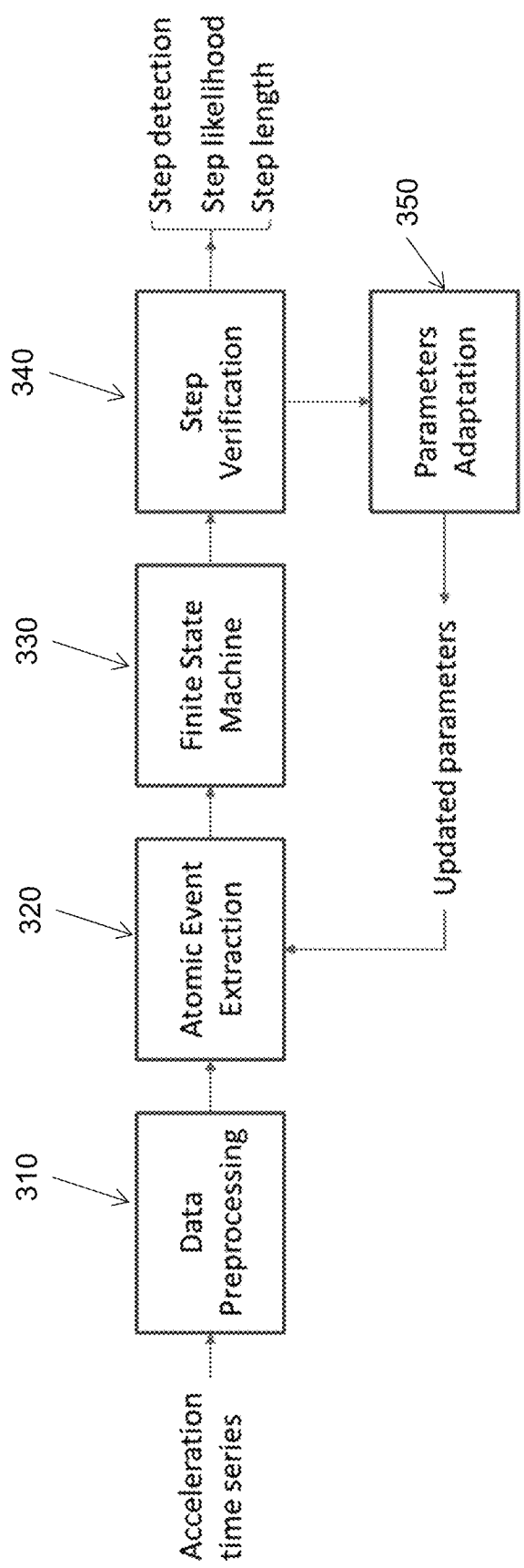
FIG. 3 illustrates a work flow for a sensor engine in a movement tracking system, according to some embodiments of the present disclosure.

FIG. 3 illustrates a work flow for a sensor engine in a movement tracking system, e.g. the sensor engine 220 in FIG. 2, according to some embodiments of the present disclosure. As shown in FIG. 3, after obtaining acceleration time series from IMU, the sensor engine may perform data preprocessing 310 and atomic event extraction 320 to transform preprocessed accelerations into atomic events.

Figure 4:
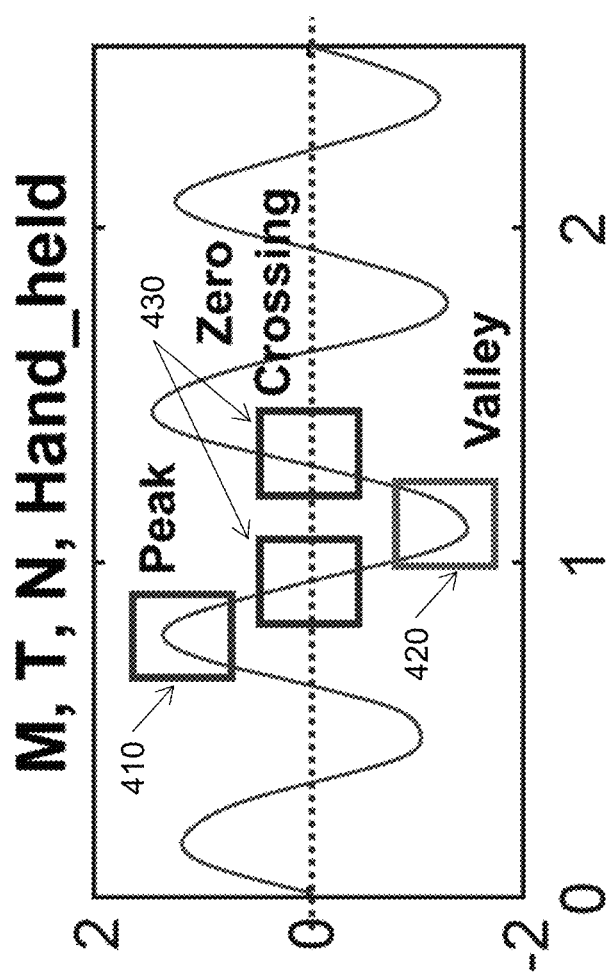
FIG. 4 illustrates exemplary atomic events extracted by a sensor engine in a movement tracking system, according to some embodiments of the present disclosure.

FIG. 4 illustrates exemplary atomic events extracted by a sensor engine in a movement tracking system, according to some embodiments of the present disclosure. As shown in FIG. 4, three basic atomic events can be defined as peak, valley, zero-crossing, respectively. A peak event 410 happens at a local maximum of a processed acceleration data. A valley event 420 happens at a local minimum of a processed acceleration data. A zero-crossing event 430 happens at a zero point crossing the processed acceleration data, either from negative to positive or from positive to negative.

Figure 5:
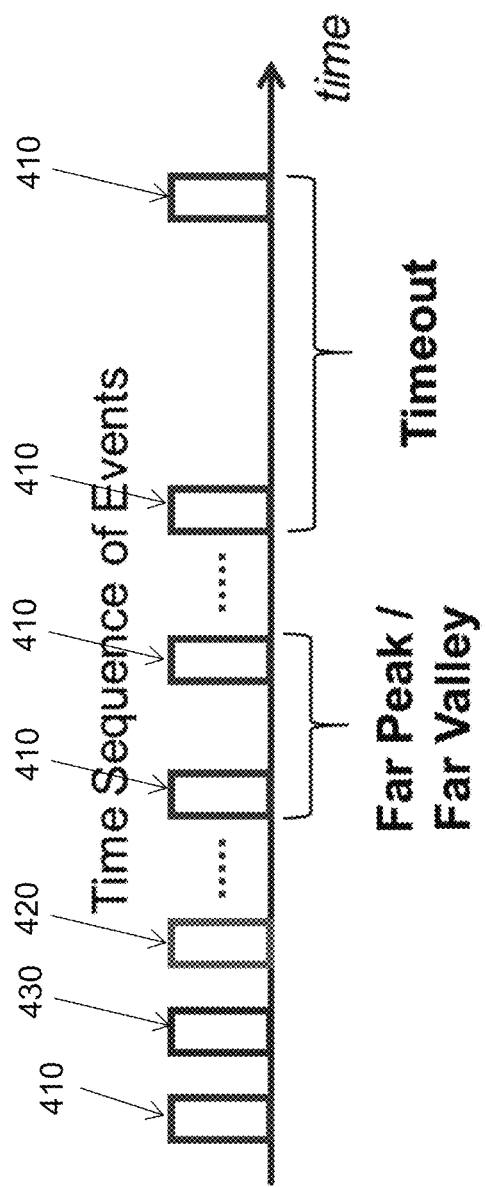
FIG. 5 illustrates exemplary temporal constraints for extracted atomic events, according to some embodiments of the present disclosure.

In some embodiments, the three extended atomic events are further defined by considering temporal constraints: far_peak, far_valley, time_out. FIG. 5 illustrates exemplary temporal constraints for extracted atomic events, according to some embodiments of the present disclosure.

Referring back to FIG. 3, the sensor engine may use a Finite State Machine (FSM) 330 to characterize the acceleration transitions during a step cycle. A normal human walking cycle, albeit varying over individuals and speeds, submits to a typical template viewed from the inertial data. A step cycle includes two phases: the stance and swing phases, which can be further decomposed into seven stages. The stance phase starts with the initial heel contact of one foot and ends when the same foot's toe leaves off the ground. The swing phase follows immediately with the action of the leg swinging forward and lasts until next heel contact. Intuitively, a stride cycle includes two steps, and the stride length is accordingly defined. In one embodiment, one does not differentiate two consecutive steps and thus calculates the step length as stride length, which is, on average, half of the commonly defined stride length. Ideally, during a step, the acceleration induced by walking motion will first increase to a large value; then decreases down to negative values, and finally returns to approximately zero.

Figure 6:
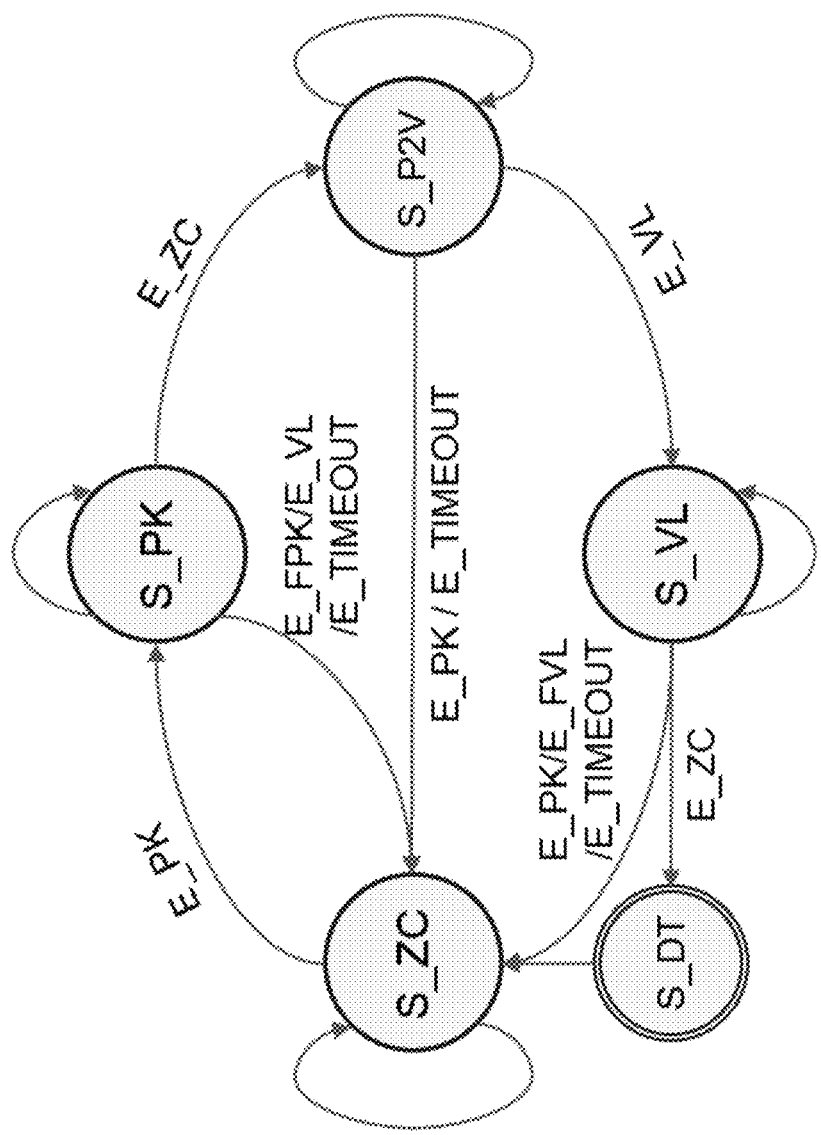
FIG. 6 illustrates an example of a Finite State Machine (FSM) for step detection, according to some embodiments of the present disclosure.

FIG. 6 illustrates an example of a Finite State Machine (FSM) for step detection, according to some embodiments of the present disclosure. As shown in FIG. 6, the FSM contains five different states: S_ZC: the initial and default state when a zero-crossing is detected; S_PK: the state when the acceleration tops a peak; S_P2V: the state that a zero-crossing occurs when the acceleration decreases from the peak to a potential valley; S_VL: the state at an acceleration valley; S_DT: the state that a step is claimed.

To determine the state transition, one can define six basic events, which are all identifiable from the inertial sensor data: E_PK: a peak is detected; E_VL: a valley is detected; E_ZC: a zero-crossing is observed; E_FPK: a far peak is detected after a previous E_PK event without any intermediate events, but with a large time difference exceeding a threshold; E_FVL: a valley similarly defined as E_FPK; E_TIMEOUT: a timeout event will trigger if the FSM stays on one state for too long.

The first three events characterize the key properties of acceleration patterns during walking, while the latter three are derived from the first three coupling with time information to combat noises and non-walking motion interference.

Figure 7:
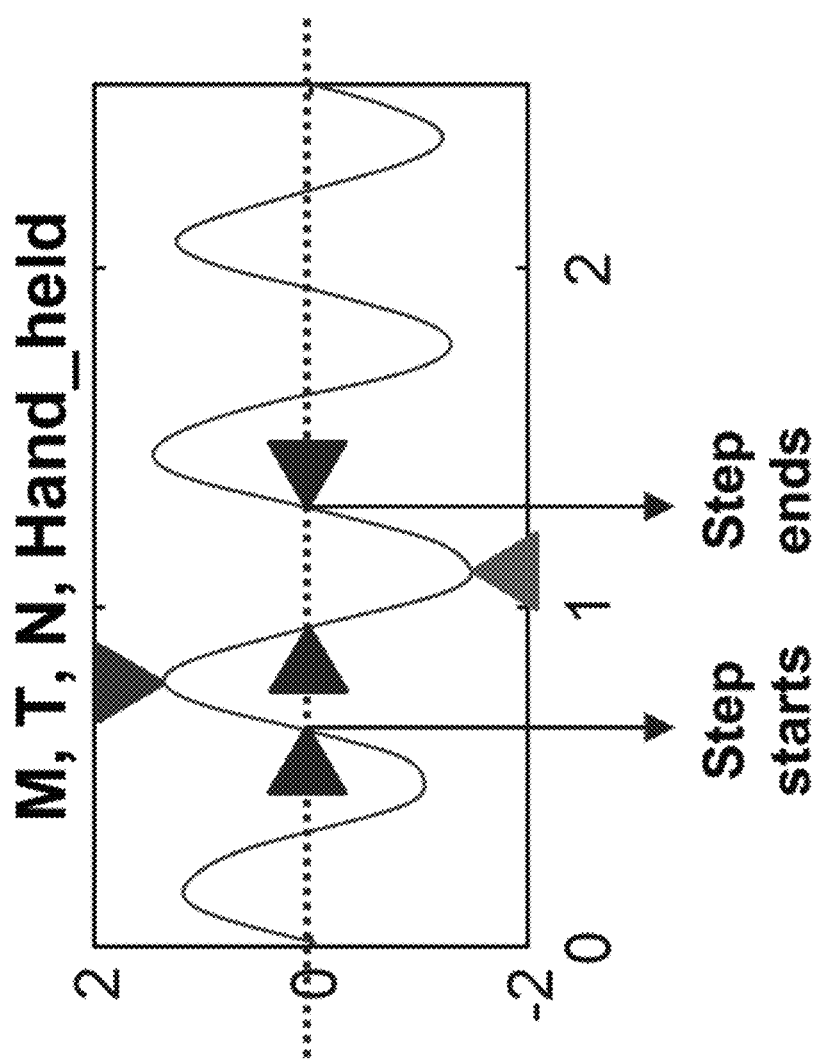
FIG. 7 illustrates an example of a step on sensing information based on step detection, according to some embodiments of the present disclosure.

In some embodiments, by default, the algorithm stays on its current state until an event occurs, depending on which it will either transit to another state or remains unchanged. Each state only transits upon the specific events as marked in FIG. 6. All the states except for the default S_ZC is associated with a timeout event. State S_DT will return to S_ZC with any new data arriving. E_FPK and E_FVL are introduced to handle the cases of two consecutive peaks or valleys caused by noisy sensor readings and user motion interference. For example, if a subsequent peak is too close to a former one, the algorithm will treat it as distortion during walking and keep the same state; otherwise, it is more like random motion, and the state is reset to S_ZC. The design of the algorithm achieves many strong sides. For each detected step, the algorithm outputs the timing information of the detected step: The time point of the corresponding S_ZC is the starting time, while the time it enters S_DT implies the ending time. FIG. 7 illustrates an example of a step on the processed acceleration data curve, including a starting time and an ending time of the step based on step detection using the FSM.

The algorithm is efficient, with only a few states. It decomposes the relatively noisy sensor readings as several essential events, which can be identified without relying on many subject-dependent parameters, such that it does not heavily rely on the absolute accelerations.

In some embodiments, the raw sensor data are processed into a series of events-of-interests as inputs for the above FSM. A key challenge here, however, is that the ideal acceleration pattern of a step will greatly vary over different walking patterns and device locations (e.g., hand-held, in the pocket, or the backpack, etc.). Moreover, the sensor data is noisy and could drift over time. To handle various sensor patterns, one can perform a series of preprocessing steps. The accelerometer reports 3D sensor values along its x-axis, y-axis, and z-axis for every sample, denoted as $a=(a_x, a_y, a_z)$. The reported accelerations are in the device frame (rather than the earth's frame) and contain both motion-induced and gravity-forced components. One may need to compensate for gravity and transform the accelerations into the earth's reference frame. Fortunately, modern IMUs have done an excellent job in extracting the gravity component as a fusion sensor (usually named as gravity sensor) based on the accelerometer and gyroscope or magnetometer, which reports a gravity vector $g=(g_x, g_y, g_z)$. Thus, one can easily obtain the magnitude of the projected acceleration free of sensor orientation as:

$$a = \frac{a \cdot g}{\|g\|}.$$

Given a time series of the acceleration magnitude, denoted as $A=[a(t_1), a(t_2), \ldots, a(t_M)]$ where $a(t_i)$ is the reading at time $t_i$, one can further detrend the gravity and potential sensor drifting by removing the moving average trend. Since one may not need to process the data online for stride length estimation, one can employ a relatively long window of 2 s to calculate the moving average. Afterward, one can further smooth the detrended data with a window of 0.25 s.

Then one can perform zero-crossing and peak detection to identify all the events-of-interests from the data series (valley detection is done in the same way as peak detection by multiplying the data by −1). The processing results in a time series of events, denoted as $E=[e(t_1), e(t_2), \ldots, e(t_Q)]$ where $e(t_i) \in \{E\_PK, E\_VL, E\_ZC\}$ is the event occurs at time $t_i$. The events are sparse over the time series A since typically there are three E_ZC, one E_PK, and one E_VL within a standard step. This event series is then fed into the FSM for step detection. The other three events, i.e., E_FPK, E_FVL, E_TIMEOUT, are detected inside the FSM by examining timestamps of two consecutive E_PK, E_VL and the duration of the state itself, respectively. For example, an E_FPK occurs if $e(t_{i-1})=e(t_i)=$E_PK and $|t_i-t_{i-1}|>$th$_{max\_gap}$, where th$_{max\_gap}$ indicates a threshold that can be determined by human walking behavior. By involving events (that is, specific relative patterns in the acceleration series) rather than absolute acceleration thresholds, the disclosed FSM is more generalized and robust to different walking patterns and sensor locations.

Referring back to FIG. 3, the sensor engine further performs step verification 340 after step detection using the FSM. In some embodiments, additional constraints are applied to validate a true step. In one example, from step detection, the system can have the step start time $t_s$, end time $t_e$, and the time series of the acceleration data A, and the corresponding peak and valley information. The system may compute step energy as $G=\Sigma_{t=t_s}^{t_e}|A(t)|dt$, and step residual as $R=\Sigma_{t=t_s}^{t_e}A(t)dt$. The verification result may be denoted with step likelihood l with k=0 for a false step. The step length $\Delta d=\Delta d_0*l$, where $\Delta d_0$ is a default value.

After step verification 340, the system can generate step detection result, step likelihood and step length. In some embodiments, a walking detection may be performed, e.g. after the step verification. In some embodiments, the user status is detected as walking if continuous steps are observed. Otherwise, the user status will be switched to non-walking status. If the time point of one step with that of a previous step is within a maximum pause gap, then the steps are considered continuous. The walking status may be enabled if there are multiple continuous steps. The number of continuous step will be reset to 0 once the walking status is disabled. The walking status will be enabled when the very first step is detected.

As shown in FIG. 3, the sensor engine further performs parameters adaptation 350 after step verification. Parameters used for step counting and step length estimation may be dynamically adapted and personalized for individual users. With more data accumulated for a user, the model will be more accurate and reliable. In some embodiments, the parameters are adapted in an online manner with real-time streaming data. In some embodiments, denoting n as the number of steps observed, the mean step time may be updated based on: $\overline{\Delta t}(n)=\overline{\Delta t}(n-1)+(\Delta t(n)-\overline{\Delta t}(n-1))/n$. The mean values for peak_height, valley_height, step_energy, and step_residual can be updated similarly. The variance of step time can be updated based on:

$$M_2(n) = (\Delta t(n) - \mu_{\Delta t}(n))^2 * \frac{n}{n-1}; \sigma^2_{\Delta t}(n) = \frac{M_2(n)}{n}.$$

The variances of peak_height, valley_height, step_energy, and step_residual can be updated similarly. To adapt to the most recent user behavior, the algorithm may only consider the recent N steps, i.e., n=1 if n>N. New atomic events may be extracted based on the updated parameters to further track the latest object movement.

In some embodiments, the system can estimate moving direction based on a given initial direction θ(0) and calculate the direction changes from gyroscope data. In some embodiments, the gyroscope readings are first projected onto the earth reference frame, and then only the direction changes in the XY plane are considered. The direction at time t is thus estimated as $\theta(t)=\theta(0)+\int_0^t \delta(t)dt$. Although errors would accumulate over time, they will be mitigated later in the map engine 230.

In some embodiments, the system can also perform altitude estimation. The altitude changes can be detected to infer floor change. In some embodiments, the system can estimate the altitude information from the barometer data. A barometer is a scientific instrument that is used to measure the atmospheric pressure in a certain environment. In one example, at low altitudes above sea level, the pressure decreases by about 1.2 kPa for every 100 meters. A barometer is available as a low-cost sensor on modern smartphones. Although a barometer may be inadequate for absolute altitude estimation, it is sufficient for height change detection, e.g. to estimate floor transition of a moving object.

Referring back to FIG. 2, the map engine 230 may compare the moving distance within a certain window estimated by the map engine 230 and a moving distance estimated by the raw outputs of the sensor engine 220. If the two distances are too different, it is likely that the map engine 230 gets stuck at some point. When such situation is detected, the map engine 230 can increase the searching region for potential particles, iteratively for each moving step, until the region reaches a predefined maximum value. By doing so, the map engine 230 would have better probability to survive under various scenarios.

Figure 8:
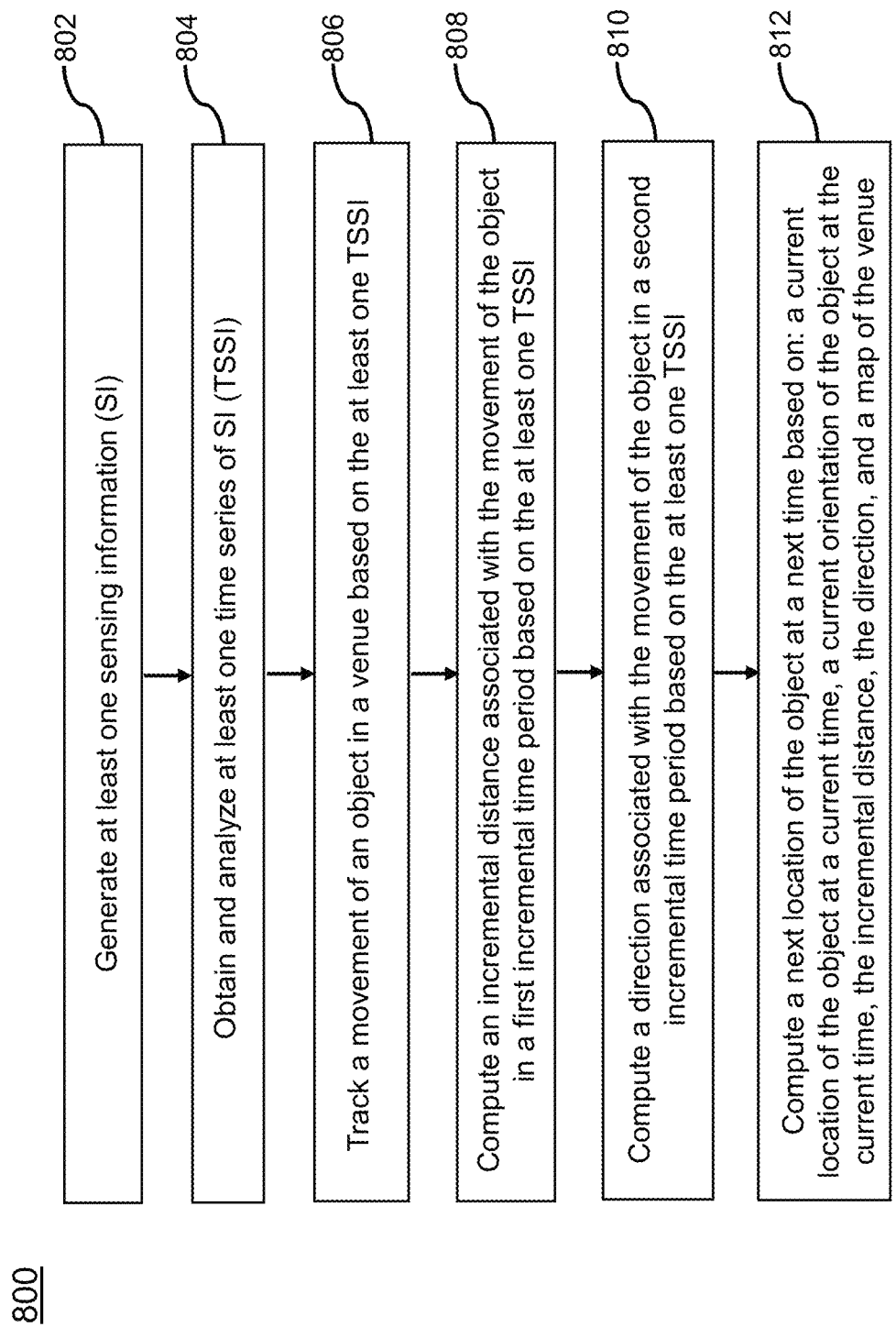
FIG. 8 illustrates a flow chart of an exemplary method for movement tracking, according to some embodiments of the present disclosure.

FIG. 8 illustrates a flow chart of an exemplary method 800 for movement tracking based on a sensor, according to some embodiments of the present disclosure. In various embodiments, the method 800 can be performed by the systems disclosed above. At operation 802, at least one sensing information (SI) is generated, e.g. by a sensor. At operation 804, at least one time series of SI (TSSI) is obtained, e.g. from the sensor, and analyzed by a processor, which may be communicatively and/or physically coupled to the sensor. At operation 806, a movement of an object in a venue is tracked based on the at least one TSSI. In some embodiments, the sensor may be physically coupled to the object. At operation 808, an incremental distance associated with the movement of the object in a first incremental time period is computed based on the at least one TSSI. At operation 810, a direction associated with the movement of the object in a second incremental time period is computed based on the at least one TSSI. At operation 812, a next location of the object at a next time is computed based on: a current location of the object at a current time, a current orientation of the object at the current time, the incremental distance, the direction, and a map of the venue. The order of the operations in FIG. 8 may be changed according to various embodiments of the present teaching.

The following numbered clauses provide implementation examples for movement tracking.

Clause 1. A tracking system/method/device/software, comprising: at least one sensor capable of generating at least one sensing information (SI); a processor communicatively coupled with a memory and the at least one sensor; the memory; a set of instructions stored in the memory which, when executed by the processor, cause the processor to: obtaining at least one time series of SI (TSSI) from the at least one sensor, analyzing the at least one TSSI, tracking a movement of an object in a venue based on the at least one TSSI, computing an incremental distance associated with the object movement in an incremental time period and a direction associated with the object movement in another incremental time period based on the at least one TSSI, and computing a next location of the object at a next time based on at least one of: a current location of the object at a current time, a current orientation of the object at the current time, the incremental distance, the direction, or a map of the venue.

In some embodiments, the object may be a human or a smart device with sensor(s) (e.g. IMU). The movement of the object may be the human walking or running. The sensor may be an inertial measurement unit (IMU), accelerometer, gyroscope, magnetometer, or barometer. Accelerometer may give acceleration which may be analyzed to yield "steps" or "stride". Gyroscope may give direction/orientation. Magnetometer may be used to improve accuracy of direction. Barometer may be used to determine if user is moving up or down stairs.

Clause 2. The tracking system/method/device/software of clause 1: wherein the at least one sensor comprises at least one of: inertial measurement unit (IMU), accelerometer, gyroscope, magnetometer, or barometer; wherein the at least one SI comprises at least one of: force, acceleration, acceleration force, acceleration in instantaneous rest frame, orientation, angle, angular velocity, an angle, magnetic field direction, magnetic field strength, magnetic field change, or air pressure.

Clause 3. The tracking system/method/device/software of clause 1, wherein the motion direction associated with the object motion in the another incremental time period is computed based on at least one of: a SI from a gyroscope, a SI from a magnetometer, at least one directions in the another incremental time period, a direction before the another incremental time period, a direction after the another incremental time period, a direction associated with a beginning of the another incremental time period, a direction associated with an end of the another incremental time period, a direction of the motion at the current time, a direction of the motion at the next time, a direction of the motion at another time, a weighted average of more than one directions associated with the another incremental time period, or a median of more than one directions associated with the another incremental time period.

Clause 4. The tracking system/method/device/software of clause 1, further comprising the set of instructions causing the processor to: determining an underlying rhythmic motion associated with the object movement; identifying a rhythmic behavior of the at least one TSSI associated with the underlying rhythmic motion; tracking the movement of the object based on the rhythmic behavior of the TSSI; computing the incremental distance based on the rhythmic behavior of the TSSI.

Clause 5. The tracking system/method/device/software of clause 4, further comprising: computing a time series of intermediate quantity (IQ) based on the at least one TSSI; identifying another rhythmic behavior of the time series of IQ (TSIQ) associated with the underlying rhythmic motion; tracking the movement of the object based on the another rhythmic behavior of the TSIQ; computing the incremental distance based on the another rhythmic behavior of the TSIQ.

Clause 6. The tracking system/method/device/software of clause 5, further comprising the set of instructions causing the processor to: identifying a time window of stable rhythmic behavior of the at least one TSSI or the TSIQ associated with stable underlying rhythmic motion associated with the object movement; adding a time stamp to the time window if at least one of the following is satisfied: a weighted average of the IQ in a sliding window around the time stamp is greater than a first threshold, a feature of an autocorrelation function of IQ around the time stamp is greater than a second threshold, and another criterion associated with the time stamp.

Clause 7. The tracking system/method/device/software of clause 5, further comprising the set of instructions causing the processor to: identifying at least one local characteristic point of IQ in a time window, wherein the local characteristic point comprises at least one of: local maximum, local minimum, zero crossing of IQ from positive to negative, zero crossing of IQ from negative to positive, segmenting the time window into at least one segment based on time stamps associated with the at least one local characteristic points, each segment spanning from a local characteristic point to another local characteristic point, and identifying at least one of: complete cycle, rhythm cycle, compound cycle, extended cycle, double cycle, quad cycle, partial cycle, half cycle, quarter cycle, gait cycle, stride cycle, step cycle, or hand cycle.

Clause 8. The tracking system/method/device/software of clause 5, further comprising the set of instructions causing the processor to: computing a time series of mean-subtracted IQ (MSIQ) by subtracting a time series of local means from the TSIQ, wherein the local means are obtained by applying a moving average filter to the TSIQ, segmenting the time series of MSIQ (TSMSIQ) in a time window into at least one preliminary segments comprising MSIQ with same polarity, identifying at least one local characteristic point of MSIQ of each preliminary segments, wherein the local characteristic point comprises at least one of: local maximum, local minimum, reflection point, zero crossing of MSIQ from positive to negative, zero crossing of MSIQ from negative to positive, centroid of preliminary segments, median, first quartile, third quartile, percentile, or mode, segmenting the TSMSIQ into at least one segment based on the at least local characteristic point, and identifying at least one of: complete cycle, rhythm cycle, compound cycle, extended cycle, double cycle, quad cycle, partial cycle, half cycle, quarter cycle, gait cycle, stride cycle, step cycle, or hand cycle.

Clause 9. The tracking system/method/device/software of clause 7 or 8, further comprising the set of instructions causing the processor to: identifying a complete cycle of the TSIQ (or the TSMSIQ or a TSSI) as at least one of: a first time period from a first local maximum of the TSIQ (or the TSMSIQ or the TSSI) to a second local maximum of the TSIQ (or the TSMSIQ or the TSSI), a second time period from a first local maximum of the TSIQ (or the TSMSIQ or the TSSI) to a local minimum of the TSIQ (or the TSMSIQ or the TSSI) to a second local maximum of the TSIQ (or the TSMSIQ or the TSSI), a third time period from a first local maximum of the TSIQ (or the TSMSIQ or the TSSI) to a zero crossing of the TSIQ (or the TSMSIQ or the TSSI) to a second local maximum of the TSIQ (or the TSMSIQ or the TSSI), a fourth time period from a first local minimum of the TSIQ (or the TSMSIQ or the TSSI) to a second local minimum of the TSIQ (or the TSMSIQ or the TSSI), a fifth time period from a first local minimum of the TSIQ (or the TSMSIQ or the TSSI) to a local maximum of the TSIQ (or the TSMSIQ or the TSSI) to a second local minimum of the TSIQ (or the TSMSIQ or the TSSI), a sixth time period from a first local minimum of the TSIQ (or the TSMSIQ or the TSSI) to a zero crossing of the TSIQ (or the TSMSIQ or the TSSI) to a second local minimum of the TSIQ (or the TSMSIQ or the TSSI), a seventh time period from a first zero crossing of the TSIQ (or the TSMSIQ or the TSSI) to a local maximum of the TSIQ (or the TSMSIQ or the TSSI) to a second zero crossing of the TSIQ (or the TSMSIQ or the TSSI) to local minimum of the TSIQ (or the TSMSIQ or the TSSI) to a third zero crossing of the TSIQ (or the TSMSIQ or the TSSI), a eighth time period from a first zero crossing to a local minimum to a second zero crossing to local maximum to a third zero crossing, a ninth time period from a first negative-to-positive zero crossing to a positive-to-negative zero crossing to a second negative-to-positive zero crossing, a tenth time period from a first positive-to-negative zero crossing to a negative-to-positive zero crossing to a second positive-to-negative zero crossing, or a cycle of a oscillatory behavior.

Clause 10. The tracking system/method/device/software of clause 9, further comprising the set of instructions causing the processor to: recognizing the complete cycle based on a finite-state machine (FSM) with local characteristic points as input for state transitions.

Clause 11. The tracking system/method/device/software of clause 9, further comprising the set of instructions causing the processor to perform at least one of the following: identifying a rhythm cycle as a complete cycle, identifying a compound cycle as more than one complete cycles, identifying an extended cycle as more than one complete cycles, identifying a double cycle as two consecutive cycles, identifying a quad cycle as four consecutive cycles, identifying a partial cycle as identifying at least two local characteristic points matching at least one of: the first time period, the second time period, the third time period, the fourth time period, the fifth time period, the sixth time period, the seventh time period, the eighth time period, the ninth time period, the tenth time period, or the cycle of the oscillatory behavior, identifying a step cycle as a complete cycle, recognizing a stride cycle as a double cycle, recognizing a gait cycle as either a step cycle or a stride cycle, recognizing a hand cycle as either a complete cycle or a double cycle, 12. The tracking system/method/device/software of clause 7 or 8 further comprising the set of instructions causing the processor to: computing at least one cycle feature based on at least one of: the IQ in the time window, the at least one local characteristic point of IQ, the at least one segment or the at least one cycle.

Clause 13. The tracking system/method/device/software of clause 12: wherein the at least one cycle feature to comprise at least one of the following gait-speed-related features: at least one gait speed each being associated with a time stamp in the time window, wherein the gait speed is preprocessed, at least one mean speed each being associated with a time stamp in the time window and being at least one of: an average, a weighted average and a trimmed mean, of gait speed within a subwindow around the time stamp, at least one maximum speed each being associated with a time stamp in the time window and being maximum of gait speed within a subwindow around the time stamp, at least one minimum speed each being associated with a time stamp in the time window and being minimum of gait speed within a subwindow around the time stamp, at least one speed variance each being associated with a time stamp in the time window and being variance of gait speed within a subwindow around the time stamp, at least one speed deviation each being associated with a time stamp in the time window and being a X-percentile of a sample distribution of mean-subtracted speed in a subwindow of the time window around the time stamp, wherein the mean-subtracted speed is the gait speed minus the mean speed and X is a number between 0 and 100, at least one maximum positive speed deviation each being associated with a time stamp and being the maximum of mean-subtracted speed in a subwindow of the time window around the time stamp, and at least one maximum negative speed deviation each being associated with a time stamp and being the maximum of negative of mean-subtracted speed in a subwindow of the time window around the time stamp, at least one speed peak variance each being associated with a time stamp and being variance of at least one local peak (local maximum) of gait speed in a subwindow of the time window around the time stamp, at least one speed valley variance each being associated with a time stamp and being variance of at least one local valley (minimum) of gait speed in a subwindow of the time window around the time stamp, at least one speed ACF k-th peak each being associated with a time stamp and being a k-th local peak of an autocorrelation function (ACF) of gait speed at the time stamp, wherein k is a positive integer, at least one mean speed ACF k-th peak each being associated with a time stamp and being at least one of: an average, a weighted average and a trimmed mean, of speed ACF k-th peak in a subwindow of the time window around the time stamp, at least one speed ACF k-th peak variance each being associated with a time stamp and being variance of speed ACF k-th peak in a subwindow of the time window around the time stamp, at least one speed ACF k-th peak-difference each being associated with a time stamp and being difference of k-th local peak and (k−1)-th local peak of ACF of gait speed, at the time stamp, wherein k is a positive integer, at least one mean speed ACF k-th peak-difference each being associated with a time stamp and being at least one of: an average, a weighted average and a trimmed mean, of speed ACF k-th peak-difference in a subwindow of the time window around the time stamp, at least one speed ACF k-th peak-difference variance each being associated with a time stamp and being variance of speed ACF k-th peak-difference in a subwindow of the time window around the time stamp, at least one speed ACF peak-count each being associated with a time stamp and being a count of speed ACF significant peak at the time stamp, at least one mean speed ACF k-th peak-difference each being associated with a time stamp and being at least one of: an average, a weighted average and a trimmed mean, of speed ACF peak-count in a subwindow of the time window around the time stamp, at least one speed ACF k-th peak-difference variance each being associated with a time stamp and being variance of speed ACF peak-count in a subwindow of the time window around the time stamp, at least one speed ACF peak-count-pdf each being associated with a time stamp and being a sample probability of speed ACF peak-count being k in a subwindow of the time window around the time stamp, where k is a non-negative integer, at least one recurrent plot (RP) each being associated with a time stamp and being a 2-dimensional plot of R(i,j), wherein both i and j are running time index in a subwindow of the time window around the time stamp, wherein R(i,j) is a scalar similarity function of a first feature vector at time i and a second feature vector at time j, wherein each of first feature vector and second feature vectors is a feature vector at a time t comprising at least one gait feature in a sliding subwindow of the time window around time t, at least one recurrent plot (RP) feature each being associated with a time stamp and comprise at least one of: recurrence rate, determinism, entropy, average diagonal line and another RP feature, at least one scaled speed-peak ACF each being a speed ACF associated with a time stamp of a local peak (local maximum) of gait speed in a subwindow of the time window, the speed ACF being scaled such that its first peak occurs at a selected time lag, at least one scaled peak ACF feature each a feature of the at least one scaled speed-peak ACF, wherein a subwindow is at least one of: the whole time window, a sliding window, at least one gait cycle, at least one step segment and another subwindow, at least one harmonic ratio each being associated with a gait cycle and being a ratio of sum of amplitude of even harmonics of Fourier transform of gait speed in the gait cycle to sum of amplitude of odd harmonics of the Fourier transform of gait speed in the gait cycle, at least one harmonic feature each being associated with a gait cycle and being computed based on a function of even terms of a frequency transform of gait speed in the gait cycle and on the function of odd terms of the frequency transform, at least one generalized harmonic feature each being associated with a gait cycle and being computed based on a first function of even terms of a transform of a gait feature in the gait cycle and a second function of odd terms of the transform of the gait feature, a function of at least one of the above features, and a function of another feature.

Clause 14. The tracking system/method/device/software of clause 12: wherein the at least one cycle feature to comprise at least one of the following gait-acceleration-related features: at least one gait speed each being associated with a time stamp in the time window, at least one gait acceleration each being associated with a time stamp in the time window and being a derivative of gait speed, at least one mean acceleration each being associated with a time stamp in the time window and being at least one of: an average, a weighted average and a trimmed mean, of gait acceleration in a subwindow of the time window around the time stamp, at least one maximum acceleration each being associated with a time stamp in the time window and being a maximum of gait acceleration in a subwindow of the time window around the time stamp, at least one minimum acceleration each being associated with a time stamp in the time window and being a minimum of gait acceleration in a subwindow of the time window around the time stamp, at least one acceleration variance each being associated with a time stamp in the time window and being a variance of gait acceleration in a subwindow of the time window around the time stamp, at least one acceleration deviation each being associated with a time stamp in the time window and being a X-percentile of a sample distribution of mean-subtracted acceleration in a subwindow of the time window around the time stamp, wherein the mean-subtracted acceleration is the gait acceleration minus the mean acceleration and X is a number between 0 and 100, at least one maximum acceleration deviation each being associated with a time stamp and being the maximum of mean-subtracted acceleration in a subwindow of the time window around the time stamp, and at least one maximum negative acceleration deviation each being associated with a time stamp and being the maximum of negative of mean-subtracted acceleration in a subwindow of the time window around the time stamp, at least one acceleration peak variance each being associated with a time stamp and being variance of at least one local peak (local maximum) of gait acceleration in a subwindow of the time window around the time stamp, at least one acceleration valley variance each being associated with a time stamp and being variance of at least one local valley (local minimum) of gait acceleration in a subwindow of the time window around the time stamp, at least one acceleration ACF k-th peak each being associated with a time stamp and being a k-th local peak of an autocorrelation function (ACF) of gait acceleration, at the time stamp, wherein k is a positive integer, at least one mean acceleration ACF k-th peak each being associated with a time stamp and being at least one of: an average, a weighted average and a trimmed mean, of acceleration ACF k-th peak in a subwindow of the time window around the time stamp, at least one acceleration ACF k-th peak variance each being associated with a time stamp and being variance of acceleration ACF k-th peak in a subwindow of the time window around the time stamp, at least one acceleration ACF k-th peak-difference each being associated with a time stamp and being difference of k-th local peak and (k−1)-th local peak of ACF of gait acceleration, at the time stamp, wherein k is a positive integer, at least one mean acceleration ACF k-th peak-difference each being associated with a time stamp and being at least one of: an average, a weighted average and a trimmed mean, of acceleration ACF k-th peak-difference in a subwindow of the time window around the time stamp, at least one acceleration ACF k-th peak-difference variance each being associated with a time stamp and being variance of acceleration ACF k-th peak-difference in a subwindow of the time window around the time stamp, at least one acceleration ACF peak-count each being associated with a time stamp and being a count of acceleration ACF significant peak at the time stamp, at least one mean acceleration ACF k-th peak-difference each being associated with a time stamp and being at least one of: an average, a weighted average and a trimmed mean, of acceleration ACF peak-count in a subwindow of the time window around the time stamp, at least one acceleration ACF k-th peak-difference variance each being associated with a time stamp and being variance of acceleration ACF peak-count in a subwindow of the time window around the time stamp, at least one acceleration ACF peak-count-pdf each being associated with a time stamp and being a sample probability of acceleration ACF peak-count being k in a subwindow of the time window around the time stamp, where k is a non-negative integer, at least one recurrent plot (RP) each being associated with a time stamp and being a 2-dimensional plot of $R(i,j)$, wherein both i and j are running time index in a subwindow of the time window around the time stamp, wherein $R(i,j)$ is a scalar similarity function of a first feature vector at time i and a second feature vector at time j, wherein each of first feature vector and second feature vectors is a feature vector at a time t comprising at least one gait feature in a sliding subwindow of the time window around time t, at least one recurrent plot (RP) feature each being associated with a time stamp and comprise at least one of: recurrence rate, determinism, entropy, average diagonal line and another RP feature, at least one scaled acceleration-peak ACF each being an acceleration ACF associated with a time stamp of a local peak (local maximum) of gait acceleration in a subwindow of the time window, the acceleration ACF being scaled such that its first peak occurs at a selected time lag, at least one scaled peak ACF feature each a feature of the at least one scaled acceleration-peak ACF, wherein a subwindow is at least one of: the whole time window, a sliding window, at least one gait cycle, at least one step segment and another subwindow, at least one harmonic ratio each being associated with a gait cycle and being a ratio of sum of amplitude of even harmonics of Fourier transform of gait acceleration in the gait cycle to sum of amplitude of odd harmonics of the Fourier transform, at least one harmonic feature each being associated with a gait cycle and being computed based on a function of even terms of a frequency transform of gait acceleration in the gait cycle and on the function of odd terms of the frequency transform, at least one generalized harmonic feature each being associated with a gait cycle and being computed based on a first function of even terms of a transform of a gait feature in the gait cycle and a second function of odd terms of the transform of the gait feature, a function of at least one of the above features, and a function of another feature.

Clause 15. The tracking system/method/device/software of clause 12: wherein the at least one gait feature to comprise at least one of the following step-related features: at least one gait speed each being associated with a time stamp in the time window, at least one step length each being associated with a time stamp in the time window and being an integration of gait speed over a respective step segment around the time stamp, at least one step period each being associated with a time stamp in the time window and being duration of a respective step segment around the time stamp, at least one step frequency each being associated with a time stamp in the time window and being inversely proportion to a respective step period around the time stamp, at least one step-wise mean speed each being associated with a time stamp in the time window and being at least one of: an average, a weighted average and a trimmed mean, of gait speed in a respective step segment around the time stamp, at least one step-wise max speed each being associated with a time stamp in the time window and being a maximum gait speed in a respective step segment around the time stamp, at least one step-wise min speed each being associated with a time stamp in the time window and being a minimum gait speed in a respective step segment around the time stamp, at least one step-wise speed variance each being associated with a time stamp in the time window and being a variance of gait speed in a respective step segment around the time stamp, at least one step-wise speed deviation each being associated with a time stamp in the time window and being a X-percentile of a sample distribution of mean-subtracted speed in a respective step segment around the time stamp, wherein the mean-subtracted speed is the gait speed minus a step-wise mean speed and X is a number between 0 and 100, at least one step-wise mean acceleration each being associated with a time stamp in the time window and being at least one of: an average, a weighted average and a trimmed mean, of gait acceleration in a respective step segment around the time stamp, wherein the gait acceleration is a derivative of gait speed, at least one step-wise max acceleration each being associated with a time stamp in the time window and being a maximum gait acceleration in a respective step segment around the time stamp, at least one step-wise min acceleration each being associated with a time stamp in the time window and being a minimum gait acceleration in a respective step segment around the time stamp, at least one step-wise acceleration variance each being associated with a time stamp in the time window and being a variance of gait acceleration in a respective step segment around the time stamp, at least one step-wise acceleration deviation each being associated with a time stamp in the time window and being a X-percentile of a sample distribution of mean-subtracted acceleration in a respective step segment around the time stamp, wherein the mean-subtracted acceleration is the gait acceleration minus the step-wise mean acceleration and X is a number between 0 and 100, at least one step statistics each being associated with a time stamp in the time window and being at least one of: step length, step period, step frequency, step-wise mean speed, step-wise max speed, step-wise min speed, step-wise speed variance, step-wise speed deviation, step-wise mean acceleration, step-wise max acceleration, step-wise min acceleration, step-wise acceleration variance, step-wise acceleration deviation, step-wise speed peak variance, step-wise speed valley variance, step-wise speed ACF k-th peak, step-wise mean speed ACF k-th peak, step-wise speed ACF k-th peak variance, step-wise speed ACF k-th peak-difference, step-wise mean speed ACF k-th peak-difference, step-wise speed ACF k-th peak-difference variance, step-wise speed ACF peak-count, step-wise mean speed ACF k-th peak-difference, step-wise speed ACF k-th peak-difference variance, step-wise speed ACF peak-count-pdf, step-wise recurrent plot (RP), step-wise recurrent plot (RP) feature, step-wise scaled speed-peak ACF, step-wise scaled peak ACF feature, step-wise harmonic ratio, step-wise harmonic feature, step-wise generalized harmonic feature, step-wise symmetry measure, a function of at least one of the above statistics, a function of another statistics, and a function of another step statistics, at least one mean step statistics each being associated with a time stamp in the time window and being at least one of: an average, a weighted average, and a trimmed mean, of the step statistics in a subwindow of the time window around the time stamp, at least one odd mean step statistics each being associated with a time stamp in the time window and being at least one of: an average, a weighted average, and a trimmed mean, of the step statistics of odd step segments in a subwindow of the time window around the time stamp, at least one even mean step statistics each being associated with a time stamp in the time window and being at least one of: an average, a weighted average, and a trimmed mean, of the step statistics of even step segments in a subwindow of the time window around the time stamp, at least one max step statistics each being associated with a time stamp in the time window and being a maximum of the step statistics in a subwindow of the time window around the time stamp, at least one odd max step statistics each being associated with a time stamp in the time window and being a maximum of the step statistics of odd step segments in a subwindow of the time window around the time stamp, at least one even max step statistics each being associated with a time stamp in the time window and being a maximum of the step statistics of even step segments in a subwindow of the time window around the time stamp, at least one min step statistics each being associated with a time stamp in the time window and being a minimum of the step statistics in a subwindow of the time window around the time stamp, at least one odd min step statistics each being associated with a time stamp in the time window and being a minimum of the step statistics of odd step segments in a subwindow of the time window around the time stamp, at least one even min step statistics each being associated with a time stamp in the time window and being a minimum of the step statistics of even step segments in a subwindow of the time window around the time stamp, at least one step statistics variance each being associated with a time stamp in the time window and being variance of step statistics in a subwindow of the time window around the time stamp, at least one odd step statistics variance each being associated with a time stamp in the time window and being variance of step statistics of odd step segments in a subwindow of the time window around the time stamp, at least one even step statistics variance each being associated with a time stamp in the time window and being variance of step statistics of even step segments in a subwindow of the time window around the time stamp, at least one step statistics deviation each being associated with a time stamp in the time window and being a X-percentile of a sample distribution of mean-subtracted step statistics in a subwindow of the time window around the time stamp, wherein the mean-subtracted step statistics of an odd step segment is the step statistics of the odd step segment minus odd mean step statistics and X is a number between 0 and 100, at least one odd step statistics deviation each being associated with a time stamp in the time window and being a X-percentile of a sample distribution of mean-subtracted step statistics of odd step segments in a subwindow of the time window around the time stamp, wherein the mean-subtracted step statistics of an odd step segment is the step statistics of the odd step segment minus odd mean step statistics and X is a number between 0 and 100, at least one even step statistics deviation each being associated with a time stamp in the time window and being a X-percentile of a sample distribution of mean-subtracted step statistics of even step segments in a subwindow of the time window around the time stamp, wherein the mean-subtracted step statistics of an even step segment is the step statistics of the even step segment minus even mean step statistics and X is a number between 0 and 100, at least one statistics of step statistics each being associated with a time stamp in the time window and being at least one of: mean step statistics, max step statistics, min step statistics, step statistics variance, step statistics deviation, and another statistics of step statistics, at least one odd statistics of step statistics each being associated with a time stamp in the time window and being at least one of: odd mean step statistics, odd max step statistics, odd min step statistics, odd step statistics variance, odd step statistics deviation, and another odd statistics of step statistics, at least one even statistics of step statistics each being associated with a time stamp in the time window and being at least one of: even mean step statistics, even max step statistics, even min step statistics, even step statistics variance, even step statistics deviation, and another even statistics of step statistics, a left step statistics, a right step statistics, a front left step statistics, a front right step statistics, a back left step statistics, a back right step statistics, a wavefront step statistics, an odd wavefront step statistics, an even wavefront step statistics, a ratio of even statistics of the step statistics and odd statistics of the step statistics, a difference of even statistics of the step statistics and odd statistics of the step statistics, a similarity measure of even statistics of the step statistics and odd statistics of the step statistics, a function of at least one of: statistics of step statistics, odd statistics of step statistics, and even statistics of step statistics, a ratio of a function of even statistics of the step statistics and a function of odd statistics of the step statistics, a first function of a second function of even statistics of the step statistics and a third function of odd statistics of the step statistics, and another statistics of the step statistics.

Clause 16. The tracking system/method/device/software of clause 12: wherein the at least one gait feature to comprise at least one of the following stride-related features: at least one gait speed each being associated with a time stamp in the time window, at least one stride length each being associated with a time stamp in the time window and being an integration of gait speed over a respective gait cycle around the time stamp, at least one stride period each being associated with a time stamp in the time window and being duration of a respective gait cycle around the time stamp, at least one stride frequency each being associated with a time stamp in the time window and being inversely proportion to a respective stride period around the time stamp, at least one stride-wise mean speed each being associated with a time stamp in the time window and being at least one of: an average, a weighted average and a trimmed mean, of gait speed in a respective gait cycle around the time stamp, at least one stride-wise max speed each being associated with a time stamp in the time window and being a maximum gait speed in a respective gait cycle around the time stamp, at least one stride-wise min speed each being associated with a time stamp in the time window and being a minimum gait speed in a respective gait cycle around the time stamp, at least one stride-wise speed variance each being associated with a time stamp in the time window and being a variance of gait speed in a respective gait cycle around the time stamp, at least one stride-wise speed deviation each being associated with a time stamp in the time window and being a X-percentile of a sample distribution of mean-subtracted speed in a respective gait cycle around the time stamp, wherein the mean-subtracted speed is the gait speed minus a stride-wise mean speed and X is a number between 0 and 100, at least one stride-wise mean acceleration each being associated with a time stamp in the time window and being at least one of: an average, a weighted average and a trimmed mean, of gait acceleration in a respective gait cycle around the time stamp, wherein the gait acceleration is a derivative of gait speed, at least one stride-wise max acceleration each being associated with a time stamp in the time window and being a maximum gait acceleration in a respective gait cycle around the time stamp, at least one stride-wise min acceleration each being associated with a time stamp in the time window and being a minimum gait acceleration in a respective gait cycle around the time stamp, at least one stride-wise acceleration variance each being associated with a time stamp in the time window and being a variance of gait acceleration in a respective gait cycle around the time stamp, at least one stride-wise acceleration deviation each being associated with a time stamp in the time window and being a X-percentile of a sample distribution of mean-subtracted acceleration in a respective gait cycle around the time stamp, wherein the mean-subtracted acceleration is the gait acceleration minus the stride-wise mean acceleration and X is a number between 0 and 100, at least one stride statistics each being associated with a time stamp in the time window and being at least one of: stride length, stride period, stride frequency, stride-wise mean speed, stride-wise max speed, stride-wise min speed, stride-wise speed variance, stride-wise speed deviation, stride-wise mean acceleration, stride-wise max acceleration, stride-wise min acceleration, stride-wise acceleration variance, stride-wise acceleration deviation, stride-wise speed peak variance, stride-wise speed valley variance, stride-wise speed ACF k-th peak, stride-wise mean speed ACF k-th peak, stride-wise speed ACF k-th peak variance, stride-wise speed ACF k-th peak-difference, stride-wise mean speed ACF k-th peak-difference, stride-wise speed ACF k-th peak-difference variance, stride-wise speed ACF peak-count, stride-wise mean speed ACF k-th peak-difference, stride-wise speed ACF k-th peak-difference variance, stride-wise speed ACF peak-count-pdf, stride-wise recurrent plot (RP), stride-wise recurrent plot (RP) feature, stride-wise scaled speed-peak ACF, stride-wise scaled peak ACF feature, stride-wise harmonic ratio, stride-wise harmonic feature, stride-wise generalized harmonic feature, stride-wise symmetry measure, a function of at least one of the above statistics, a function of another statistics, and a function of another stride statistics, at least one mean stride statistics each being associated with a time stamp in the time window and being at least one of: an average, a weighted average, and a trimmed mean, of the stride statistics in a subwindow of the time window around the time stamp, at least one odd mean stride statistics each being associated with a time stamp in the time window and being at least one of: an average, a weighted average, and a trimmed mean, of the stride statistics of odd gait cycles in a subwindow of the time window around the time stamp, at least one even mean stride statistics each being associated with a time stamp in the time window and being at least one of: an average, a weighted average, and a trimmed mean, of the stride statistics of even gait cycles in a subwindow of the time window around the time stamp, at least one max stride statistics each being associated with a time stamp in the time window and being a maximum of the stride statistics in a subwindow of the time window around the time stamp, at least one odd max stride statistics each being associated with a time stamp in the time window and being a maximum of the stride statistics of odd gait cycles in a subwindow of the time window around the time stamp, at least one even max stride statistics each being associated with a time stamp in the time window and being a maximum of the stride statistics of even gait cycles in a subwindow of the time window around the time stamp, at least one min stride statistics each being associated with a time stamp in the time window and being a minimum of the stride statistics in a subwindow of the time window around the time stamp, at least one odd min stride statistics each being associated with a time stamp in the time window and being a minimum of the stride statistics of odd gait cycles in a subwindow of the time window around the time stamp, at least one even min stride statistics each being associated with a time stamp in the time window and being a minimum of the stride statistics of even gait cycles in a subwindow of the time window around the time stamp, at least one stride statistics variance each being associated with a time stamp in the time window and being variance of stride statistics in a subwindow of the time window around the time stamp, at least one odd stride statistics variance each being associated with a time stamp in the time window and being variance of stride statistics of odd gait cycles in a subwindow of the time window around the time stamp, at least one even stride statistics variance each being associated with a time stamp in the time window and being variance of stride statistics of even gait cycles in a subwindow of the time window around the time stamp, at least one stride statistics deviation each being associated with a time stamp in the time window and being a X-percentile of a sample distribution of mean-subtracted stride statistics in a subwindow of the time window around the time stamp, wherein the mean-subtracted stride statistics of an odd gait cycle is the stride statistics of the odd gait cycle minus odd mean stride statistics and X is a number between 0 and 100, at least one odd stride statistics deviation each being associated with a time stamp in the time window and being a X-percentile of a sample distribution of mean-subtracted stride statistics of odd gait cycles in a subwindow of the time window around the time stamp, wherein the mean-subtracted stride statistics of an odd gait cycle is the stride statistics of the odd gait cycle minus odd mean stride statistics and X is a number between 0 and 100, at least one even stride statistics deviation each being associated with a time stamp in the time window and being a X-percentile of a sample distribution of mean-subtracted stride statistics of even gait cycles in a subwindow of the time window around the time stamp, wherein the mean-subtracted stride statistics of an even gait cycle is the stride statistics of the even gait cycle minus even mean stride statistics and X is a number between 0 and 100, at least one statistics of stride statistics each being associated with a time stamp in the time window and being at least one of: mean stride statistics, max stride statistics, min stride statistics, stride statistics variance, stride statistics deviation, and another statistics of stride statistics, at least one odd statistics of stride statistics each being associated with a time stamp in the time window and being at least one of: odd mean stride statistics, odd max stride statistics, odd min stride statistics, odd stride statistics variance, odd stride statistics deviation, and another odd statistics of stride statistics, at least one even statistics of stride statistics each being associated with a time stamp in the time window and being at least one of: even mean stride statistics, even max stride statistics, even min stride statistics, even stride statistics variance, even stride statistics deviation, and another even statistics of stride statistics, a left stride statistics, a right stride statistics, a front left stride statistics, a front right stride statistics, a back left stride statistics, a back right stride statistics, a wavefront stride statistics, an odd wavefront stride statistics, an even wavefront stride statistics, a ratio of even statistics of the stride statistics and odd statistics of the stride statistics, a difference of even statistics of the stride statistics and odd statistics of the stride statistics, a similarity measure of even statistics of the stride statistics and odd statistics of the stride statistics, a function of at least one of: statistics of stride statistics, odd statistics of stride statistics, and even statistics of stride statistics, a ratio of a function of even statistics of the stride statistics and a function of odd statistics of the stride statistics, a first function of a second function of even statistics of the stride statistics and a third function of odd statistics of the stride statistics, and another statistics of the stride statistics.

Clause 17. The tracking system/method/device/software of clause 12: wherein the at least one gait feature to comprise at least one of the following stride sequence related features: at least one gait speed each being associated with a time stamp in the time window, at least one stride sequence length each being associated with a time stamp in the time window and being an integration of gait speed over a respective extended gait cycle around the time stamp, at least one stride sequence period each being associated with a time stamp in the time window and being duration of a respective extended gait cycle around the time stamp, at least one stride sequence frequency each being associated with a time stamp in the time window and being inversely proportion to a respective stride sequence period around the time stamp, at least one stride sequence-wise mean speed each being associated with a time stamp in the time window and being at least one of: an average, a weighted average and a trimmed mean, of gait speed in a respective extended gait cycle around the time stamp, at least one stride sequence-wise max speed each being associated with a time stamp in the time window and being a maximum gait speed in a respective extended gait cycle around the time stamp, at least one stride sequence-wise min speed each being associated with a time stamp in the time window and being a minimum gait speed in a respective extended gait cycle around the time stamp, at least one stride sequence-wise speed variance each being associated with a time stamp in the time window and being a variance of gait speed in a respective extended gait cycle around the time stamp, at least one stride sequence-wise speed deviation each being associated with a time stamp in the time window and being a X-percentile of a sample distribution of mean-subtracted speed in a respective extended gait cycle around the time stamp, wherein the mean-subtracted speed is the gait speed minus a stride sequence-wise mean speed and X is a number between 0 and 100, at least one stride sequence-wise mean acceleration each being associated with a time stamp in the time window and being at least one of: an average, a weighted average and a trimmed mean, of gait acceleration in a respective extended gait cycle around the time stamp, wherein the gait acceleration is a derivative of gait speed, at least one stride sequence-wise max acceleration each being associated with a time stamp in the time window and being a maximum gait acceleration in a respective extended gait cycle around the time stamp, at least one stride sequence-wise min acceleration each being associated with a time stamp in the time window and being a minimum gait acceleration in a respective extended gait cycle around the time stamp, at least one stride sequence-wise acceleration variance each being associated with a time stamp in the time window and being a variance of gait acceleration in a respective extended gait cycle around the time stamp, at least one stride sequence-wise acceleration deviation each being associated with a time stamp in the time window and being a X-percentile of a sample distribution of mean-subtracted acceleration in a respective extended gait cycle around the time stamp, wherein the mean-subtracted acceleration is the gait acceleration minus the stride sequence-wise mean acceleration and X is a number between 0 and 100, at least one stride sequence statistics each being associated with a time stamp in the time window and being at least one of: stride sequence length, stride sequence period, stride sequence frequency, stride sequence-wise mean speed, stride sequence-wise max speed, stride sequence-wise min speed, stride sequence-wise speed variance, stride sequence-wise speed deviation, stride sequence-wise mean acceleration, stride sequence-wise max acceleration, stride sequence-wise min acceleration, stride sequence-wise acceleration variance, stride sequence-wise acceleration deviation, stride sequence-wise speed peak variance, stride sequence-wise speed valley variance, stride sequence-wise speed ACF k-th peak, stride sequence-wise mean speed ACF k-th peak, stride sequence-wise speed ACF k-th peak variance, stride sequence-wise speed ACF k-th peak-difference, stride sequence-wise mean speed ACF k-th peak-difference, stride sequence-wise speed ACF k-th peak-difference variance, stride sequence-wise speed ACF peak-count, stride sequence-wise mean speed ACF k-th peak-difference, stride sequence-wise speed ACF k-th peak-difference variance, stride sequence-wise speed ACF peak-count-pdf, stride sequence-wise recurrent plot (RP), stride sequence-wise recurrent plot (RP) feature, stride sequence-wise scaled speed-peak ACF, stride sequence-wise scaled peak ACF feature, stride sequence-wise harmonic ratio, stride sequence-wise harmonic feature, stride sequence-wise generalized harmonic feature, stride sequence-wise symmetry measure, a function of at least one of the above statistics, a function of another statistics, and a function of another stride sequence statistics, at least one mean stride sequence statistics each being associated with a time stamp in the time window and being at least one of: an average, a weighted average, and a trimmed mean, of the stride sequence statistics in a subwindow of the time window around the time stamp, at least one odd mean stride sequence statistics each being associated with a time stamp in the time window and being at least one of: an average, a weighted average, and a trimmed mean, of the stride sequence statistics of odd extended gait cycles in a subwindow of the time window around the time stamp, at least one even mean stride sequence statistics each being associated with a time stamp in the time window and being at least one of: an average, a weighted average, and a trimmed mean, of the stride sequence statistics of even extended gait cycles in a subwindow of the time window around the time stamp, at least one max stride sequence statistics each being associated with a time stamp in the time window and being a maximum of the stride sequence statistics in a subwindow of the time window around the time stamp, at least one odd max stride sequence statistics each being associated with a time stamp in the time window and being a maximum of the stride sequence statistics of odd extended gait cycles in a subwindow of the time window around the time stamp, at least one even max stride sequence statistics each being associated with a time stamp in the time window and being a maximum of the stride sequence statistics of even extended gait cycles in a subwindow of the time window around the time stamp, at least one min stride sequence statistics each being associated with a time stamp in the time window and being a minimum of the stride sequence statistics in a subwindow of the time window around the time stamp, at least one odd min stride sequence statistics each being associated with a time stamp in the time window and being a minimum of the stride sequence statistics of odd extended gait cycles in a subwindow of the time window around the time stamp, at least one even min stride sequence statistics each being associated with a time stamp in the time window and being a minimum of the stride sequence statistics of even extended gait cycles in a subwindow of the time window around the time stamp, at least one stride sequence statistics variance each being associated with a time stamp in the time window and being variance of stride sequence statistics in a subwindow of the time window around the time stamp, at least one odd stride sequence statistics variance each being associated with a time stamp in the time window and being variance of stride sequence statistics of odd extended gait cycles in a subwindow of the time window around the time stamp, at least one even stride sequence statistics variance each being associated with a time stamp in the time window and being variance of stride sequence statistics of even extended gait cycles in a subwindow of the time window around the time stamp, at least one stride sequence statistics deviation each being associated with a time stamp in the time window and being a X-percentile of a sample distribution of mean-subtracted stride sequence statistics in a subwindow of the time window around the time stamp, wherein the mean-subtracted stride sequence statistics of an odd extended gait cycle is the stride sequence statistics of the odd extended gait cycle minus odd mean stride sequence statistics and X is a number between 0 and 100, at least one odd stride sequence statistics deviation each being associated with a time stamp in the time window and being a X-percentile of a sample distribution of mean-subtracted stride sequence statistics of odd extended gait cycles in a subwindow of the time window around the time stamp, wherein the mean-subtracted stride sequence statistics of an odd extended gait cycle is the stride sequence statistics of the odd extended gait cycle minus odd mean stride sequence statistics and X is a number between 0 and 100, at least one even stride sequence statistics deviation each being associated with a time stamp in the time window and being a X-percentile of a sample distribution of mean-subtracted stride sequence statistics of even extended gait cycles in a subwindow of the time window around the time stamp, wherein the mean-subtracted stride sequence statistics of an even extended gait cycle is the stride sequence statistics of the even extended gait cycle minus even mean stride sequence statistics and X is a number between 0 and 100, at least one statistics of stride sequence statistics each being associated with a time stamp in the time window and being at least one of: mean stride sequence statistics, max stride sequence statistics, min stride sequence statistics, stride sequence statistics variance, stride sequence statistics deviation, and another statistics of stride sequence statistics, at least one odd statistics of stride sequence statistics each being associated with a time stamp in the time window and being at least one of: odd mean stride sequence statistics, odd max stride sequence statistics, odd min stride sequence statistics, odd stride sequence statistics variance, odd stride sequence statistics deviation, and another odd statistics of stride sequence statistics, at least one even statistics of stride sequence statistics each being associated with a time stamp in the time window and being at least one of: even mean stride sequence statistics, even max stride sequence statistics, even min stride sequence statistics, even stride sequence statistics variance, even stride sequence statistics deviation, and another even statistics of stride sequence statistics, a front stride sequence statistics, a back stride sequence statistics, a wavefront stride sequence statistics, a phase 1 wavefront stride sequence statistics, a phase 2 wavefront stride sequence statistics, a phase 3 wavefront stride sequence statistics, a phase 4 wavefront stride sequence statistics, a n-th phase wavefront stride sequence statistics, a ratio of even statistics of the stride sequence statistics and odd statistics of the stride sequence statistics, a difference of even statistics of the stride sequence statistics and odd statistics of the stride sequence statistics, a similarity measure of even statistics of the stride sequence statistics and odd statistics of the stride sequence statistics, a function of at least one of: statistics of stride sequence statistics, odd statistics of stride sequence statistics, and even statistics of stride sequence statistics, a ratio of a function of even statistics of the stride sequence statistics and a function of odd statistics of the stride sequence statistics, a first function of a second function of even statistics of the stride sequence statistics and a third function of odd statistics of the stride sequence statistics, and another statistics of the stride sequence statistics.

Clause 18. The tracking system/method/device/software of clause 12: communicating one of the at least one cycle feature to a server.

Clause 19. The tracking system/method/device/software of clause 12: communicating a cycle feature to a user device, generating a presentation of the cycle feature or a history of cycle feature to a user of the user device.

Clause 20. The tracking system/method/device/software of clause 1: communicating the next location of the object at the next time to a server.

Clause 21. The tracking system/method/device/software of clause 1: communicating the next location of the object to a user device, generating a presentation of at least one of: the next location, a trajectory, or a trace to a user of the user device.

Clause 22. The tracking system/method/device/software of clause 7 or 8 or 9: computing an amount of cycles in the incremental time period; computing the increment distance as a multiplicative product of the amount of cycles and a cycle distance.

In some embodiments, the cycle distance may be obtained by some training. For example, in a calibration or training process, the object (e.g. human user) may be walking while a reference distance may be obtained using another location system, which may include: e.g. GPS plus a triangulation or trilateration when the object is walking outdoor, a CSI-based locationing if available, a next generation positioning (e.g. based on 802.11ay) using WiFi signals, UWB based locationing, radar based locationing or mmWave-based locationing, etc. To compute the cycle distance, the system can analyze the rhythmic behavior of TSIQ or TSSI, count the number (amount) of cycles in a time window, then compute the cycle distance by dividing the reference distance in the time window by the number of cycles in the time window.

Clause 23. The tracking system/method/device/software of clause 22: computing the cycle distance based on at least one of: a user input, a trained value obtained in a training phase, a calibration process or a training process using "reference distance" from another locationing scheme an adaptively computed value based on a recent time period of stable rhythmic motion.

Clause 24. The tracking system/method/device/software of clause 1, wherein the next location of the object at the next time is computed using a particle filter.

Clause 25. The tracking system/method/device/software of clause 1, wherein computing the next location of the object at the next time comprises: initializing an initial number (N_0) of initial candidate locations of the object at an initial time (t=0); computing iteratively a first dynamic number (N_(i+1)) of first candidate locations of the object at the next time (t=(i+1)) based on a second dynamic number (N_i) of second candidate locations of the object at the current time (t=i); and computing the next location of the object at the next time based on at least one of: the first dynamic number of first candidate locations at the next time, and the second dynamic number of second candidate locations at the current time.

Clause 26. The tracking system/method/device/software of clause 25, wherein: the object moves during the incremental time period in a region represented by the map; the map is a multi-dimensional map represented as a multi-dimensional array A, such that reachability of each location of the region is represented by a corresponding array element a which is a logical value between 0 and 1; a location of the region is unreachable and forbidden when the corresponding array element satisfies a=0; a location of the region is fully reachable when the corresponding array element satisfies a=1; a location of the region is partially reachable when the corresponding array element satisfies: 0<a<1; each of the next location, the current location, the first dynamic number of first candidate locations, and the second dynamic number of second candidate locations, is a point in the region and is represented as a corresponding array element a, with a>0; and the direction of the motion of the object at any location is locally represented as one of a number of allowable directions.

In some embodiments, a map constraint (e.g. based on matrix A) may be used to reject or eliminate non-reachable candidate locations. For example, suppose there are N_i legitimate candidate locations at time t=i. The system can compute N_i anticipated locations for time t=(i+1). Each anticipated location is checked against the matrix A. If it is unreachable, it is rejected or eliminated. The remaining anticipated locations may then become legitimate candidate locations. If the number of remaining legitimate candidate locations is too small, new legitimate candidate locations may be generated based on some stochastic model and rule. The result is that the number of candidate locations may be different in different iterations, i.e. a dynamic number. But their total number is never below a certain minimum number.

In some embodiments, the system can generate an anticipated candidate location as the sum of a displacement vector (magnitude="incremental distance" in the "direction") and the "current candidate location". Alternative, this sum may be used as a parameter of a probability distribution, e.g. Gaussian with a mean as the computed sum and a variance related to the "goodness" measure of the current candidate location. For example, the variance may be a function of the reachability value in matrix A. A high reachability (e.g. a=1) may correspond to a larger variance, while a low reachability (e.g. a=0.1) may correspond to a small variance. The next location may be computed by combining the remaining legitimate (reachable) candidate locations at time t=(i+1), e.g. using weighted average with associated weights, average, median, maximum likelihood, centroid, or MAP.

Clause 27. The tracking system/method/device/software of clause 26, wherein computing the next location of the object at the next time comprises: computing the first dynamic number of weights each associated with a first candidate location, each weight being a function of at least one of: the current location, the first candidate location, a corresponding second candidate location associated with the first candidate location, the direction of the motion, and a distance between the first candidate location and a first unreachable array element a in the direction; and computing the next location of the object based on the first dynamic number of first candidate locations, and the associated first dynamic number of weights.

Clause 28. The tracking system/method/device/software of clause 27, wherein each weight is a monotonic non-decreasing function of the distance between the first candidate location and the first unreachable array element a in the direction.

Clause 29. The tracking system/method/device/software of clause 27, wherein each weight is a bounded function of the distance between the first candidate location and the first unreachable array element a in the direction.

Clause 30. The tracking system/method/device/software of clause 27, wherein the next location of the object at the next time is computed as a weighted average of the first dynamic number of first candidate locations.

Clause 31. The tracking system/method/device/software of clause 27, wherein the next location of the object at the next time is computed as one of the first candidate locations.

Clause 32. The tracking system/method/device/software of clause 27, wherein computing the next location of the object at the next time further comprises: normalizing the weights to generate normalized weights.

Clause 33. The tracking system/method/device/software of clause 32, wherein computing the next location of the object at the next time further comprises: computing a weighted cost of each first candidate location with respect to the rest of the first dynamic number of first candidate locations based on the normalized weights, wherein the weighted cost is a weighted sum of pairwise distance between the first candidate location and each of the rest of the first candidate locations; and choosing the first candidate location with a minimum weighted cost as the next location of the object.

Clause 34. The tracking system/method/device/software of clause 6, wherein computing the next location of the object at the next time comprises: computing a predicted value for each of the second candidate locations of the object based on at least one of: the second candidate location, the incremental distance, and the incremental time period; when the predicted value of the second candidate location is fully reachable with associated array element a=1, creating a first candidate location of the object based on the predicted value of the second candidate location; when the predicted value of the second candidate location is forbidden with associated array element a=0, labeling the second candidate location as "rejected" without creating any first candidate location; and when the predicted value of the second candidate location is partially reachable with associated array element satisfying 0<a<1, generating a random number between 0 and 1, and creating a first candidate location of the object based on the predicted value of the second candidate location when the random number is less than a.

Clause 35. The tracking system/method/device/software of clause 14, wherein computing the next location of the object at the next time further comprises: when a quantity of the first candidate locations is smaller than a threshold, generating a new first candidate location of the object by probabilistically taking on the predicted values of second candidate locations that are not rejected, with a probability distribution based on at least one of: weights associated with the predicted values; weights associated with the second candidate locations; array elements of the multi-dimensional array A associated with the predicted values; and array elements of the multi-dimensional array A associated with the second candidate locations.

Clause 36. The tracking system/method/device/software of clause 14, wherein computing the next location of the object at the next time further comprises: when a quantity of the first candidate locations is smaller than a threshold, generating a new first candidate location of the object by probabilistically taking on the second candidate locations that are not rejected, with a probability based on weights associated with the predicted values of the second candidate locations that are not rejected.

Clause 37. The tracking system/method/device/software of clause 14, wherein computing the next location of the object at the next time further comprises: when a quantity of the first candidate locations is smaller than a threshold, computing a tentative next location based on the first candidate locations and generating a new first candidate location of the object probabilistically in a neighborhood of the tentative next location based on a probability distribution.

Clause 38. The tracking system/method/device/software of clause 14, wherein computing the next location of the object at the next time further comprises: when a quantity of the first candidate locations is smaller than a threshold, generating a new first candidate location of the object probabilistically based on a predictor of a location sampled in a neighborhood of the current location based on a probability distribution.

Clause 39. The tracking system/method/device/software of clause 18, wherein the neighborhood comprises at least one of the second candidate locations that are not rejected.

Clause 40. The tracking system/method/device/software of clause 18, wherein the probability distribution is a weighted sum of a set of probability density functions, each centered at one of the second candidate locations that are not rejected.

Clause 41. The tracking system/method/device/software of clause 20, wherein: a weight of each pdf associated with a second candidate location in the weighted sum is a function of the array element associated with the second candidate location.

Clause 42. The tracking system/method/device/software of clause 1, further comprising: maintaining a dynamic number of candidate locations at any time; changing the dynamic number of candidate locations by at least one of: initializing at least one candidate location, updating at least one candidate location, adding at least one candidate location, pausing at least one candidate location, stopping at least one candidate location, resuming at least one paused candidate location, reinitializing at least one stopped candidate location, and removing at least one candidate location; and computing the next location of the object at the next time based on at least one of: the dynamic number of candidate locations at the next time, and the dynamic number of candidate locations at another time.

Clause 43. The tracking system/method/device/software of clause 22, wherein the dynamic number of candidate locations is bounded by at least one of: an upper limit and a lower limit.

Clause 44. The tracking system/method/device/software of clause 22, further comprising: adding at least one candidate location when the dynamic number of candidate locations is lower than a lower limit.

Clause 45. The method/apparatus/system of the wireless monitoring system of clause 7 or 8 or 9, further comprising: validating a complete cycle as a target type of cycle.

Clause 46. The method/apparatus/system of the wireless monitoring system of clause 45, further comprising: computing a likelihood score associated with the complete cycle based on at least one of: the TSIQ, the TSMSIQ or the TSSI; validating the complete cycle as the target cycle based on the likelihood score.

Clause 47. The method/apparatus/system of the wireless monitoring system of clause 46, further comprising: validating the complete cycle as the target cycle if the likelihood score satisfies a validation condition associated with the target cycle.

Clause 48. The method/apparatus/system of the wireless monitoring system of clause 47, further comprising: validating the complete cycle as the target cycle if the likelihood score is larger than a threshold.

Clause 49. The method/apparatus/system of the wireless monitoring system of clause 46, further comprising: computing a time period associated with the complete cycle with a corresponding start-time and a corresponding end-time of the time period; computing at least one of the following features of the TSIQ or the TSMSIQ in the time period: a sum, a weighted sum, a sum of magnitude, a weighted sum of magnitude, a local maxima, a zero-crossing, a local minimum, a maximum derivative, a minimum derivative, and a zero derivative; computing at least one cycle statistics based on the computed features in the time period; computing the likelihood based on the time period, the at least one cycle statistics, the at least one features, or a function of the cycle statistics or the features.

Clause 50. The method/apparatus/system of the wireless monitoring system of clause 49, further comprising: computing the likelihood score to be zero if any of the following happens: the duration of the time period exceeds a first threshold, the cycle statistics is greater than a second threshold, the local maximum is greater than the second threshold, the cycle statistics is less than a third threshold, the local minimum is less than the third threshold, a fraction of maximum of a quantity in a recent time window over minimum of the quantity in the recent time window is greater than a fourth threshold where the quantity is one of: one of the features, a function of two or more features, a difference between a local maximum and a local minimum, in a complete cycle in the recent time window and the cycle statistics, the cycle statistics is outside a N-sigma region around its mean in a recent time window where sigma is its standard deviation in the recent time window and N is an integer, a feature is outside a 4-sigma region around its mean in a recent time window where sigma is its standard deviation in the recent time window the sum of magnitude is outside a 4-sigma region around its mean in a recent time window where sigma is its standard deviation in the recent time window, the sum is outside a 4-sigma region around its mean in a recent time window where sigma is its standard deviation in the recent time window.

Clause 51. The method/apparatus/system of the wireless monitoring system of clause 46, further comprising: computing the incremental distance associated with the object movement in the time period associated with the complete cycle as a multiplicative product of the likelihood score and a tentative incremental distance.

Clause 52. The method/apparatus/system of the wireless monitoring system of clause 45, further comprising: wherein the object is a human; wherein the object movement is a walking motion or a running motion of the human; wherein the target type of cycle is a step cycle of the human walking or running; computing a user status as "WALKING", or "RUNNING" based on the validation of the complete cycle as a step cycle.

Clause 53. The method/apparatus/system of the wireless monitoring system of clause 52, further comprising: changing the user status from "NON-WALKING" to "WALKING", or from "NON-RUNNING" to "RUNNING", based on the validation of the complete cycle as a step cycle.

Clause 54. The method/apparatus/system of the wireless monitoring system of clause 52, further comprising: validating consecutive complete cycles as step cycles; detecting the WALKING or RUNNING status based on the consecutive validated step cycles.

Clause 55. The method/apparatus/system of the wireless monitoring system of clause 54, further comprising: changing the user status from NON-WALKING to WALKING, or from NON-RUNNING to RUNNING based on the consecutive validated step cycles.

Clause 56. The method/apparatus/system of the wireless monitoring system of clause 52, further comprising: if both a current complete cycle and an immediate past complete cycle are validated as step cycles and the time gap between two step cycles is less than a threshold, the two step cycles are determined to be continuous; computing the user status as WALKING or RUNNING based on the continuous step cycles.

Clause 57. The method/apparatus/system of the wireless monitoring system of clause 56, further comprising: changing the user status from NON-WALKING to WALKING, or from NON-RUNNING to RUNNING based on the continuous step cycles.

Clause 58. The method/apparatus/system of the wireless monitoring system of clause 52, further comprising: determining a complete cycle as a non-step cycle because the complete cycle fails to be validated as a step cycle; changing the user status from WALKING to NOT-WALKING or from RUNNING to NON-RUNNING based on the non-step cycle.

Clause 59. The method/apparatus/system of the wireless monitoring system of clause 52, further comprising: incrementing a count of the target cycle.

Clause 60. The method/apparatus/system of the wireless monitoring system of clause 59, further comprising: determining that a complete cycle is not a target cycle because the complete cycle fails to be validated as a target cycle; resetting a count of the target cycle to be zero.

Clause 61. The method/apparatus/system of the wireless monitoring system of clause 1, further comprising: computing a statistics of an observable, wherein the observable comprises one of: intermediate quantity (IQ), a cycle feature, a local characteristic point or a feature of a time series of IQ (TSIQ) or a time series of mean-subtracted IQ (TSMSIQ).

Clause 62. The method/apparatus/system of the wireless monitoring system of clause 61, further comprising: updating the statistics by computing a current statistics based on an immediate past statistics.

Clause 63. The method/apparatus/system of the wireless monitoring system of clause 62, further comprising: wherein the immediate past statistics is computed based on (N−1) past instances of the observable; computing the current statistics based on an immediate past statistics and the current instance of the observable.

Clause 64. The method/apparatus/system of the wireless monitoring system of clause 63, further comprising: computing the current statistics by at least one of: adding an offset to the immediate past statistics, wherein the offset is at least one of: a weighted difference between the current observable and the immediate past statistics wherein both are weighted by 1/N, or a product of (a) a difference between the current observable and a current second statistics, and (b) a difference between the current observable and an immediately past current statistics, or scaling a current third statistics by 1/N.

Clause 65. The method/apparatus/system of the wireless monitoring system of clause 3, further comprising: projecting the SI from gyroscope onto the earth reference frame; computing the cumulative directional change; and adding the cumulative directional change to an initial direction.

Clause 66. The method/apparatus/system of the wireless monitoring system of clause 1, further comprising: wherein one of the sensors is a barometer; wherein the SI from the barometer is air pressure; tracking a vertical movement of the object based on the air pressure; estimating an altitude or a vertical position based on the air pressure; computing a vertical incremental distance based on the air pressure, the altitude or the vertical position.

Clause 67. The method/apparatus/system of the wireless monitoring system of clause 25, further comprising: computing a difference between a first increment distance computed using the particle filter with a second incremental distance computed without using the particular filter; detecting a problematic situation based on the difference.

Clause 68. The method/apparatus/system of the wireless monitoring system of clause 67, further comprising: detecting the problematic situation if the difference is greater than a threshold.

Clause 69. The method/apparatus/system of the wireless monitoring system of clause 68, further comprising: generating a number of new first candidate locations that are outside a region associated with the second candidate locations.

Clause 70. The method/apparatus/system of the wireless monitoring system of clause 68, further comprising: replacing a number of existing second candidate locations with corresponding new candidate locations that are outside a region associated with the existing second candidate locations.

Clause 71. The method/apparatus/system of the wireless monitoring system of clause 68, further comprising: eliminating a number of existing second candidate locations.

In some embodiments, a walking detection algorithm may be performed by the system using acceleration data from an IMU sensor. Assuming a person holding a device while walking or not walking, the system can obtain acceleration from IU and project them along gravity direction. The system can perform 3 or 4 tests to determine the person is walking if majority tests are passed.

In some embodiments, a test A (Maximum) includes the following steps. At step A1, the system computes max of acceleration (maxAcc) in a testing time window (e.g. 1 second long). At step A2, if maxAcc<T1 (too small), the person is determined NOT walking. The small acceleration may be due to the person doing some normal screen-writing, swiping, pressing action on the touch screen. At step A3, if maxAcc>T2 (too large, T2>T1), the person is determined NOT walking. The large acceleration may be due to the person jumping.

In some embodiments, a test B (Percentage) includes the following steps. At step B1, the system computes percentage of acceleration over the absolute mean (mean of absolute value) within the testing time window. At step B1, if percentage<T3, the person is determined NOT walking.

In some embodiments, a test C (Periodicity) includes the following steps. At step C1, the system computes zero-crossing in testing time window. At step C2, if time difference between two adjacent zeros<T4 (e.g. 0.2 s), replace both by zero at midpoint. In regular walking, time differences between adjacent pair of zeros are relatively uniform. One can define a ratio of A=max (time difference)/min (time difference). When A>2, NOT walking. Two adjacent crossing can be very close to each other due to false peak detection result. If they are closer than 0.2 s, replace both by zero at midpoint.

The following numbered clauses provide implementation examples for walking detection, e.g. using INU sensors.

Clause A1. A method/apparatus/system of a target motion detection system, comprising: obtaining a time series of sensing information (SI) from a sensor using a processor, a memory communicatively coupled with the processor and a set of instructions stored in the memory, wherein the sensor is moving with an object; monitoring a motion of the object based on the time series of SI (TSSI); and detecting the motion to be a target motion based on the monitoring.

Clause A2. The method/apparatus/system of the walking detection system of Clause A1: wherein the sensor comprises at least one of: accelerometer, gyroscope, magnetometer, proximity sensor, barometer, ambient light sensor, thermometer, microphone, fingerprint sensor, pedometer, wireless transmitter, wireless receiver, wireless transceiver, WLAN transceiver, WiFi transceiver, IEEE 802.11 compliant transceiver, mobile communication transceiver, 3G/4G/LTE/5G/6G/7G/8G transceiver, 3GPP compliant transceiver, UWB transceiver, Bluetooth transceiver, Zigbee transceiver, IEEE 802.15 compliant transceiver, and another sensor; wherein a sensing information (SI) comprises at least one of: acceleration, 3-axis acceleration, angular rate, 3-axis angular rate, inclination, 3-axis inclination, orientation, 3-axis orientation, proximity, air pressure, light intensity, temperature, sound pressure level, scanned fingerprint, step count, channel information (CI) of a wireless multipath channel comprising at least one of: channel state information (CSI), channel impulse response (CIR), channel frequency response (CFR), received signal strength indicator (RSSI), signal power, signal strength, signal intensity, signal amplitude, signal phase, signal frequency component, and signal frequency band component, and another sensing information; wherein the CI of the wireless multipath channel is extracted from a wireless signal communicated between a Type1 heterogeneous wireless device and a Type2 heterogeneous wireless device through the wireless multipath channel.

Clause A3. The method/apparatus/system of the walking detection system of Clause A1: wherein the target motion comprises at least one of: a walking motion, gait, marching motion, pacing motion, running motion, galloping action, troting action, body motion, leg motion, hand motion, finger motion, trunk motion, torso motion, head motion, mouth motion, eye motion, sit-down motion, stand-up motion, creeping motion, crawling motion, swimming motion, exercise motion, dancing motion, watching-TV motion, sitting-on-sofa motion, reading-book motion, listening-to-music motion, repeated motion, complex repeated motion, robotic motion, mechanic motion, vehicle motion, wind-induced motion, curtain motion, current-induced motion, fluid motion, vibration, earthquake, tremor, shaking motion, quivering motion, trembling motion, musical motion, dancing motion, oscillation, regular motion, periodic motion, breathing motion, heartbeat motion, palpitating motion, relaxation oscillation, increasing motion, decreasing motion, expanding motion, contracting motion, pulsating motion, pumping motion, pounding motion, thuding motion, throbing motion, hammering motion, alternating motion, coordinated motion, combination of multiple repeated motion, modulated motion, mixed motion, composite motion, composite motion with at least one underlying rhythm, motion coupled to another rhythmic motion of another object, transient motion, transient motion with rhythmic details, fall-down motion, sleepy motion, vasive motion, collision, impact, crash, smash, bump, knock, impact, hit, strike, clash, wreck, smash-up, pileup, prang, shunt, and a motion coupled to a rhythm.

Clause A4. The method/apparatus/system of the walking detection system of Clause A1, further comprising: computing a time series of feature (TSF), wherein each feature of the TSF comprises at least one of: a magnitude, phase, absolute value, norm, and magnitude square, of at least one of: a respective SI of the TSSI and a projection of the SI, monitoring the motion of the object based on the TSF; and detecting the motion to be the target motion based on the monitoring.

Clause A5. The method/apparatus/system of the walking detection system of Clause A4, further comprising: wherein the sensor comprises an accelerometer; wherein each SI comprises a 3-axis acceleration from the accelerometer; wherein each feature of the TSF is a projection of the 3-axis acceleration of a respective SI to the gravity direction.

Clause A6. The method/apparatus/system of the walking detection system of Clause A4, further comprising: determine a sliding time window associated with a sliding time stamp; performing at least one target motion test based on the sliding time window of the TSF; detecting the motion to be the target motion in the sliding time window based on the at least one target motion test.

A test may test for different properties/characteristics associated with the target motion. E.g. periodicity, rhythm, stationarity, variability, regularity, outlier, repeatability, impulsiveness, intensity, pace, motionlessness, steadiness, direction-steadiness,>"high" may mean there is a lower bound (or lower threshold)>"low" may mean there is an upper bound (or upper threshold)>"moderate" may mean there is both a lower bound and a upper bound (or, lower threshold+upper threshold) 7. The method/apparatus/system of the walking detection system of Clause A6, further comprising: wherein at least one target motion test comprises at least one of: a test for periodicity in which the motion is tentative determined to be the target motion when a periodicity of the TSF is determined to be at least one of: "high", "moderate", and "low" based on a tendency of the target motion, a test for rhythm in which the motion is tentative determined to be the target motion when a rhythm of the TSF is determined to be "matching" and "non-matching", based on the tendency of the target motion, a test for stationarity in which the motion is tentative determined to be the target motion when a stationarity of the TSF is determined to be at least one of: "high", "moderate", and "low", based on the tendency of the target motion, a test for variability in which the motion is tentative determined to be the target motion when a variability of the TSF is determined to be at least one of: "high", "moderate", and "low", based on the tendency of the target motion, a test for regularity in which the motion is tentative determined to be the target motion when a regularity of the TSF is determined to be at least one of: "high", "moderate", and "low", based on the tendency of the target motion, a test for outlier in which the motion is tentative determined to be the target motion when an outlier measure of the TSF is determined to be at least one of: "high", "moderate", and "low", based on the tendency of the target motion, a test for repeatability in which the motion is tentative determined to be the target motion when a repeatability of the TSF is determined to be at least one of: "high", "moderate", and "low", based on the tendency of the target motion, a test for impulsiveness in which the motion is tentative determined to be the target motion when an impulsiveness of the TSF is determined to be at least one of: "high", "moderate", and "low", based on the tendency of the target motion, a test for intensity in which the motion is tentative determined to be the target motion when an intensity of the TSF is determined to be at least one of: "high", "moderate", and "low", based on the tendency of the target motion, a test for pace in which the motion is tentative determined to be the target motion when a pace of the TSF is determined to be at least one of: "high", "moderate", and "low", based on the tendency of the target motion, a test for motionlessness in which the motion is tentative determined to be the target motion when a motionlessness of the TSF is determined to be at least one of: "high", "moderate", and "low", based on the tendency of the target motion, a test for steadiness in which the motion is tentative determined to be the target motion when a steadiness of the TSF is determined to be at least one of: "high", "moderate", and "low", based on the tendency of the target motion, a test for direction-steadiness in which the motion is tentative determined to be the target motion when a direction-steadiness of the TSF is determined to be at least one of: "high", "moderate", and "low", based on the tendency of the target motion, another test for target motion characteristics, and another test for non-target motion characteristics.

Clause A8. The method/apparatus/system of the walking detection system of Clause A6, further comprising: wherein the target motion is walking motion; wherein at least one target motion test comprises at least one of: a test for periodicity in which the motion is tentative determined to be the target motion when a periodicity of the TSF is determined to be "high", a test for rhythm in which the motion is tentative determined to be the target motion when a rhythm of the TSF is determined to be "matching", a test for stationarity in which the motion is tentative determined to be the target motion when a stationarity of the TSF is determined to be "high", a test for variability in which the motion is tentative determined to be the target motion when a variability of the TSF is determined to be "low", a test for regularity in which the motion is tentative determined to be the target motion when a regularity of the TSF is determined to be "high", a test for outlier in which the motion is tentative determined to be the target motion when an outlier measure of the TSF is determined to be "low", a test for repeatability in which the motion is tentative determined to be the target motion when a repeatability of the TSF is determined to be "high", a test for impulsiveness in which the motion is tentative determined to be the target motion when an impulsiveness of the TSF is determined to be "low", a test for intensity in which the motion is tentative determined to be the target motion when an intensity of the TSF is determined to be "moderate", a test for pace in which the motion is tentative determined to be the target motion when a pace of the TSF is determined to be "moderate", a test for motionlessness in which the motion is tentative determined to be the target motion when a motionlessness of the TSF is determined to be "low", a test for steadiness in which the motion is tentative determined to be the target motion when a steadiness of the TSF is determined to be "high", a test for direction-steadiness in which the motion is tentative determined to be the target motion when a direction-steadiness of the TSF is determined to be "low", another test for target motion characteristics, and another test for non-target motion characteristic.

Clause A9. The method/apparatus/system of the walking detection system of Clause A6, further comprising: wherein the target motion is a fall-down motion; wherein at least one target motion test comprises at least one of: a test for periodicity in which the motion is tentative determined to be the target motion when a periodicity of the TSF is determined to be "low", a test for rhythm in which the motion is tentative determined to be the target motion when a rhythm of the TSF is determined to be "matching", based on a tendency of the fall-down motion, a test for stationarity in which the motion is tentative determined to be the target motion when a stationarity of the TSF is determined to be "low", a test for variability in which the motion is tentative determined to be the target motion when a variability of the TSF is determined to be "high", a test for regularity in which the motion is tentative determined to be the target motion when a regularity of the TSF is determined to be "low", a test for outlier in which the motion is tentative determined to be the target motion when an outlier measure of the TSF is determined to be "high", a test for repeatability in which the motion is tentative determined to be the target motion when a repeatability of the TSF is determined to be "low", a test for impulsiveness in which the motion is tentative determined to be the target motion when an impulsiveness of the TSF is determined to be "high", a test for intensity in which the motion is tentative determined to be the target motion when an intensity of the TSF is determined to be "high", a test for pace in which the motion is tentative determined to be the target motion when a pace of the TSF is determined to be "high", a test for motionlessness in which the motion is tentative determined to be the target motion when a motionlessness of the TSF is determined to be "low", a test for steadiness in which the motion is tentative determined to be the target motion when a steadiness of the TSF is determined to be "low", a test for direction-steadiness in which the motion is tentative determined to be the target motion when a direction-steadiness of the TSF is determined to be "high", another test for target motion characteristics, and another test for non-target motion characteristic>Each test has a corresponding measure.

Clause A10. The method/apparatus/system of the walking detection system of Clause A6, further comprising: wherein at least one target motion test comprises at least one of: a test for periodicity in which the motion is tentative determined to be the target motion based on a periodicity measure, a test for rhythmicty in which the motion is tentative determined to be the target motion based on a rhythmity measure, a test for stationarity in which the motion is tentative determined to be the target motion based on a stationarity measure, a test for variability in which the motion is tentative determined to be the target motion based on a variability measure, a test for regularity in which the motion is tentative determined to be the target motion based on a regularity measure, a test for outlier in which the motion is tentative determined to be the target motion based on a outlier measure, a test for repeatability in which the motion is tentative determined to be the target motion based on a repeatability measure, a test for impulsiveness in which the motion is tentative determined to be the target motion based on a impulsiveness measure, a test for intensity in which the motion is tentative determined to be the target motion based on a intensity measure, a test for pace in which the motion is tentative determined to be the target motion based on a pace measure, a test for motionlessness in which the motion is tentative determined to be the target motion based on a motionlessness measure, a test for steadiness in which the motion is tentative determined to be the target motion based on a steadiness measure, a test for direction-steadiness in which the motion is tentative determined to be the target motion based on a direction-steadiness measure, another test for target motion characteristics in which the motion is tentative determined to be the target motion based on a respective target motion characteristics measure, and another test for non-target motion characteristic in which the motion is tentative determined to be the target motion based on a respective non-target motion characteristics measure.

Clause A11. The method/apparatus/system of the walking detection system of Clause A6, further comprising: computing a test measure associated with a target motion test; determining a passing condition for the target motion test based on the test measure; if the test measure satisfies the passing condition, then considering the target motion test as "passed", else considering the target motion test as "failed".

Clause A12. The method/apparatus/system of the walking detection system of Clause A9, further comprising: computing another test measure; determining a partial-passing condition for the target motion test based on the another test measure; if the test measure satisfies the passing condition, then considering the target motion test as "passed", else if the another test measure satisfies the partial-passing condition, then considering the target motion test as "partially-passed", else considering the target motion test as "failed".

Clause A13. The method/apparatus/system of the walking detection system of Clause A10: wherein the another test measure is the test measure.

Clause A14. The method/apparatus/system of the walking detection system of Clause A13, further comprising: wherein the test measure is a scalar; wherein the passing condition is that the test measure is less than a threshold T1; wherein the partial passing condition is that the test measure is less than a threshold T2 and is not less than T1, with T2 not less than T1.

Clause A15. The method/apparatus/system of the walking detection system of Clause A13, further comprising: wherein the test measure is a scalar; wherein the passing condition is that the test measure is greater than a threshold T1; wherein the partial passing condition is that the test measure is greater than a threshold T2 and not greater than T1, with T2 not greater than T1.

Clause A16. The method/apparatus/system of the walking detection system of Clause A14 or Clause A15, further comprising: wherein T1 is equal to T2 such that the partial passing condition is bypassed.

Clause A17. The method/apparatus/system of the walking detection system of Clause A13, further comprising: wherein the test measure is a scalar; wherein the passing condition is that the test measure is not less than a lower threshold T1 and not greater than a upper threshold T2, with T2>=T1; wherein the partial passing condition is that the test measure is: less than T1 but not less than another lower threshold T3, with T3<=T1, or greater than T2 but not greater than another upper threshold T4, with T4>=T2.

Clause A18. The method/apparatus/system of the walking detection system of Clause A17, further comprising: wherein T1 is equal to T3 and T2 is equal to T4 such that the partial passing condition is bypassed.

Clause A19. The method/apparatus/system of the walking detection system of Clause A13, further comprising: wherein the test measure is a vector; wherein the passing condition is that the test measure is in a first "low" region of the vector space; wherein the partial passing condition is that the test measure is in a second "low" region of the vector space and is not in the first "low" region, wherein the first "low" region is a subset of the second "low" region.

Clause A20. The method/apparatus/system of the walking detection system of Clause A13, further comprising: wherein the test measure is a vector; wherein the passing condition is that the test measure is in a first "high" region of the vector space; wherein the partial passing condition is that the test measure is in a second "high" region of the vector space and is not in the first "high" region, wherein the first "high" region is a subset of the second "high" region.

Clause A21. The method/apparatus/system of the walking detection system of Clause A13, further comprising: wherein the test measure is a vector; wherein the passing condition is that the test measure is in a first "moderate" region of the vector space; wherein the partial passing condition is that the test measure is in a second "moderate" region of the vector space and not in the first "moderate" region, wherein the first "moderate" region is a subset of the second "moderate" region.

Clause A22. The method/apparatus/system of the walking detection system of Clause A19, Clause A20, or Clause A21, further comprising: wherein the first region is equal to the second region such that the partial passing condition is bypassed.

Clause A23. The method/apparatus/system of the walking detection system of Clause A6, further comprising: choosing the at least one target motion test from a set of possible target motion tests based on the target motion, a characteristics of each possible target motion test, a computing requirement of each possible target motion test, an availability of computing resource associated with the processor, the memory and the set of instructions, a characteristics of the TSSI, a characteristics of the sensor, and a relationship between the motion of the object and a motion of the sensor.

Clause A24. The method/apparatus/system of the walking detection system of Clause A6, further comprising: detecting the motion to be the target motion in the sliding time window if a percentage of at least one target motion test being passed exceeds a threshold.

Clause A25. The method/apparatus/system of the walking detection system of Clause A6, further comprising: computing an individual test score for each target motion test; computing an overall test score based on at least one of: a sum, weighted sum, product, weighted product, average, weighted average, median, mode, trimmed mean, geometric mean, harmonic mean and another quantity, of the individual test scores; detecting the motion to be the target motion in the sliding time window if the overall test score exceeds a threshold.

Clause A26. The method/apparatus/system of the walking detection system of Clause A25, further comprising: computing the respective individual test score based on a magnitude of a test statistics associated with the respective target motion test.

Clause A27. The method/apparatus/system of the walking detection system of Clause A25, further comprising: determining adaptively at least one of: a time-invariant weight and a time-varying weight for each individual test score.

Clause A28. The method/apparatus/system of the walking detection system of Clause A25, further comprising: wherein the threshold is determined based on at least one of: an amount of the at least one target motion test, weights associated with the overall test score computation, a fraction and a scaling factor.

Clause A29. The method/apparatus/system of the walking detection system of Clause A6, further comprising: adjusting adaptively at least one of: a threshold, weight, target motion test selection, testing order, processing order, model, model parameter, feature selection, TSSI conditioning, feature conditioning, preprocessing, processing, postprocessing, computation, memory, software, configuration, test definition, testing, thresholding, score definition, aggregation, weighting, based on at least one of: an identification of the object, habitual behaviour of the object, current status of the object, information associated with an environment in which the object moves, crowd behavior, terrain of the environment, roughness of terrain, landscape, obstacle, lighted path, planned route, upcoming path, background motion, behavior of a surrounding crowd, anticipated situation, scheduled situation, upcoming event, timed event, planned object behavior, navigation route, suggested motion, identification of another object associated with at least one of: the object and the motion of the object, motion of the another object, target motion of the another object, non-target motion of the another object, change of device, change of sensor, change of device setting, change of sensor setting, a user reference, a customization, and another factor.

Clause A30. The method/apparatus/system of the walking detection system of Clause A6, further comprising: computing a test measure associated with a target motion test based on the features of the TSF in the sliding time window, the test measure comprising at least one of: a first function of a plurality of TSF-derived features, a second function of a plurality of second derived features, wherein the second derived features comprise the TSF-derived features and iteratively-derived features derived iteratively from a first transform of the TSF-derived features, a third function of a plurality of third derived features, wherein the third derived features comprise the second derived features, the TSF-derived features, and iteratively-derived features derived iteratively from a second transform of the second derived features, an (N+1)-th function of a plurality of (N+1)-th derived features, wherein the (N+1)-th derived feature comprises a plurality of N-th derived features, other derived features derived before the N-th derived features, and iteratively-derived features derived iteratively from an N-th transform of the N-th derived features, and another function of a set of derived features, wherein the derived features comprise another set of derived features, other derived features derived before the another set of derived features, and iteratively-derived features derived iteratively from a transform of another set of derived features, any of the plurality of TSF-derived features, and any of any iteratively-derived features; and performing the target motion test based on the measure.

Clause A31. The method/apparatus/system of the walking detection system of Clause A30: wherein the TSF-derived features comprise at least one of: the features of the TSF in a time window encompassing the sliding time window, and at least one of the following of any one of the features: a magnitude, phase, absolute value, norm, magnitude square, function, quantization, polynomial, algebraic function, logarithmic function, exponential function, monotonic function, composite function, and function of functions.

Clause A32. The method/apparatus/system of the walking detection system of Clause A30: wherein any transform comprises at least one of: filtering, linear filtering, lowpass/bandpass/highpass filtering, FIR/IIR filtering, convolution, matched filtering, Kalman filtering, particle filtering, moving average (MA), autoregressive (AR) filtering, ARMA filtering, nonlinear filtering, mean filtering, median filtering, mode filtering, rank filtering, quartile filtering, percentile filtering, selective filtering, adaptive filtering, computation of at least one of the following quantities: absolute value, sign, magnitude, phase, historgram, statistics, maximum (max), minimum (min), local maxima, local minima, zero-crossings, max after mean subtraction, min after mean subtraction, zero-crossings after mean subtraction, timing difference, time difference between any two of: local maxima, local minima, and zero-crossings, moving sum, sliding weighted sum, moving mean, sliding average, moving weighted average, sliding trimmed mean, moving median, sliding mode, moving geometric mean, sliding harmonic mean, moving max, sliding min, moving zero-crossings, sliding max after mean subtraction, moving min after mean subtraction, sliding zero-crossings after mean-subtraction, sliding count, moving histogram, sliding statistics, moving variance, sliding standard deviation, auto-correlation function (ACF), auto-covariance function, cross-correlation function, cross-covariance function, moving ACF matrix, moment generating function, sliding function of at least one quantity, function of functions of the at least one quantity, linear mapping, scaling, nonlinear mapping, companding, folding, grouping, sorting, thresholding, soft thresholding, hard thresholding, clipping, soft clipping, quantization, vector quantization, interpolation, decimation, subsampling, upsampling, resampling, time correction, timebase correction, phase/magnitude correction or cleaning, enhancement, restoration, denoising, smoothing, signal conditioning, magnitude feature extraction, magnitude/phase/energy extraction, key-point detection, local max/local min/zero-crossing extraction, peak detection, valley detection, reflection point detection, zero-cross detection, false-peak detection/removal, false valley detection/removal, false zero-crossing detection/removal, spectral analysis, linear transform, nonlinear transform, inverse transform, frequency transform, Fourier transform (FT), discrete time FT (DTFT), discrete FT (DFT), fast FT (FFT), wavelet transform, discrete wavelet transform (DWT), cosine transform, DCT, sine transform, DST, trigonometric transform, Laplace transform, Hilbert transform, Hadamard transform, slant transform, power-of-2 transform, sparse transform, graph-based transform, graph signal processing, fast transform, padding, zero padding, cyclic padding, decomposition, projection, orthogonal projection, non-orthogonal projection, over-complete projection, eigen-decomposition, singular value decomposition (SVD), principle component analysis (PCA), independent component analysis (ICA), first order derivative, second order derivative, higher order derivative, regression, spline fitting, B-spline fitting, approximation, optimization, constrained optimization, maximization, minimization, local maximization, local minimization, optimization of a cost function, least mean square error, recursive least square, constrainted least square, batch least square, error, mean square error, mean absolute error, regression error, spline error, B-spline error, approximation error, least absolute error, least mean square deviation, least absolute deviation, neural network, recognition, training, clustering, machine learning, supervised/unsupervised/semi-supervised learning, comparison with another TSCI, similarity score computation, distance computation, matching pursuit, compression, encryption, coding, storing, transmitting, normalization, temporal normalization, frequency domain normalization, classification, labeling, tagging, learning, detection, estimation, learning network, mapping, remapping, expansion, storing, retrieving, transmitting, receiving, representing, merging, combining, splitting, tracking, monitoring, intrapolation, extrapolation, histogram estimation, importance sampling, Monte Carlo sampling, compressive sensing, representing, merging, combining, splitting, scrambling, error protection, forward error correction, doing nothing, addition, subtraction, multiplication, division, vector addition, vector subtraction, vector multiplication, vector division, mean subtraction, mean removal, centroid subtraction, DC adjustment, norm, conditioning averaging, weighted averaging, arithmetic mean, geometric mean, harmonic mean, averaging over selected frequency, averaging over antenna links, logical operation, permutation, combination, rearrangement, re-order, time varying processing, logical transform, AND, OR, XOR, union, intersection, morphological operation, inverse operation, a combination of transforms, more than one transforms, and another operation.

Clause A33. The method/apparatus/system of the walking detection system of Clause A30: wherein deriving the iteratively-derived features iteratively from a set of data comprise computing at least one of: an intensity feature, representative feature, typical feature, central tendency measure, sum, weighted sum, average, weighted average, mean, arithmeic mean, geometric mean, harmonic mean, weighted mean, trimmed mean, median, weighted median, mode, dominant feature, impulsiveness measure, outlier measure, impulsiveness measure, maximum (max), minimum (min), local max, local min, mean-removed max, mean-removed min, median-removed max, median-removed min, mode-removed max, mode-removed min,local-max-to-local-min range, local-max-to-local-min ratio, local-max-to-local-min difference, max-to-min range, max-to-min ratio, max-to-min difference, max-to-mean range, max-to-mean ratio, max-to-mean difference, max-to-median range, max-to-median ratio, max-to-median difference, max-to-mode range, max-to-mode ratio, max-to-mode difference, maximum likelihood (ML) feature, maximum aposterior probability (MAP) feature, percentage over mean, percentage over absolute mean, percentage over median, percentage of data over absolute median, percentage over mode, periodicity measure, pace measure, time, timing, timing separation, timing difference, mean timing separation, mean timing difference, timing of max, timing of min, timing of zero-crossing, timing of mean-removed max, timing of mean-removed min, timing of mean-removed zero-crossing, time difference between successive max, time difference between successive min, time difference between successive max and min, time difference between successive zero-crossing, duration, sum of time difference, average of time difference, variance of time difference, variability of time difference, regularity measure, rhythmicty measure, steadiness measure, direction-steadiness measure, repeatibility measure, similarity measure, variability measure, variation measure, stationarity measure, variance, standard deviation, variation, variation ratio, derivative, slope, total variation, absolute variation, square variation, spread, dispersion, variability, deviation, absolute deviation, square deviation, total deviation, divergence, range, interquartile range, L-moment, coefficient of variation, quartile coefficient of dispersion, mean absolute difference, Gini coefficient, relative mean difference, median absolute deviation, average absolute deviation, distance standard deviation, coefficient of dispersion, entropy, variance-to-mean ratio, maximum-to-minimum ratio, likelihood, probability distribution function, sample distribution, moment generating function, expected value, expected function, distance, norm, projection, inner product, dot product, outer product, similarity score, auto-correlation, auto-covariance, cross-correlation, cross-covariance, symmetry measure, distortion measure, skewness, tail measure, kurtosis, a function of any of the above, and another feature.

Clause A34. The method/apparatus/system of the walking detection system of Clause A30: wherein the SI of TSSI comprises a 3-axis acceleration; wherein each of the features of the TSF comprises a magnitude of a projection of each 3-axis acceleration to a gravity direction; computing a test measure associated with a target motion test as a maximum of the features in the sliding time window; performing the target motion test based on the test measure; determining the target motion test as "passed" if the test measure is less than an upper threshold and greater than a lower threshold.

Clause A35. The method/apparatus/system of the walking detection system of Clause A30: wherein the SI of TSSI comprises a 3-axis acceleration; wherein each of the features of the TSF comprises a magnitude of a projection of each 3-axis acceleration to a gravity direction; computing a plurality of local maxima of the features in the sliding time window; computing a test measure associated with a target motion test as at least one of: mean, weighted average, trimmed mean, median, mode, maximum, and minimum, of the plurality of local maxima; performing the target motion test based on the test measure; determining the target motion test as "passed" if the test measure is less than an upper threshold and greater than a lower threshold.

Clause A36. The method/apparatus/system of the walking detection system of Clause A30: wherein the SI of TSSI comprises a 3-axis acceleration; wherein each of the features of the TSF comprises a magnitude of a projection of each 3-axis acceleration to a gravity direction; computing a plurality of local maxima of the features in the sliding time window; computing a plurality of local minima of the features in the sliding time window; computing a plurality of negated local minima by negating each of the plurality of local minima; computing a plurality of absolute local minima by computing absolute value of each of the plurality of local minima; computing a test measure associated with a target motion test as at least one of: mean, weighted average, trimmed mean, median, mode, maximum, and minimum, of at least one of: the plurality of local maxima, the plurality of minima, the plurality of negated minima and the plurality of absolute local minima; performing the target motion test based on the test measure; determining the target motion test as "passed" if the test measure is less than an upper threshold and greater than a lower threshold.

Clause A37. The method/apparatus/system of the walking detection system of Clause A30: wherein the SI of TSSI comprises a 3-axis acceleration; wherein each of the features of the TSF comprises a magnitude of a projection of each 3-axis acceleration to a gravity direction; computing a first threshold as at least one of: mean, weighted average, trimmed mean, median, mode, a scaled maximum, a sum of the mean and a scaled standard deviation, of at least one of: the features in the sliding time window, and absolute values of the features in the sliding time window; computing a test measure associated with a target motion test as a percentage of the features in the sliding time window that are greater than the first threshold; performing the target motion test based on the test measure; determining the target motion test as "passed" if the test measure is greater than a second threshold.

Clause A38. The method/apparatus/system of the walking detection system of Clause A30: wherein the SI of TSSI comprises a 3-axis acceleration; wherein each of the features of the TSF comprises a magnitude of a projection of each 3-axis acceleration to a gravity direction; computing a histogram of the features of the TSF in the slide time window; computing a test measure associated with a target motion test as at least one of: a X-percentile of the features, and a sum of top (100−X) percent of the features based on the histogram, X being a preselected value between 0 and 100; computing a threshold as at least one of: mean, weighted average, trimmed mean, median, mode, a scaled maximum, a sum of the mean and a scaled standard deviation, of at least one of: the features in the sliding time window, and absolute values of the features in the sliding time window; performing the target motion test based on the test measure; determining the target motion test as "passed" if the test measure is greater than the threshold.

Clause A39. The method/apparatus/system of the walking detection system of Clause A30: wherein the SI of TSSI comprises a 3-axis acceleration; wherein each of the features of the TSF comprises a magnitude of a projection of each 3-axis acceleration to a gravity direction; computing a time series of reference features, each reference feature being at least one of: average, weighted average, moving mean, moving weighted mean, moving trimmed mean, moving median, moving mode, and average of moving maximum and moving minimum, of the features of the TSF; computing a time series of reference-subtracted feature (RSF), each RSF being a difference between the features of the TSF and the corresponding reference features; computing a test measure associated with a target motion test as at least one of: a percentage of RSF in the sliding window greater than a first threshold, an X-percentile of RSF in the sliding window, and at least one of: mean, weighted mean, trimmed mean, median, mode, maximum and minimum, of the top (100−X)-percent of RSF in the sliding window; performing the target motion test based on the test measure; determining the target motion test as "passed" if the test measure is greater than a second threshold.

Clause A40. The method/apparatus/system of the walking detection system of Clause A39, further comprising: normalizing the reference-subtracted features.

Clause A41. The method/apparatus/system of the walking detection system of Clause A6: wherein the SI of TSSI comprises a 3-axis acceleration; wherein each of the features of the TSF comprises a magnitude of a projection of each 3-axis acceleration to a gravity direction; computing zero-crossings of the features of the TSF associated with the sliding time window; computing a plurality of time differences, each being time difference between a pair of adjacent zero-crossings associated with the sliding time window; computing a test measure associated with a target motion test as a ratio of a maximum time difference associated with the sliding time window to a minimum time difference associated with the sliding time window; performing the target motion test based on the test measure; determining the target motion test as "passed" if the test measure is less than a threshold.

Clause A42. The method/apparatus/system of the walking detection system of Clause A6: wherein the SI of TSSI comprises a 3-axis acceleration; wherein each of the features of the TSF comprises a magnitude of a projection of each 3-axis acceleration to a gravity direction; computing zero-crossings of the features of the TSF associated with the sliding time window; computing a plurality of time differences, each being time difference between a pair of adjacent zero-crossings associated with the sliding time window; computing a test measure associated with a target motion test as at least one of: variance, standard deviation, variation, variation ratio, derivative, total variation, absolute variation, square variation, spread, dispersion, variability, deviation, absolute deviation, square deviation, total deviation, divergence, range, skewness, kurtosis, interquartile range, L-moment, coefficient of variation, quartile coefficient of dispersion, mean absolute difference, Gini coefficient, relative mean difference, median absolute deviation, average absolute deviation, distance standard deviation, coefficient of dispersion, entropy, variance-to-mean ratio, and likelihood, of the plurality of time difference; performing the target motion test based on the test measure; determining the target motion test as "passed" if the test measure is less than a threshold.

Clause A43. The method/apparatus/system of the walking detection system of Clause A6: wherein the SI of TSSI comprises a 3-axis acceleration; wherein each of the features of the TSF comprises a magnitude of a projection of each 3-axis acceleration to a gravity direction; determining a subdivision of the sliding time window into a number of overlapping segments; computing a number of autocorrelation functions (ACFs) of the features of the TSF, each associated with one of the overlapping segments; smoothing each ACF; computing at least one local maximum for each smoothed ACF; determining a respective local maximum associated with a respective time lag for each smoothed ACF, wherein all the respective time lags are close to each other; computing a first test measure associated with a target motion test as at least one of: a sum, weighted average, trimmed mean, median, mode, maximum, minimum, of the respective local maximum of each smoothed ACF at the respective time lag; computing a second test measure associate with the target motion test as at least one of: variance, standard deviation, variation, variation ratio, derivative, total variation, absolute variation, square variation, spread, dispersion, variability, deviation, absolute deviation, square deviation, total deviation, divergence, range, skewness, kurtosis, interquartile range, L-moment, coefficient of variation, quartile coefficient of dispersion, mean absolute difference, Gini coefficient, relative mean difference, median absolute deviation, average absolute deviation, distance standard deviation, coefficient of dispersion, entropy, variance-to-mean ratio, and likelihood, of the respective time lag of each smoothed ACF; computing a third test measure associated with a target motion test as at least one of: a sum, weighted average, trimmed mean, median, mode, maximum, minimum, of the respective local maximum of each smoothed ACF at a common time lag, wherein the common time lag is at least one of: an average, weighted average, trimmed mean, median, mode, maximum, minimum, and a particular one, of the respective time lag; performing the target motion test based on the test measure; determining the target motion test as "passed" if at least one of: the first test measure is at least one of: greater than a first threshold T1, and less than a second threshold T2, the second test measure is less than a third threshold T3, and the third test measure is greater than a fourth threshold T4.

Clause A44. The method/apparatus/system of the walking detection system of Clause A43: computing the common time lag by optimizing a weighted sum of the number of ACF.

Clause A45. The method/apparatus/system of the walking detection system of Clause A6: wherein the SI of TSSI comprises a 3-axis acceleration; wherein each of the features of the TSF comprises a magnitude of a projection of each 3-axis acceleration to a gravity direction; determining a subdivision of the sliding time window into a number of overlapping segments; computing a number of frequency transform (FT) of the features of the TSF, each associated with one of the overlapping segments; smoothing each FT; computing at least one local maximum for each smoothed FT; determining a respective local maximum associated with a respective frequency for each smoothed FT, wherein all the respective frequency are close to each other; computing a first test measure associated with a target motion test as at least one of: a sum, weighted average, trimmed mean, median, mode, maximum, minimum, of the respective local maximum of each smoothed ACF at the respective frequency; computing a second test measure associate with the target motion test as at least one of: variance, standard deviation, variation, variation ratio, derivative, total variation, absolute variation, square variation, spread, dispersion, variability, deviation, absolute deviation, square deviation, total deviation, divergence, range, skewness, kurtosis, interquartile range, L-moment, coefficient of variation, quartile coefficient of dispersion, mean absolute difference, Gini coefficient, relative mean difference, median absolute deviation, average absolute deviation, distance standard deviation, coefficient of dispersion, entropy, variance-to-mean ratio, and likelihood, of the respective frequency of each smoothed ACF; computing a third test measure associated with a target motion test as at least one of: a sum, weighted average, trimmed mean, median, mode, maximum, and minimum, of the respective local maximum of each smoothed ACF at a common frequency, wherein the common frequency is at least one of: an average, weighted average, trimmed mean, median, mode, maximum, minimum, and a particular one, of the respective frequency; performing the target motion test based on the test measure; determining the target motion test as "passed" if at least one of: the first test measure is at least one of: greater than a first threshold T1 and smaller than a second threshold T2, the second test measure is less than a third threshold T3, and the third test measure is greater than a fourth threshold T4.

Clause A46. The method/apparatus/system of the walking detection system of Clause A45, further comprising: computing the common time lag by optimizing a weighted sum of the number of FT.

Clause A47. The method/apparatus/system of the walking detection system of Clause A45: wherein the FT comprises at least one of: Fourier transform (FT), discrete time FT (DTFT), discrete FT (DFT), fast FT (FFT), wavelet transform, discrete wavelet transform (DWT), cosine transform, DCT, sine transform, DST, trigonometric transform, Laplace transform, Hilbert transform, Hadamard transform, slant transform, power-of-2 transform, sparse transform, graph-based transform, graph signal processing, fast transform, padding, zero padding, cyclic padding.

Driver arrival sensing which enables a car to detect an approaching driver has been playing an important role in the evolving smart car system. The present teaching discloses a driver arrival sensing scheme based on the fine time measurement (FTM) released in the IEEE 802.11mc protocol. When the initiating station (ISTA), such as a mobile phone or WiFi client, keeps moving towards the response station (RSTA), usually a WiFi access-point (AP), there exists a knee point of the WiFi-FTM range estimation after which the variation of the WiFi-FTM range estimations follows a stable trend regardless of the environment. As such, the present teaching discloses a joint knee point detection and driver arrival time estimation algorithm based on the trend of WiFi-FTM range estimations. Given the arrival time, the car (RSTA) can determine the right time to start the service requested by the driver. One can implement the disclosed method using commercial 802.11mc WiFi chipsets and conduct extensive experiments in different parking lots with different testers. Some results show that the scheme can achieve≥92.5% accuracy with less than is arrival time estimation error.

With the proliferation of WiFi devices in the past several decades, many WiFi-based applications for smart car systems such as activity recognition, driver authentication and Advanced Driver Assistance Systems (ADAS) have emerged. While these applications are mainly for in-car use, there have not been many out-car applications such as driver arrival sensing that needs to be further explored. Driver arrival sensing is often used in remote control including locking/unlocking the door, opening/closing the window/convertible tops and remote ignition key. While these applications focus more on the driver's presence sensing, there are many other applications which need to estimate the accurate arrival time of the driver (AToD).

For example, a car needs to sense the AToD so that the air conditioner (AC) system can be turned on at a right time. Turning on the AC too early will cause extra energy consumption while turning on the AC too late may lead to an uncomfortable temperature when the driver arrives. In the future, the car system may consist of many service systems such as driver identification to make it more intelligent. As a result, a smart car needs to sense the AToD so that it can manage multiple services properly such as starting a time-consuming service (e.g., driver identification) earlier while responding to a time-saving service (e.g., door close/open) later on. On the other hand, the current driver sensing system mainly applies a digital code matching and rolling scheme by wireless transponders, which has a serious security issue. As a result, security needs to be enhanced in the AToD sensing system as well. To address the aforementioned challenges, the present teach discloses an AToD sensing algorithm by leveraging the WiFi-FTM protocol introduced in IEEE 802.11mc. There are two main advantages by using WiFi than the traditional low-power transponders. First, the larger coverage of WiFi devices enables an earlier detection of the AToD. Second, WiFi provides more secure encryptions such as Wired Equivalent Privacy (WEP) and Wi-Fi Protected Access (WPA) than the present digital code identification and rolling systems. In addition, a new released app to measure the distance to nearby FTM-capable Wi-Fi access points (APs) makes the WiFi-FTM more available.

One can evaluate the accuracy of the WiFi-FTM range estimations in the practical parking lots by using the commercial 802.11mc WiFi chipsets. There always exists a knee point after which the WiFi-FTM range estimations show a stable trend when the ISTA (driver/client) keeps moving towards the RSTA (fixed on a car). Based on such an observation, a novel algorithm is disclosed to detect the knee point and estimate the AToD. Experiment results show that the disclosed system can achieve≥92.5% accuracy with less than is error of the AToD estimation.

Figure 9:
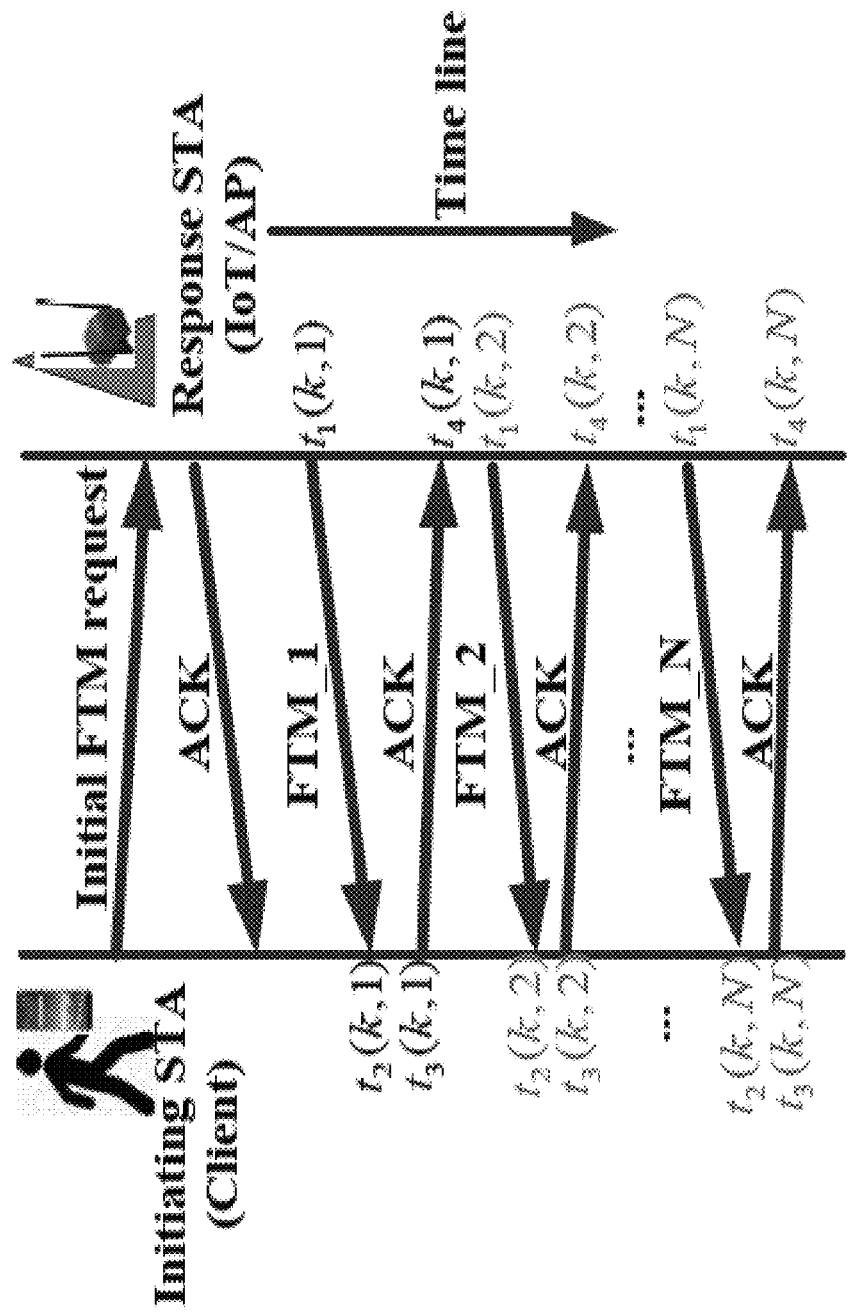
FIG. 9 illustrates an overview of a protocol of fine time measurement (FTM), according to some embodiments of the present disclosure.

WiFi-FTM was released in IEEE 802.11mc to enable the range estimations between two WiFi cards by using the round trip time (RTT). As shown in FIG. 9, N FTMs in a single burst can be averaged to get more accurate RTT estimations. The distance estimation RIS(k) at burst k between the ISTA and RSTA is given by $$R_{IS}(k) = \frac{1}{2N} \sum_{n=1}^{N} [(t_4(k, n) - t_1(k, n)) - (t_3(k, n) - t_2(k, n))] \cdot c \quad (1)$$

where c=3×10^8 m/s is the light speed, t1(k; n) and t4(k; n) denotes the departure and arrival time measured by the RSTA at burst k, pulse n. Similarly, t2(k; n) and t3(k; n) are the arrival and departure time recorded by the ISTA. Generally, t1(k; n) and t4(k; n) are sent back to ISTA for range estimations between the ISTA and RSTA. Note that the exchange of the FTMs and its acknowledgment frame (ACK) is usually finished within a very short period. Hence, the clocks of the two stations do not drift significantly.

However, impacted by the multipath propagation and blockage in non-line-of-sight (NLOS) scenarios, the range estimation provided by Eqn. (1) may not be accurate. In one example, where a user equipped with an ISTA is walking towards his car equipped with an RSTA. The user may approach the car along Route 1 (A→B→D→E) or Route 2 (A→C→G→D→E) or other routes. Taking Route 1 as an example, at the starting point 'A', the WiFi-FTM-based distance estimations may be inaccurate due to NLOS of point A. However, as the user gets closer to the car, e.g., passing point 'B' (or point 'G' in Route 2), the LOS signal starts to dominate and the WiFi-FTM-based distance estimations become more accurate. It is expected that the distance estimations when the user approaches his car should exhibit a knee-point after which distance estimation becomes reliable.

To verify the existence of the knee point in distance estimation, one can conduct multiple experiments with settings as follows. One can implement the WiFi-FTM using commercial 802.11mc WiFi chipsets. One WiFi chipset may be integrated with a control board to work as an RSTA which is fixed on top of a car during the test. Another WiFi chipset is installed on a board to work as an ISTA. To build a mobile client, the ISTA is put in a box (named as TestBox) and carried by a tester in the test. The ISTA board runs Linux OS and receives instructions from a smart tablet through an Ethernet cable. The smart tablet works as a GUI through which one can control the ISTA such as sending/stopping request and get real time WiFi-FTM range estimations from the ISTA board.

In the experiment, the RSTA is fixed on top of a car in the parking lot, and a tester holds the TestBox while moving towards the car from different directions and initial distances. The initial distance means the distance between the ISTA and RSTA when the tester starts to move. Once the tester arrives at the car, he/she records the WiFi-FTM range estimation showing on the GUI of the smart tablet manually as the ground truth of the arrival time TAM. Different testers are invited to walk at different speeds. Extensive experiments can be conducted in different parking lots and garages on weekdays where the test car is surrounded by different cars during the data collection.

Figure 10:
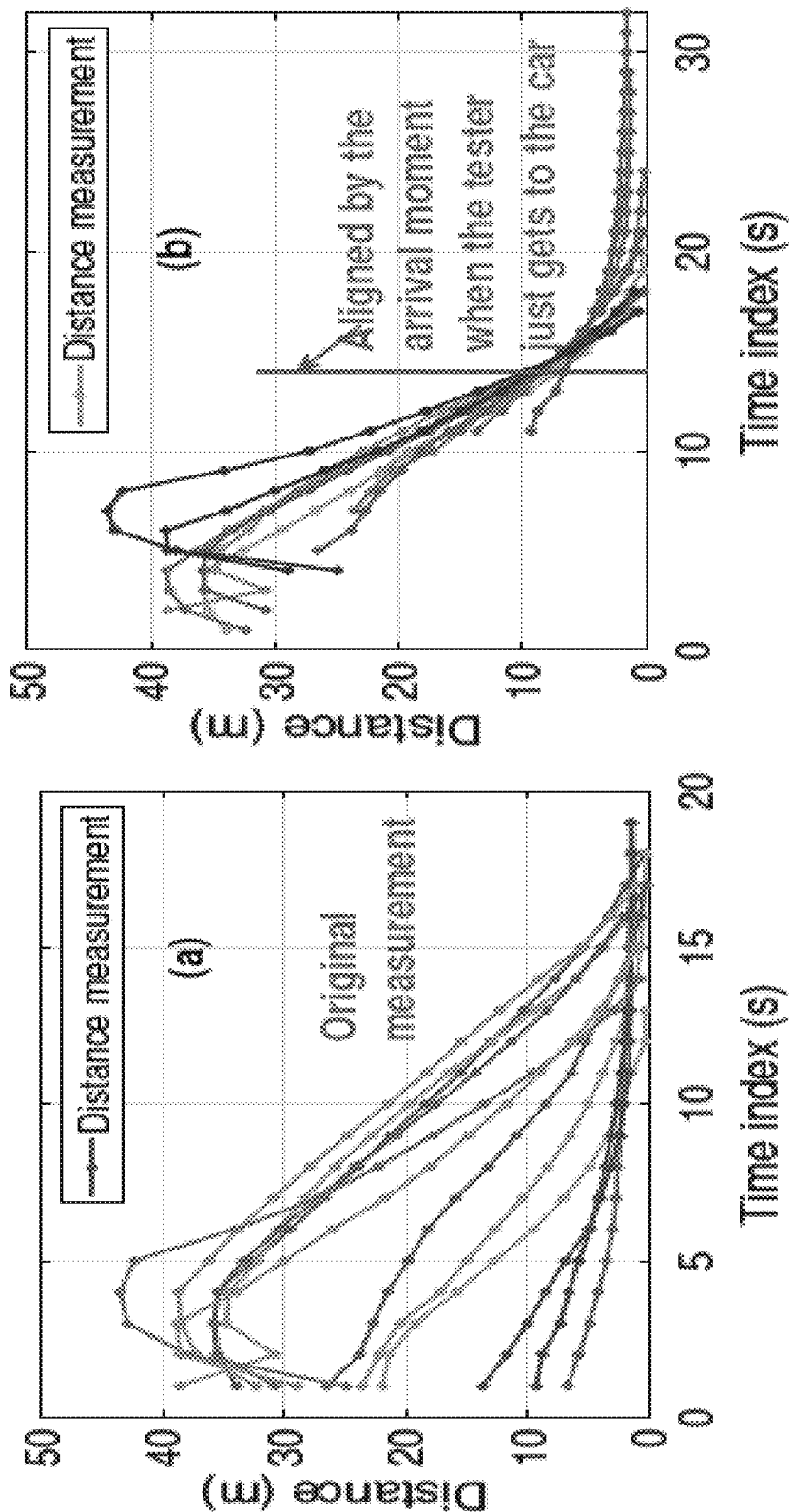
FIG. 10 illustrates exemplary distance measurements when an initiating station (ISTA) starts to approach a response station (RSTA) from different directions and initial distances, according to some embodiments of the present disclosure.

FIG. 10 shows the distance measurements with different initial distances and different directions, i.e., different routes R1, R2 . . . Rn. Results when a tester is running (about 3 m/s) and walking slowly (about 1 m/s) to the car can be obtained to test the impact of the moving speed of the ISTA. The range estimations variate irregularly at the beginning and show a stationary trend passing a Knee Point. From FIG. 10, one can denote the moment when the tester gets to the car as Arrival Time TAM which is labeled every time manually. At the beginning, the distance measurement changes randomly versus the walking time due to the random errors brought by the serious multipaths. As the ISTA keeps moving close to the RSTA, the distance measurements begin to decay linearly w.r.t. walking time. For example, in FIG. 10, if one aligns the distance measurements according to the TAM, the decaying trend is very consistent near TAM. If one can detect such a knee point and estimate the accurate distance between the ISTA and RSTA as early as possible, the RSTA can predict the arrival time of the ISTA and response to the request from the ISTA properly. A novel knee point detection and driver arrival time estimation method will be described later based on the aforementioned observations.

Figure 11:
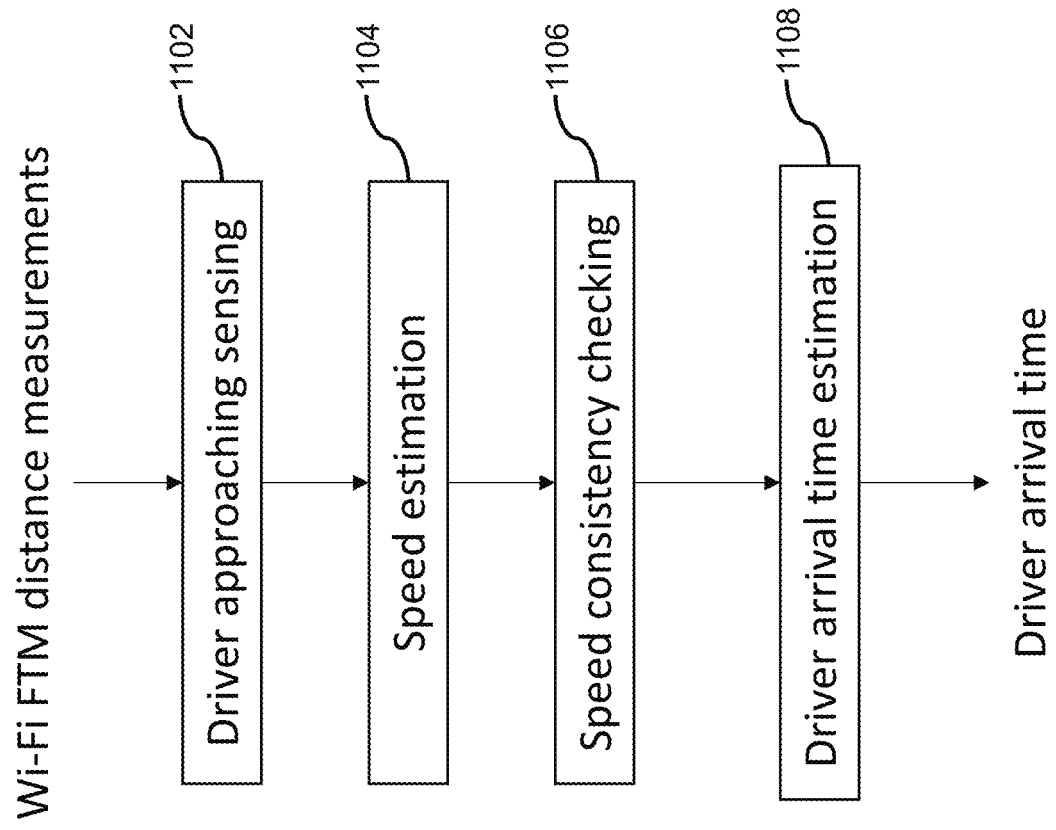
FIG. 11 illustrates a flow chart of an exemplary method for driver arrival sensing based on fine time measurement (FTM), according to some embodiments of the present disclosure.

FIG. 11 illustrates a flow chart of an exemplary method 1100 for driver arrival sensing based on fine time measurement (FTM), according to some embodiments of the present disclosure. At operation 1102, driver approaching sensing is performed based on distance measurements obtained based on WiFi FTM. At operation 1104, speed estimation is performed after sensing the driver approaching, e.g. a car. At operation 1106, speed consistency checking is performed. At operation 1108, driver arrival time estimation is performed to determine an arrival time of the driver.

Figure 12:
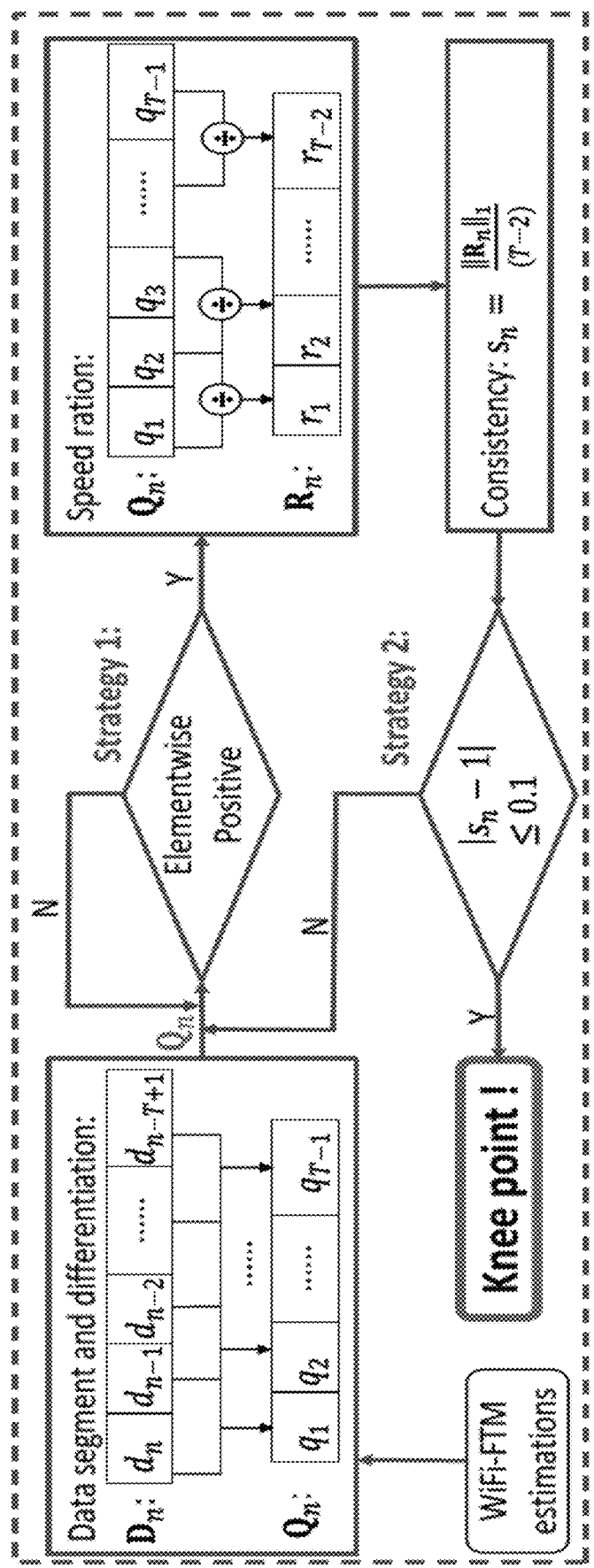
FIG. 12 illustrates key steps of a knee point detection for driver arrival sensing, according to some embodiments of the present disclosure.

To detect a knee point, one can have WiFi-FTM distance sequence $D_n=[d_n, d_{n-1}, \ldots d_2, d_1]$ at time $t_n$, the instant speed of the ISTA at time $t_n$ can be written as $$q_n = \frac{d_{n-1} - d_n}{t_n - t_{n-1}}. \quad (2)$$

where $t_n$ and $d_n$ denote the sample time and the WiFi-FTM-based distance estimation at time $t_n$, respectively. To get an aver-aged/reliable speed estimation, one can take the latest T distance points, i.e., $[d_n, d_{n-1}, \ldots d_{n-T+1}]$, where T is termed as a window length as shown in FIG. 12, which shows key steps of a knee point detection for driver arrival sensing, according to some embodiments of the present disclosure. If the ISTA has stepped into the area where the LOS dominates, $D_n$ is monotonically decreasing. As a result, every element in the instant speed estimation sequence $Q_n=[q_1, q_2, \ldots q_{T-1}]$ should be positive, corresponding to strategy 1 in FIG. 12, since the distance $d_n$ gets smaller and smaller with ISTA approaching the RSTA.

In addition, the natural walking speed of a driver can be assumed as a constant during the whole journey when the driver walks towards his/her car. As a result, the speed estimations within $Q_n$ should be consistent while small deviations are allowed because of the measurement errors. To quantify the speed consistency, one can define the average of speed ratios within a window of length T as the speed consistency $s_n$, which is given by $$s_n = \frac{\|R_n\|_1}{T-2} = \frac{1}{T-2}\sum_{n=1}^{T-2}\frac{q_n}{q_{n+1}}, \quad (3)$$

where $R_n=[r_1, r_2, \ldots r_{T-2}]$ represents the speed ratio with $r_i=q_{i+1}/q_i$ (i=1, 2, ..., T-2). Operation $\|.\|_1$ denotes the $l_1$-norm. In strategy 2 of FIG. 12, if $|s_n-1|\leq 0.1$, the speed estimation sequence $Q_n$ is regarded as a consistent speed estimation sequence and the knee point $d_n$ is detected.

To estimate the arrival time, one can first define a LOS-Area which is centered around the location of RSTA. Within the LOS-Area, the LOS signal component dominates and the WiFi-FTM range estimations are accurate. Generally, the LOS-Area has different radii in different directions w.r.t. the RSTA due to the impact of multipaths.

To be a knee point, there are two main constraints. First, the knee point should lie on the edge of LOS-Area. If the ISTA goes further away than the knee point, the distance estimation accuracy will degrade. Second, once the ISTA passes through the knee point and keeps approaching to the RSTA, the WiFi-FTM distance measurements should be accurate. To meet the two constraints, the knee point should be no further and closer. Assume that the ISTA is $d_k$ distance away from the RSTA at the knee point and the natural walking speed of a tester is relatively constant, the arrival time can be expressed as $$\hat{T}_{AM}^k = \frac{d_k}{v_k}, v_k = \frac{1}{T-1}\sum_{n=1}^{T-1}q_n. \quad (4)$$

Note that the accuracy of the arrival time $\hat{T}_{AM}$ can be evaluated based on the recording of the true arrival time $T_{AM}$ once the ISTA arrives at the car.

To summarize the arrival time estimation method, in some embodiments, given the RTT readings, the system may estimate the distances based on Eqn. (1):

$$R_{IS}(k) = \frac{1}{2N}\sum_{n=1}^{N}[(t_4(k,n) - t_1(k,n)) - (t_3(k,n) - t_2(k,n))] \cdot c$$

from the user (TX) to the RX (response STA, or RSTA) as he walks towards the RX. The time series of speed can be estimated by Eqn. (2):

$$q_n = \frac{d_{n-1} - d_n}{t_n - t_{n-1}}.$$

If the speed becomes element-wise positive, it means the user has started to step into the LOS area and the distance/range estimation has shown a stationary trend based on which the system can estimate the distance or speed reliably. Natural walking speed is assumed to be constant when the user walks to his car. Then, after the user stepping into the LOS area, the system may check the speed consistency by the radio of consecutive speed estimates in Eqn. (3):

$$s_n = \frac{\|R_n\|_1}{T-2} = \frac{1}{T-2}\sum_{n=1}^{T-2}\frac{q_n}{q_{n+1}},$$

or other metrics, such as the variance, span, etc. If consistency condition is satisfied, the estimated speed after consistency checking is the user walking speed. One can assume that the user is $d_k$ distance away from the RSTA at the knee point and the natural walking speed of a tester is relatively constant, the arrival time from at the knee point to the car can be expressed as Eqn. (4):

$$\hat{T}_{AM}^k = \frac{d_k}{v_k}, v_k = \frac{1}{T-1}\sum_{n=1}^{T-1}q_n.$$

To evaluate the estimation accuracy of the arrival time TAM, one may conduct multiple experiments where a tester walks at different speeds including normal walking at about 1.2 m/s, running at about 3 m/s and walking very slowly at about 1 m/s. For each test, the tester can be asked to walk close to the car (RSTA) in 30 different routes and different directions. The initial distance varies from 20 m to 30 m. One does not need to set all the initial distances as 30 m since some specific locations may be occupied by other cars. One can repeat the experiment in different parking lots and different testers. Results about the arrival time estimation are given in Table I shown in FIG. 13. Clearly, the disclosed method can achieve more than 92% percentile accuracy with no greater than is error. From Table I, the estimated arrival time $\hat{T}_{AM}$ is more likely to be underestimated than the true arrival time $T_{AM}^k$. This is because that the WiFi-FTM range measurements correspond to the straight line between the ISTA and RSTA in theory. However, in practice, a tester/ISTA cannot approach to the car/RSTA along the straight line because of obstacles such as other cars. In this sense, the distance measurement is usually shorter than the real walking distance, thus causing underestimation of the arrival time $\hat{T}_{AM}^k$.

The present teaching thus disclosed a driver arrival time sensing method by using the WiFi-FTM range estimations which are proved to show a stable changing-trend after a knee point when the ISTA keeps moving close to the RSTA. The present teaching disclosed a knee point detection and a driver arrival time estimation scheme. Experimental evaluations using commercial 802.11mc WiFi chipsets show that the disclosed system can achieve≥92.5% accuracy with ≤1 s arrival time estimation error regardless of the environments and users.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for movement tracking, comprising:
   at least one sensor configured to generate at least one sensing information (SI);
   a memory;
   a processor communicatively coupled to the memory and the at least one sensor; and
   a set of instructions stored in the memory which, when executed by the processor, cause the processor to:
      obtain at least one time series of SI (TSSI) from the at least one sensor,
      analyze the at least one TSSI,
      track a movement of an object in a venue based on the at least one TSSI,
      compute an incremental distance associated with the movement of the object in a first incremental time period based on the at least one TSSI,
      compute a direction associated with the movement of the object in a second incremental time period based on the at least one TSSI,
      compute a next location of the object at a next time based on: a current location of the object at a current time, a current orientation of the object at the current time, the incremental distance, the direction, and a map of the venue,
      determine an underlying rhythmic motion associated with the movement,
      identify a rhythmic behavior of the at least one TSSI associated with the underlying rhythmic motion,
      compute a time series of intermediate quantity (IQ) based on the at least one TSSI,
      identify an additional rhythmic behavior of the time series of IQ (TSIQ) associated with the underlying rhythmic motion,
      compute a time series of mean-subtracted IQ (MSIQ) by subtracting a time series of local means from the TSIQ, wherein the local means are obtained by applying a moving average filter to the TSIQ, segment the time series of MSIQ (TSMSIQ) in a time window into preliminary segments comprising MSIQ with same polarity, and identify at least one local characteristic point of MSIQ of each preliminary segment, wherein the next location of the object at the next time is computed based on:

initializing an initial number of initial candidate locations of the object at an initial time, computing iteratively a first dynamic number of first candidate locations of the object at the next time based on a second dynamic number of second candidate locations of the object at the current time, and computing the next location of the object at the next time based on at least one of: the first dynamic number of first candidate locations at the next time, or the second dynamic number of second candidate locations at the current time, wherein:

the object moves during the first incremental time period in a region represented by the map, the map is a multi-dimensional map represented as a multi-dimensional array A, such that reachability of each location of the region is represented by a corresponding array element a which is a logical value between 0 and 1, a location of the region is unreachable and forbidden when the corresponding array element satisfies a=0, a location of the region is fully reachable when the corresponding array element satisfies a=1, a location of the region is partially reachable when the corresponding array element satisfies: 0<a<1, each of the next location, the current location, the first dynamic number of first candidate locations, and the second dynamic number of second candidate locations, is a point that is fully or partially reachable in the region and is represented as a corresponding array element, and the direction of the movement of the object at any location is locally represented as one of a number of allowable directions.

2. The system of claim 1, wherein:

the at least one sensor comprises at least one of: an inertial measurement unit (IMU), accelerometer, gyroscope, magnetometer, or barometer;

the at least one SI comprises information about at least one of: force, acceleration, acceleration force, acceleration in instantaneous rest frame, orientation, angle, angular velocity, an angle, magnetic field direction, magnetic field strength, magnetic field change, or air pressure; and the direction is computed based on at least one of:

a SI from a gyroscope, a SI from a magnetometer, at least one direction in the second incremental time period, a direction before the second incremental time period, a direction after the second incremental time period, a weighted average of multiple directions associated with the second incremental time period, a direction of the movement at the current time, or a direction of the movement at the next time.

3. The system of claim 2, wherein the set of instructions stored in the memory, when executed by the processor, further cause the processor to:

track the movement of the object based on the rhythmic behavior of the at least one TSSI; and compute the incremental distance based on the rhythmic behavior of the at least one TSSI.

4. The system of claim 3, wherein the set of instructions stored in the memory, when executed by the processor, further cause the processor to:

track the movement of the object based on the additional rhythmic behavior of the TSIQ; and compute the incremental distance based on the additional rhythmic behavior of the TSIQ.

5. The system of claim 4, wherein the set of instructions stored in the memory, when executed by the processor, further cause the processor to:

identify a time window of stable rhythmic behavior of the at least one TSSI or the TSIQ associated with stable underlying rhythmic motion associated with the movement of the object; and add a time stamp to the time window when at least one of the following is satisfied:

a weighted average of the IQ in a sliding window around the time stamp is greater than a first threshold, a feature of an autocorrelation function of IQ around the time stamp is greater than a second threshold, or another criterion associated with the time stamp.

6. The system of claim 5, wherein the set of instructions stored in the memory, when executed by the processor, further cause the processor to:

identify at least one local characteristic point of IQ in the time window, wherein the at least one local characteristic point comprises at least one of: local maximum, local minimum, zero crossing of IQ from positive to negative, zero crossing of IQ from negative to positive;

segment the time window into segments based on time stamps associated with the at least one local characteristic point, each segment spanning from a local characteristic point to another local characteristic point; and identify at least one of: complete cycle, rhythm cycle, compound cycle, extended cycle, double cycle, quad cycle, partial cycle, half cycle, quarter cycle, gait cycle, stride cycle, step cycle, or hand cycle.

7. The system of claim 4, wherein the set of instructions stored in the memory, when executed by the processor, further cause the processor to:

segment the TSMSIQ into segments based on the at least local characteristic point, wherein the at least one local characteristic point comprises at least one of: local maximum, local minimum, reflection point, zero crossing of MSIQ from positive to negative, zero crossing of MSIQ from negative to positive, centroid of preliminary segments, median, first quartile, third quartile, percentile, or mode; and identify at least one of: complete cycle, rhythm cycle, compound cycle, extended cycle, double cycle, quad cycle, partial cycle, half cycle, quarter cycle, gait cycle, stride cycle, step cycle, or hand cycle.

8. The system of claim 6, wherein the set of instructions stored in the memory, when executed by the processor, further cause the processor to:

identify a complete cycle of the TSIQ as at least one of:

a first time period from a first local maximum of the TSIQ to a second local maximum of the TSIQ, a second time period from a first local maximum of the TSIQ to a local minimum of the TSIQ to a second local maximum of the TSIQ, a third time period from a first local maximum of the TSIQ to a zero crossing of the TSIQ to a second local maximum of the TSIQ, or a fourth time period from a first zero crossing to a local minimum to a second zero crossing to a local maximum to a third zero crossing; and recognize the complete cycle based on a finite-state machine (FSM) with local characteristic points as input for state transitions.

9. The system of claim 8, wherein the set of instructions stored in the memory, when executed by the processor, further cause the processor to perform at least one of:
identifying a rhythm cycle as a complete cycle;
identifying a compound cycle as multiple complete cycles;
identifying an extended cycle as multiple complete cycles;
identifying a double cycle as two consecutive cycles;
identifying a quad cycle as four consecutive cycles;
identifying a step cycle as a complete cycle;
recognizing a stride cycle as a double cycle;
recognizing a gait cycle as either a step cycle or a stride cycle; or
recognizing a hand cycle as either a complete cycle or a double cycle.

10. The system of claim 6, wherein the set of instructions stored in the memory, when executed by the processor, further cause the processor to:
compute at least one cycle feature based on at least one of: the IQ in the time window, the at least one local characteristic point of IQ, the segments or the at least one cycle, wherein the at least one cycle feature comprises:
at least one gait speed each being associated with a time stamp in the time window,
at least one gait acceleration each being associated with the time stamp in the time window and being a derivative of gait speed,
at least one step length each being associated with the time stamp in the time window and being an integration of gait speed over a respective step segment around the time stamp,
at least one step period each being associated with the time stamp in the time window and being duration of a respective step segment around the time stamp, and
at least one step frequency each being associated with the time stamp in the time window and being inversely proportion to a respective step period around the time stamp.

11. The system of claim 10, wherein the set of instructions stored in the memory, when executed by the processor, further cause the processor to:
communicate one of the at least one cycle feature to a server;
communicate a cycle feature to a user device;
communicate the next location of the object at the next time to the server;
communicate the next location of the object to the user device; and
generate a presentation of at least one of: the cycle feature, a history of cycle features, the next location, a trajectory, or a trace to a user of the user device.

12. The system of claim 6, wherein the set of instructions stored in the memory, when executed by the processor, further cause the processor to:
compute an amount of cycles in the first incremental time period; and
compute the incremental distance as a multiplicative product of the amount of cycles and a cycle distance, wherein the cycle distance is computed based on at least one of: a user input, a trained value obtained in a training phase, a calibration process or a training process using a reference distance from a locationing scheme, an adaptively computed value based on a recent time period of stable rhythmic motion.

13. The system of claim 12, wherein:
the next location of the object at the next time is computed using a particle filter.

14. The system of claim 1, wherein the next location of the object at the next time is computed based on:
computing the first dynamic number of weights each associated with a first candidate location, each weight being a function of at least one of: the current location, the first candidate location, a corresponding second candidate location associated with the first candidate location, the direction of the movement, or a distance between the first candidate location and a first unreachable array element a in the direction; and
computing the next location of the object based on the first dynamic number of first candidate locations, and the associated first dynamic number of weights.

15. The system of claim 14, wherein:
each weight is at least one of:
a monotonic non-decreasing function of the distance between the first candidate location and the first unreachable array element a in the direction, or
a bounded function of the distance between the first candidate location and the first unreachable array element a in the direction;
the next location of the object at the next time is computed as at least one of:
a weighted average of the first dynamic number of first candidate locations, or
one of the first candidate locations.

16. The system of claim 15, wherein the next location of the object at the next time is computed based on:
normalizing the weights to generate normalized weights;
computing a weighted cost of each first candidate location with respect to the rest of the first dynamic number of first candidate locations based on the normalized weights, wherein the weighted cost is a weighted sum of pairwise distance between the first candidate location and each of the rest of the first candidate locations; and
choosing the first candidate location with a minimum weighted cost as the next location of the object.

17. The system of claim 1, wherein the next location of the object at the next time is computed based on:
computing a predicted value for each of the second candidate locations of the object based on at least one of: the second candidate location, the incremental distance, or the incremental time period;
when the predicted value of the second candidate location is fully reachable with associated array element a=1, creating a first candidate location of the object based on the predicted value of the second candidate location;
when the predicted value of the second candidate location is forbidden with associated array element a=0, labeling the second candidate location as "rejected" without creating any first candidate location;
when the predicted value of the second candidate location is partially reachable with associated array element satisfying 0<a<1, generating a random number between 0 and 1, and creating a first candidate location of the object based on the predicted value of the second candidate location when the random number is less than a; and when a quantity of the first candidate locations is smaller than a threshold, generating a new first candidate location of the object by probabilistically taking on the predicted values of second candidate locations that are not rejected, with a probability distribution based on at least one of:
weights associated with the predicted values,
weights associated with the second candidate locations,
array elements of the multi-dimensional array A associated with the predicted values, or
array elements of the multi-dimensional array A associated with the second candidate locations.

18. The system of claim 17, wherein the set of instructions stored in the memory, when executed by the processor, further cause the processor to:
maintain a dynamic number of candidate locations at any time;
change the dynamic number of candidate locations by at least one of:
initializing at least one candidate location,
updating at least one candidate location,
adding at least one candidate location,
pausing at least one candidate location,
stopping at least one candidate location,
resuming at least one paused candidate location,
reinitializing at least one stopped candidate location, or
removing at least one candidate location;
compute the next location of the object at the next time based on: the dynamic number of candidate locations at the next time, and the dynamic number of candidate locations at another time, wherein the dynamic number of candidate locations is bounded by an upper limit and a lower limit; and
add at least one candidate location when the dynamic number of candidate locations is lower than the lower limit.

19. The system of claim 18, wherein the set of instructions stored in the memory, when executed by the processor, further cause the processor to:
compute a likelihood score associated with the complete cycle based on at least one of: the TSIQ, the TSMSIQ or the TSSI; and
validate a complete cycle as a target type of cycle when the likelihood score is larger than a threshold, wherein the likelihood score is computed based on:
computing a time period associated with the complete cycle with a corresponding start-time and a corresponding end-time of the time period;
computing at least one of the following features of the TSIQ or the TSMSIQ in the time period: a sum, a weighted sum, a sum of magnitude, a weighted sum of magnitude, a local maxima, a zero-crossing, a local minimum, a maximum derivative, a minimum derivative, or a zero derivative;
computing at least one cycle statistic based on the computed features in the time period; and
computing the likelihood score based on the time period, the at least one cycle statistic, the at least one feature, or a function of the at least one cycle statistic or the at least one feature.

20. The system of claim 19, wherein the set of instructions stored in the memory, when executed by the processor, further cause the processor to:
compute the incremental distance associated with the movement of the object in the time period associated with the complete cycle as a multiplicative product of the likelihood score and a tentative incremental distance.

21. The system of claim 20, wherein:
the object is a human;
the movement is a walking motion or a running motion of the human;
the target type of cycle is a step cycle of the human walking or running; and
the set of instructions stored in the memory, when executed by the processor, further cause the processor to: compute a user status of the human as WALKING or RUNNING, based on validating the complete cycle as the step cycle.

22. The system of claim 21, wherein the set of instructions stored in the memory, when executed by the processor, further cause the processor to:
increment a count of the target cycle based on the validated step cycle;
change the user status from NON-WALKING to WALKING, or from NON-RUNNING to RUNNING, based on at least one of: the validated step cycle, consecutive validated step cycles, or continuous validated step cycles;
determine that a complete cycle is a non-step cycle because the complete cycle fails to be validated as a target cycle;
reset the count of the target cycle to be zero; and
change the user status from WALKING to NOT-WALKING or from RUNNING to NON-RUNNING based on the non-step cycle.

23. The system of claim 22, wherein the set of instructions stored in the memory, when executed by the processor, further cause the processor to:
compute a statistics of an observable, wherein the observable comprises one of intermediate quantity (IQ), a cycle feature, a local characteristic point or a feature of a time series of IQ (TSIQ) or a time series of mean-subtracted IQ (TSMSIQ); and
update the statistics by computing a current statistics based on an immediate past statistics and/or a current instance of the observable.

24. The system of claim 23, wherein the set of instructions stored in the memory, when executed by the processor, further cause the processor to:
project the at least one SI from a gyroscope onto the earth reference frame;
compute a cumulative directional change; and
add the cumulative directional change to an initial direction of the movement.

25. The system of claim 24, wherein:
the at least one sensor comprises a barometer;
the at least one SI from the barometer is air pressure; and
the set of instructions stored in the memory, when executed by the processor, further cause the processor to
track a vertical movement of the object based on the air pressure,
estimate an altitude or a vertical position based on the air pressure, and
compute a vertical incremental distance based on the air pressure, the altitude or the vertical position.

26. The system of claim 25, wherein the set of instructions stored in the memory, when executed by the processor, further cause the processor to:

compute a difference between a first increment distance computed using the particle filter to a second incremental distance computed without using the particular filter;

detect a problematic situation when the difference is greater than a threshold.

27. The system of claim 26, wherein the set of instructions stored in the memory, when executed by the processor, further cause the processor to:

generate a number of new first candidate locations that are outside a region associated with the second candidate locations;

replace a number of existing second candidate locations with corresponding new candidate locations that are outside a region associated with the existing second candidate locations; and eliminate a number of existing second candidate locations.

28. A device of a movement tracking system, comprising:
a processor;
a memory communicatively coupled to the processor; and
a sensor communicatively coupled to the processor, wherein:
the sensor is configured to generate at least one sensing information (SI), and
the processor is configured to:
obtain at least one time series of SI (TSSI) from the sensor,
analyze the at least one TSSI,
track a movement of an object in a venue based on the at least one TSSI,
compute an incremental distance associated with the movement of the object in a first incremental time period based on the at least one TSSI,
compute a direction associated with the movement of the object in a second incremental time period based on the at least one TSSI, and
compute a next location of the object at a next time based on at least one of: a current location of the object at a current time, a current orientation of the object at the current time, the incremental distance, the direction, or a map of the venue, wherein the next location of the object at the next time is computed using a particle filter and based on:
initializing an initial number (N_0) of initial candidate locations of the object at an initial time (t=0),
computing iteratively a first dynamic number (N_(i+1)) of first candidate locations of the object at the next time (t=(i+1)) based on a second dynamic number (N_i) of second candidate locations of the object at the current time (t=i), and
computing the next location of the object at the next time based on at least one of: the first dynamic number of first candidate locations at the next time, or the second dynamic number of second candidate locations at the current time, wherein:
the object moves during the first incremental time period in a region represented by the map,
the map is a multi-dimensional map represented as a multi-dimensional array A, such that reachability of each location of the region is represented by a corresponding array element a which is a logical value between 0 and 1,
a location of the region is unreachable and forbidden when the corresponding array element satisfies a=0,
a location of the region is fully reachable when the corresponding array element satisfies a=1,
a location of the region is partially reachable when the corresponding array element satisfies: 0<a<1,
each of the next location, the current location, the first dynamic number of first candidate locations, and the second dynamic number of second candidate locations, is a point in the region and is represented as a corresponding array element, and
the direction of the movement of the object at any location is locally represented as one of a number of allowable directions.

29. A method of a movement tracking system, comprising:
generating at least one sensing information (SI);
obtaining at least one time series of SI (TSSI);
analyzing the at least one TSSI;
tracking a movement of an object in a venue based on the at least one TSSI;
computing an incremental distance associated with the movement of the object in a first incremental time period based on the at least one TSSI;
computing a direction associated with the movement of the object in a second incremental time period based on the at least one TSSI; and
computing a next location of the object at a next time based on at least one of: a current location of the object at a current time, a current orientation of the object at the current time, the incremental distance, the direction, or a map of the venue, wherein the next location of the object at the next time is computed using a particle filter and based on:
initializing an initial number (N_0) of initial candidate locations of the object at an initial time (t=0),
computing iteratively a first dynamic number (N_(i+1)) of first candidate locations of the object at the next time (t=(i+1)) based on a second dynamic number (N_i) of second candidate locations of the object at the current time (t=i), and
computing the next location of the object at the next time based on at least one of: the first dynamic number of first candidate locations at the next time, or the second dynamic number of second candidate locations at the current time, wherein:
the object moves during the first incremental time period in a region represented by the map,
the map is a multi-dimensional map represented as a multi-dimensional array A, such that reachability of each location of the region is represented by a corresponding array element a which is a logical value between 0 and 1,
a location of the region is unreachable and forbidden when the corresponding array element satisfies a=0,
a location of the region is fully reachable when the corresponding array element satisfies a=1,
a location of the region is partially reachable when the corresponding array element satisfies: 0<a<1,
each of the next location, the current location, the first dynamic number of first candidate locations, and the second dynamic number of second candidate locations, is a point in the region and is represented as a corresponding array element, and the direction of the movement of the object at any location is locally represented as one of a number of allowable directions.

* * * * *